(12) United States Patent
Ohkuri et al.

(10) Patent No.: US 12,433,311 B2
(45) Date of Patent: *Oct. 7, 2025

(54) FOOD OR BEVERAGE WITH INCREASED SWEETNESS

(71) Applicant: SUNTORY HOLDINGS LIMITED, Osaka (JP)

(72) Inventors: Tadahiro Ohkuri, Kanagawa (JP); Akiko Fujie, Kanagawa (JP); Yoshiaki Yokoo, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,640

(22) Filed: May 14, 2024

(65) Prior Publication Data
US 2024/0292873 A1 Sep. 5, 2024

Related U.S. Application Data

(63) Continuation of application No. 16/619,758, filed as application No. PCT/JP2018/021842 on Jun. 7, 2018, now Pat. No. 11,998,032.

(30) Foreign Application Priority Data

Jun. 8, 2017 (JP) .................................. 2017-113760
Oct. 12, 2017 (JP) .................................. 2017-198815

(51) Int. Cl.
*A23L 2/60* (2006.01)
*A23L 27/12* (2016.01)
(Continued)

(52) U.S. Cl.
CPC ................. *A23L 27/36* (2016.08); *A23L 2/60* (2013.01); *A23L 27/12* (2016.08); *A23L 27/30* (2016.08);
(Continued)

(58) Field of Classification Search
CPC . A23L 27/36; A23L 27/88; A23L 2/60; A23L 2/36
See application file for complete search history.

(56) References Cited

U.S. PATENT DOCUMENTS 5,433,965 A 7/1995 Fischer et al.
7,229,658 B1 6/2007 Inoue et al.
(Continued)

FOREIGN PATENT DOCUMENTS

CN 101553132 10/2009
CN 101668441 3/2010
(Continued)

OTHER PUBLICATIONS

Results of the Shochu Search Database, Food Composition Database, Ministry of Education, Science and Technology (2023), along with an English machine translation.
(Continued)

*Primary Examiner* — Jenna A Watts
(74) *Attorney, Agent, or Firm* — GREENBLUM & BERNSTEIN, P.L.C.

(57) ABSTRACT

A food or beverage having (a) a natural sugar in an amount corresponding to a sweetness intensity X1, (b) a high-intensity sweetener in an amount corresponding to a sweetness intensity X2, and (c) less than 40 mg/100 ml of sodium, wherein (1) ingredients (a) to (c) exhibit a sweetness intensity X3 is exhibited by the, and (2) energy is 50 Kcal/100 ml or less, and wherein $0.1<(X1+X2)<X3\leq20$ is satisfied. Also, a sweetening composition for producing the food or beverage, and a method for producing the food or beverage.

20 Claims, 7 Drawing Sheets

(51) Int. Cl.
*A23L 27/30* (2016.01)
*A23L 27/40* (2016.01)

(52) U.S. Cl.
CPC .............. *A23L 27/31* (2016.08); *A23L 27/40* (2016.08); *A23V 2002/00* (2013.01)

(56) References Cited

U.S. PATENT DOCUMENTS

| | | |
|---|---|---|
| 9,144,251 B2 | 9/2015 | Prakash et al. |
| 2007/0116832 A1 | 5/2007 | Prakash et al. |
| 2007/0128311 A1 | 6/2007 | Prakash et al. |
| 2008/0107776 A1 | 5/2008 | Prakash et al. |
| 2008/0226798 A1 | 9/2008 | Talebi et al. |
| 2008/0226803 A1 | 9/2008 | Letourneau et al. |
| 2009/0311686 A1 | 12/2009 | Slack et al. |
| 2010/0267847 A1 | 10/2010 | Yoshinaka et al. |
| 2011/0091600 A1 | 4/2011 | Abelyan et al. |
| 2011/0091602 A1 | 4/2011 | Abelyan et al. |
| 2011/0091608 A1 | 4/2011 | Abelyan et al. |
| 2011/0091617 A1 | 4/2011 | Abelyan et al. |
| 2011/0091628 A1 | 4/2011 | Abelyan et al. |
| 2011/0091629 A1 | 4/2011 | Abelyan et al. |
| 2011/0091630 A1 | 4/2011 | Abelyan et al. |
| 2011/0091633 A1 | 4/2011 | Abelyan et al. |
| 2011/0091634 A1 | 4/2011 | Abelyan et al. |
| 2011/0091635 A1 | 4/2011 | Abelyan et al. |
| 2011/0091637 A1 | 4/2011 | Abelyan et al. |
| 2011/0200712 A1 | 8/2011 | Takaichi |
| 2012/0076908 A1 | 3/2012 | Fujihara et al. |
| 2012/0156351 A1 | 6/2012 | Miyazawa et al. |
| 2012/0214751 A1 | 8/2012 | Markosyan |
| 2014/0037814 A1 | 2/2014 | Quinlan et al. |
| 2014/0248411 A1 | 9/2014 | Rhyu et al. |
| 2014/0271996 A1 | 9/2014 | Prakash et al. |
| 2014/0272068 A1 | 9/2014 | Prakash et al. |
| 2014/0342043 A1 | 11/2014 | Bell et al. |
| 2014/0342044 A1 | 11/2014 | Bell et al. |
| 2015/0110940 A1 | 4/2015 | Lee et al. |
| 2015/0223510 A1 | 8/2015 | Lee |
| 2015/0230509 A1 | 8/2015 | Fujihara et al. |
| 2016/0095338 A1 | 4/2016 | Mao et al. |
| 2016/0183574 A1 | 6/2016 | Chen et al. |
| 2017/0245537 A1 | 8/2017 | Lee et al. |
| 2018/0000133 A1 | 1/2018 | Izumi et al. |
| 2018/0049455 A1 | 2/2018 | Morita et al. |
| 2018/0184692 A1 | 7/2018 | Nachgabauer et al. |
| 2018/0230504 A1 | 8/2018 | Anderson et al. |
| 2018/0263269 A1 | 9/2018 | Prakash et al. |
| 2019/0174806 A1 | 6/2019 | Erickson et al. |
| 2019/0183148 A1 | 6/2019 | Nakajima et al. |
| 2019/0208803 A1 | 7/2019 | Browne et al. |
| 2020/0107568 A1 | 4/2020 | Matsuzaki et al. |

FOREIGN PATENT DOCUMENTS

| | | |
|---|---|---|
| CN | 105792671 | 7/2016 |
| CN | 106720817 A | 5/2017 |
| JP | S55-127972 A | 10/1980 |
| JP | S58-152466 A | 9/1983 |
| JP | S59-183670 A | 10/1984 |
| JP | H8-508638 A | 9/1996 |
| JP | 2000-273051 | 10/2000 |
| JP | 2000-300190 A | 10/2000 |
| JP | 2002-034501 A | 2/2002 |
| JP | 2003-210147 A | 7/2003 |
| JP | 2008-017834 A | 1/2008 |
| JP | 2009-517030 A | 4/2009 |
| JP | 2010-507376 A | 3/2010 |
| JP | 2010-521164 A | 6/2010 |
| JP | 2011-520452 A | 7/2011 |
| JP | 2011-254783 A | 12/2011 |
| JP | 2012-70708 A | 4/2012 |
| JP | 2012-235790 A | 12/2012 |
| JP | 2013-039068 A | 2/2013 |
| JP | 2013-507914 A | 3/2013 |
| JP | 2014-82960 A | 5/2014 |
| JP | 2014-93980 A | 5/2014 |
| JP | 2014-201671 | 10/2014 |
| JP | 2014-236680 A | 12/2014 |
| JP | 2014-532404 A | 12/2014 |
| JP | 2015-23803 A | 2/2015 |
| JP | 2015-033387 A | 2/2015 |
| JP | 2015-512652 | 4/2015 |
| JP | 2015-096057 A | 5/2015 |
| JP | 2015-523099 A | 8/2015 |
| JP | 2015-208246 | 11/2015 |
| JP | 2016-54651 A | 4/2016 |
| JP | 2016-518143 A | 6/2016 |
| JP | 2016-521974 A | 7/2016 |
| JP | 2016-529878 A | 9/2016 |
| JP | 2016-178928 A | 10/2016 |
| JP | 6109353 B1 | 4/2017 |
| JP | 2017-532027 A | 11/2017 |
| JP | 2017-535251 A | 11/2017 |
| JP | 2018-130097 A | 8/2018 |
| JP | 2018-521680 A | 8/2018 |
| JP | 2018-530326 A | 10/2018 |
| WO | 2000/024273 A1 | 5/2000 |
| WO | 2009/063921 A1 | 5/2009 |
| WO | 2009/140568 A1 | 11/2009 |
| WO | 2010/050510 A1 | 5/2010 |
| WO | 2011/024471 A1 | 3/2011 |
| WO | 2011/046423 A | 4/2011 |
| WO | 2016/054544 A1 | 4/2016 |
| WO | 2016/143361 A1 | 9/2016 |
| WO | 2017/170990 A1 | 10/2017 |
| WO | 2018/044588 A1 | 3/2018 |
| WO | 2018/053135 A1 | 3/2018 |
| WO | 2018/122383 A1 | 7/2018 |
| WO | 2018/186352 A1 | 10/2018 |

OTHER PUBLICATIONS

Results of the Fructose Glucose Sugar Search Database, Food Composition Database, Ministry of Education, Science and Technology (2023), along with an English machine translation.
Results of the Milk Search Database for Food Ingredients of the Ministry of Education, Culture, Sports, Science and Technology (2023), along with an English machine translation.
Results of the Granulated Sugar Search in the Food Ingredients Database of the Ministry of Education, Culture, Sports, Science and Technology (2023), along with an English machine translation.
Results of Fructose Sugar Search in the Food Components Database of the Ministry of Education, Culture, Sports, Science and Technology (2023), along with an English machine translation.
Submission of publications, etc., mailed Jan. 7, 2025, submitted against JP Patent Application No. 2023-039135, along with an English machine translation.
Olsson et al., "Microbial Production of Next-Generation Stevia Sweeteners" *Microb Cell Fact* 15:207, pp. 1-14 (published online Dec. 7, 2016).
Office Action issued in CA Patent App. No. 3,066,340, dated Jun. 30, 2025.
Written Opinion for PCT/JP2018/021842, dated Sep. 4, 2018.
International Search Report for PCT/JP2018/021842, dated Sep. 4, 2018.
Uchida et al. "Studies on Interaction with Sweet and Salty Taste", Research Bulletin of Otsuma Women's University for Home Economics, No. 49 (2013) (w/ English-language summary on last page).
Fernstrom et al., "Mechanisms for Sweetness", The Journal of Nutrition, 2012, vol. 142: 1134S-1141S.
Hutteau et al., "Physicochemical and Psychophysical Characteristics of Binary Mixtures of Bulk and Intense Sweeteners", Food Chemistry, 1998, vol. 63, No. 1, pp. 9-16.
Kawai et al., "Evaluation of synergetic effects among sweeteners by mice brief-access tests", The Japanese Journal of Taste and Smell Research, 2014, 21(3):285-288 (w/ translation).
Li et al. "Human receptors for sweet and umami taste", Proc Natl Acad Sci U S A. 2002, 99(7):4692-4696.

(56) References Cited

OTHER PUBLICATIONS

Okuri et al., "Enhancement of the chorda tympani nerve responses to mixtures of sweet and salt compounds in mice" The Japanese Journal of Taste and Smell Research, 2009, vol. 16, No. 3, pp. 327-330 (w/ translation).

Schiffman et al., "Investigation of Synergism in Binary Mixtures of Sweeteners", Brain Research Bulletin, 1995, vol. 38, No. 2, pp. 105-120.

Sinchaipanit et al., "Effect of sweeteners and hydrocolloids on quality attributes of reduced-calorie carrot juice", Journal of the Science of Food and Agriculture, 2013, vol. 93, pp. 3304-3311.

Zhao et al., "The Receptors for Mammalian Sweet and Umami taste", Cell, 2003, vol. 115, 255-266.

Yee et al., "Glucose transporters and ATP-gated K+ ($K_{ATP}$) metabolic sensors are present in type 1 taste. Receptor 3 (T1r3)-expressing taste cells", Proc Natl Acad Sci USA, 2011, vol. 108, No. 13, 5431-5436.

Jiang et al., "The Cysteine-rich Region of T1R3 Determines Responses to Intensely Sweet Proteins", J Biol. Chem. 2004, vol. 279, No. 43, 45068-45075.

Lemon & Grapefruit Sparkling Water, Mintel (ID#4066849), retrieved from www.gnpd.com.

Mixed Berry Carbonated Vitamin Drink, Mintel (ID#5773819), retrieved from www.gnpd.com.

Concord Grape Juice, Mintel (ID#1827674), retrieved from www.gnpd.com.

Watermelon Pasteque Natural Fruit Drink, Mintel (ID#2309617), retrieved from www.gnpd.com.

White Grape Pulse, Mintel (ID#1662293), retrieved from www.gnpd.com.

Foxy Fruit Punch, Mintel (ID#1207728), retrieved from www.gnpd.com.

"How to best deal with soft drinks" linked to "Karada kenkoujyuku", Nikkyo Create, "Amount of sugar contained in soft drinks", Aug. 2015, retrieved on Jan. 29, 2020 from http://www.nikkyocreate.co.jp/kkj/ (w/ partial translation).

Cassis & Orange Water, Mintel (ID#5800663), retrieved from www.gnpd.com.

Lemon & Orange Water, Mintel (ID#3247301), retrieved from www.gnpd.com.

Raspberry, Guava and Jack Fruit Flavored Water, Mintel (ID#4933725), retrieved from www.gnpd.com.

Organic Coconut Aloe Water, Mintel (ID#2553315), retrieved from www.gnpd.com.

Blueberry-Lime Organic Aloe and Coconut Water Beverage (Mintel ID#4793439), retrieved from www.gnpd.com.

Coconut Water, Mintel (ID#1754174), retrieved from www.gnpd.com.

Research report "Sugar and energy of the flavor water" published by FCG Research Institute, Inc., Mar. 16, 2015, captured on Jan. 29, 2020 from Wayback Machine internet archive: http://web.archive.org/web/20150316181104/https://www.fcg-r.co.jp/lab/foods/report/130607.html (w/ partial translation).

"Flavored Water List" in "Sugar and energy of the flavor water" published by FCG Research Institute, Inc., Mar. 16, 2015, captured on Jan. 29, 2020 from Wayback Machine internet archive: http://web.archive.org/web/20150414002447/http://www.fcg-r.co.jp/lab/foods/report/images/20130607-2.pdf (w/ partial translation).

Supervised by Kagawa, Yoshiko, "Seventh revised edition, Food Ingredient table 2016", reference edition (w/ translation).

Ito, Hiroshi, "Caffeine, A glossary of Coffee", Shibatashoten Co., Ltd. (w/ partial translation).

Taguchi et al., "Seasoning Effect on Various Combinations of Basic Taste Qualities at Concentration Levels Used in Cooking", Journal of Nagoya Bunri College, 1988, 13:1-15 (w/ partial translation).

Watanabe, Yuko, "Applied technology by the combined use of erythritol and high-intensity sweeteners", Food Chemicals, 2000, 16(5):41-45 (w/ partial translation).

Apple Flavored Fortified Water (Mintel ID#1538195), retrieved from www.gnpd.com.

Office Action issued in CN Patent Application No. 202010572726.8, dated Mar. 15, 2021, along with a machine English language translation.

FOOD OR BEVERAGE WITH INCREASED SWEETNESS

This application is a continuation of U.S. application Ser. No. 16/619,758, filed Dec. 5, 2019, now U.S. Pat. No. 11,998,032, which is a U.S. National Stage entry of PCT/JP2018/021842, filed Jun. 7, 2018, which claims priority to JP Application Nos. 2017-198815, filed Oct. 12, 2017, and 2017-113760, filed Jun. 8, 2017. The disclosure of each of the above applications is herein incorporated by reference in its entirety.

TECHNICAL FIELD

The present invention relates to a food or beverage having enhanced sweetness exhibited by a sugar and a sweetener, a sweetening composition for producing the food or beverage, and a method for producing the food or beverage.

BACKGROUND ART

Humans have five sensory systems, and the sense of taste is one of the sensory systems of humans. The taste receptor organ to receive tastes is called taste buds, which exist on the fungiform papillae existing over a wide area, mainly on the tip of the tongue, on the vallate papillae existing on a limited area of the back of the tongue, and on the foliate papillae. The taste buds are a cell assembly composed of elongate cells, called taste cells, and basal cells. The taste cells protrude microvilli toward the tongue surface, and form synapses at bottom of the cells with taste nerve fibers entering the taste buds. Tastes we usually sense are transmitted as taste information via the taste nerves to the brain, where the tastes are perceived. Known taste receptors of sweetness include T1R2 and T1R3. T1R2 and T1R3 are reported to form hetero-dimers (Non-patent Literatures 1 to 3).

Although various studies have been made on the sense of taste, little has been revealed yet in this field. We usually experience various tastes of foods. Foods that seem to be tasty have appropriately mixed and well-harmonized tastes. The taste of foods may be tasted as a single taste in some cases, but is often tasted as a mixed taste of various tastes, which are associated with one another.

Meanwhile, foods and beverages have been required to have lower calories in addition to a good taste in recent years. This relates to a fact that lifestyle-related diseases such as obesity and diabetes are regarded as a problem.

However, to produce lower-calorie foods and beverages, their sugar concentration has to be maintained low. This is an obstruction in the case of providing foods and beverages that exhibit low calories and a good taste.

As an example of a contrast effect, which is an interaction of tastes, there has been long known a phenomenon in which addition of salt to sweet red-bean soup enhances sweetness. There is an example that reports the interaction between saltiness and sweetness by focusing on this phenomenon, and it is concluded that the interaction between sweetness and saltiness requires sweetness that is strong to a certain degree (a 15% solution) and a salt concentration that is high to a certain degree (0.1 to 0.2%) (Non-patent Literature 4).

Foods and beverages that exhibit sweetness by use of a low-calorie high-intensity sweetener such as rebaudioside A instead of a natural sugar have been developed, but the sweetness exhibited by high-intensity sweeteners has a distinct aftertaste, which prevents a good taste from being provided.

CITATION LIST

Non-Patent Literature

[Non-Patent Literature 1] Zhao G. Q., Zhang Y., Hoon M. A., Chandrashekar J., Erlenbach I., Ryba N. J. P., and Zukerl C. S., Cell, 2003, Vol. 115, 255-266

[Non-patent Literature 2] Li X, Staszewski L, Xu H, Durick K, Zoller M, Adler E., Proc Natl Acad Sci USA. 2002, 99 (7), 4692-4696.

[Non-patent Literature 3] Fernstrom J. D., Munger S. D., Sclafani A., de Araujo I. E., Roberts A., and Molinary S., J. Nutr. 2012. Vol. 142: 11345-1141S

[Non-patent Literature 4] Ayumi Uchida, Nao Takagi, Rieko Horikiri, Miho Matsue, Yumiko Uchiyama, and Masashi Omori, Research bulletin of Otsuma Women's University for home economics, No. 49 (2013.3)

SUMMARY OF INVENTION

Technical Problem

Development of a method for providing an appropriate sweetness intensity and improving the sweetness satisfactorily while maintaining calories of a food or beverage low has been awaited.

Solution to Problem

The present inventors have first succeeded in maintaining the energy (Kcal) of a food or beverage at a low level while providing appropriate sweetness by blending a specific high-intensity sweetener in addition to a natural sugar and in enhancing the sweetness based on the combination of the natural sugar and the specific high-intensity sweetener by adding sodium at a concentration low enough not to be sensed by humans.

That is, the present invention is as follows.

[1]
A food or beverage comprising
(a) a natural sugar in an amount corresponding to a sweetness intensity X1,
(b) a high-intensity sweetener in an amount corresponding to a sweetness intensity X2, and
(c) less than 40 mg/100 ml of sodium,
wherein (1) sweetness having a sweetness intensity X3 is exhibited by the ingredients (a) to (c), and
(2) energy is 50 Kcal/100 ml or less, and
wherein $0.1 < (X1+X2) < X3 \leq 20$ is satisfied.

[2]
The food or beverage according to [1], wherein $0.5 \{X3-(X1+X2)\}$ 5 is satisfied.

[3]
The food or beverage according to [1] or [2], wherein the amount of the high-intensity sweetener is P2 ppm, and I) $0 \leq X1/(225.2 \times P2/10000) \leq 9$ and II) $2 \leq X1 + 225.2 \times P2/10000 \leq 11.5$ or III) $0 \leq X1/(231.0 \times P2/10000) \leq 9$ and IV) $2 \leq X1 + 231.0 \times P2/10000 \leq 11.5$ -continued or V) $0 \leq X1/(133.4 \times P2/10000) \leq 250$ and VI) $2 \leq X1 + 133.4 \times P2/10000 < 16$ or VII) $0 \leq X1/(269.7 \times P2/10000) \leq 250$ and VIII) $2 \leq X1 + 269.7 \times P2/10000 \leq 11.5$ are satisfied.

[4]
The food or beverage according to any one of [1] to [3], wherein the amount of sodium is 4 to 26 mg/100 ml.

[5]
The food or beverage according to any one of [1] to [4], wherein the energy is 0 to 25 Kcal/100 ml.

[6]
The food or beverage according to any one of [1] to [5], wherein the natural sugar is at least one selected from the group consisting of glucose, sucrose, fructose, maltose, an oligosaccharide, an isomerized sugar, lactose, psicose, allose, tagatose, and a combination thereof.

[7]
The food or beverage according to any one of [1] to [6], wherein the high-intensity sweetener is at least one selected from the group consisting of rebaudioside M, rebaudioside D, luo han guo extract, mogroside V and a combination thereof.

[8]
The food or beverage according to any one of [1] to [7], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[9]
The food or beverage according to any one of [1] to [8], wherein 5 to 25 mg/100 ml of sodium is contained, the energy is 0 to 25 Kcal/100 ml, and X3 is 6 or more.

[10]
A sweetening composition comprising a natural sugar, high-intensity sweetener, and sodium, wherein
a food or beverage in which the sweetening composition is blended comprises
(a) the natural sugar in an amount of a sweetness intensity X1,
(b) the high-intensity sweetener in an amount of a sweetness intensity X2, and
(c) less than 40 mg/100 ml of sodium,
wherein (1) sweetness having a sweetness intensity X3 is exhibited by the ingredients (a) to (c), and
(2) energy is 50 Kcal/100 ml or less, and
wherein $0.1 < (X1+X2) < X3 \leq 20$ is satisfied.

[11]
The sweetening composition according to [10], wherein 0.5 {X3−(X1+X2)} 5 is satisfied.

[12]
The sweetening composition according to [10] or [11], wherein in the food or beverage,
the amount of the high-intensity sweetener is P2 ppm, and I) $0 \leq X1/(225.2 \times P2/10000) \leq 9$ and II) $2 \leq X1 + 225.2 \times P2/10000 \leq 11.5$ or III) $0 \leq X1/(231.0 \times P2/10000) \leq 9$ and IV) $2 \leq X1 + 231.0 \times P2/10000 \leq 11.5$ or V) $0 \leq X1/(133.4 \times P2/10000) \leq 250$ and VI) $2 \leq X1 + 133.4 \times P2/10000 < 16$ or VII) $0 \leq X1/(269.7 \times P2/10000) \leq 250$ and VIII) $2 \leq X1 + 269.7 \times P2/10000 \leq 11.5$ are satisfied.

[13]
The sweetening composition according to any one of [10] to [12], wherein the amount of sodium in the food or beverage is 4 to 26 mg/100 ml.

[14]
The sweetening composition according to any one of [10] to [13], wherein the energy of the food or beverage is 0 to 25 Kcal/100 ml.

[15]
The sweetening composition according to any one of [10] to [14], wherein the natural sugar is at least one selected from the group consisting of glucose, sucrose, fructose, maltose, an oligosaccharide, an isomerized sugar, lactose, psicose, allose, tagatose, and a combination thereof.

[16]
The sweetening composition according to any one of [10] to [15], wherein the high-intensity sweetener is at least one selected from the group consisting of rebaudioside M, rebaudioside D, luo han guo extract, mogroside V and a combination thereof.

[17]
The sweetening composition according to any one of [10] to [16], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[18]
The sweetening composition according to any one of [10] to [17], wherein in the food or beverage, 5 to 25 mg/100 ml of sodium is contained, the energy is 0 to 25 Kcal/100 ml, and X3 is 6 or more.

[19]
A method for producing a food or beverage comprising:
to raw materials, (i) adding (a) a natural sugar in an amount of a sweetness intensity X1 and (b) a high-intensity sweetener in an amount of a sweetness intensity X2, and (ii) adding (c) less than 40 mg/100 ml of sodium, wherein (1) sweetness having a sweetness intensity X3 is exhibited by the ingredients (a) to (c), and (2) energy is 50 Kcal/100 ml or less, and wherein 0.1<(X1+X2)<X3≤20 is satisfied.

[20]

The method according to [19], wherein 0.5 {X3−(X1+X2)} 5 is satisfied.

[21]

The method according to [19] or [20], wherein in the food or beverage, the amount of the high-intensity sweetener is P2 ppm, and I) $0 \le X1/(225.2 \times P2/10000) \le 9$ and II) $2 \le X1 + 225.2 \times P2/10000 \le 11.5$ or III) $0 \le X1/(231.0 \times P2/10000) \le 9$ and IV) $2 \le X1 + 231.0 \times P2/10000 \le 11.5$ or V) $0 \le X1/(133.4 \times P2/10000) \le 250$ and VI) $2 \le X1 + 133.4 \times P2/10000 < 16$ or VII) $0 \le X1/(269.7 \times P2/10000) \le 250$ and VIII) $2 \le X1 + 269.7 \times P2/10000 \le 11.5$ are satisfied.

[22]

The method according to any one of [19] to [21], wherein the amount of sodium in the food or beverage is 4 to 26 mg/100 ml.

[23]

The method according to any one of [19] to [22], wherein the energy of the food or beverage is 0 to 25 Kcal/100 ml.

[24]

The method according to any one of [19] to [23], wherein the natural sugar is at least one selected from the group consisting of glucose, sucrose, fructose, maltose, an oligosaccharide, an isomerized sugar, lactose, psicose, allose, tagatose, and a combination thereof.

[25]

The method according to any one of [19] to [24], wherein the high-intensity sweetener is at least one selected from the group consisting of rebaudioside M, rebaudioside D, luo han guo extract, mogroside V and a combination thereof.

[26]

The method according to any one of [19] to [25], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[27]

The method according to any one of [19] to [26], wherein in the food or beverage, 5 to 25 mg/100 ml of sodium is contained, the energy is 0 to 25 Kcal/100 ml, and X3 is 6 or more.

[1-1]

A food or beverage comprising (a) a natural sugar in an amount corresponding to a sweetness intensity X1, (b) a high-intensity sweetener selected from the group consisting of rebaudioside M, rebaudioside D and a combination thereof in an amount corresponding to a sweetness intensity X2, and (c) 4 to 26 mg/100 ml of sodium, wherein (1) sweetness having a sweetness intensity X3 is exhibited by the ingredients (a) to (c), and (2) energy is 25 Kcal/100 ml or less, and wherein 0.1<(X1+X2)<X3≤20 is satisfied.

[1-2]

The food or beverage according to [1-1], wherein 0.5 {X3−(X1+X2)} 5 is satisfied.

[1-3]

The food or beverage according to [1-1] or [1-2], wherein the amount of the high-intensity sweetener is P2 ppm, and I) $0 \le X1/(225.2 \times P2/10000) \le 9$ and II) $2 \le X1 + 225.2 \times P2/10000 \le 11.5$ or III) $0 \le X1/(231.0 \times P2/10000) \le 9$ and IV) $2 \le X1 + 231.0 \times P2/10000 \le 11.5$ are satisfied.

[1-4]

The food or beverage according to any one of [1-1] to [1-3], wherein the natural sugar is at least one selected from the group consisting of glucose, sucrose, fructose, maltose, an oligosaccharide, an isomerized sugar, lactose, psicose, allose, tagatose, and a combination thereof.

[1-5]

The food or beverage according to any one of [1-1] to [1-4], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[1-6]

The food or beverage according to any one of [1-1] to [1-5], wherein 5 to 25 mg/100 ml of sodium is contained, and X3 is 6 or more.

[1-7]

A sweetening composition comprising a natural sugar, high-intensity sweetener selected from the group consisting of rebaudioside M, rebaudioside D and a combination thereof, and sodium, wherein a food or beverage in which the sweetening composition is blended comprises (a) the natural sugar in an amount of a sweetness intensity X1, (b) the high-intensity sweetener in an amount of a sweetness intensity X2, and (c) 4 to 26 mg/100 ml of sodium, wherein (1) sweetness having a sweetness intensity X3 is exhibited by the ingredients (a) to (c), and (2) energy is 25 Kcal/100 ml or less, and wherein $0.1<(X1+X2)<X3\leq20$ is satisfied.

[1-8]

The sweetening composition according to [1-7], wherein 0.5 {X3−(X1+X2)} 5 is satisfied.

[1-9]

The sweetening composition according to [1-7] or [1-8], wherein in the food or beverage, the amount of the high-intensity sweetener is P2 ppm, and I) $0 \leq X1/(225.2 \times P2/10000) \leq 9$ and II) $2 \leq X1 + 225.2 \times P2/10000 \leq 11.5$ or III) $0 \leq X1/(231.0 \times P2/10000) \leq 9$ and IV) $2 \leq X1 + 231.0 \times P2/10000 \leq 11.5$ are satisfied.

[1-10]

The sweetening composition according to any one of [1-7] to [1-9], wherein the natural sugar is at least one selected from the group consisting of glucose, sucrose, fructose, maltose, an oligosaccharide, an isomerized sugar, lactose, psicose, allose, tagatose, and a combination thereof.

[1-11]

The sweetening composition according to any one of [1-7] to [1-10], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[1-12]

The sweetening composition according to any one of [1-7] to [1-11], wherein in the food or beverage, 5 to 25 mg/100 ml of sodium is contained, and X3 is 6 or more.

[1-13]

A method for producing a food or beverage comprising: to raw materials, (i) adding (a) a natural sugar in an amount of a sweetness intensity X1 and (b) a high-intensity sweetener selected from the group consisting of rebaudioside M, rebaudioside D and a combination thereof in an amount of a sweetness intensity X2, and (ii) adding (c) 4 to 26 mg/100 ml of sodium, wherein (1) sweetness having a sweetness intensity X3 is exhibited by the ingredients (a) to (c), and (2) energy is 25 Kcal/100 ml or less, and wherein $0.1<(X1+X2)<X3\leq20$ is satisfied.

[1-14]

The method according to [1-13], wherein 0.5 {X3−(X1+X2)}<5 is satisfied.

[1-15]

The method according to [1-19] or [1-20], wherein in the food or beverage, the amount of the high-intensity sweetener is P2 ppm, and I) $0 \leq X1/(225.2 \times P2/10000) \leq 9$ and II) $2 \leq X1 + 225.2 \times P2/10000 \leq 11.5$ or III) $0 \leq X1/(231.0 \times P2/10000) \leq 9$ and IV) $2 \leq X1 + 231.0 \times P2/10000 \leq 11.5$ are satisfied.

[1-16]

The method according to any one of [1-13] to [1-15], wherein the natural sugar is at least one selected from the group consisting of glucose, sucrose, fructose, maltose, an oligosaccharide, an isomerized sugar, lactose, psicose, allose, tagatose, and a combination thereof.

[1-17]

The method according to any one of [1-13] to [1-16], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[1-18]

The method according to any one of [1-13] to [1-17], wherein in the food or beverage, 5 to 25 mg/100 ml of sodium is contained, the energy is 0 to 25 Kcal/100 ml, and X3 is 6 or more.

[2-1]

A food or beverage comprising (a) a natural sugar in an amount corresponding to a sweetness intensity X1, (b) a luo han guo extract in an amount corresponding to a sweetness intensity X2, and (c) 4 mg/100 ml or more and less than 34.5 mg/100 ml of sodium, wherein (1) sweetness having a sweetness intensity X3 is exhibited by the ingredients (a) to (c), and (2) energy is 50 Kcal/100 ml or less, and wherein $0.1<(X1+X2)<X3\leq20$ is satisfied.

[2-2]

The food or beverage according to [2-1], wherein 0.5 {X3−(X1+X2)} 5 is satisfied.

[2-3]
The food or beverage according to [2-1] or [2-2], wherein
the amount of the luo han guo extract is P2 ppm, and I) $0 \leq X1/(133.4 \times P2/10000) \leq 250$ and II) $2 \leq X1 + 133.4 \times P2/10000 < 16$ are satisfied.

[2-4]
The food or beverage according to any one of [2-1] to [2-3], wherein the amount of sodium is 5 to 30 mg/100 ml.

[2-5]
The food or beverage according to any one of [2-1] to [2-4], wherein the energy is 0 to 25 Kcal/100 ml.

[2-6]
The food or beverage according to any one of [2-1] to [2-5], wherein the natural sugar is at least one selected from the group consisting of glucose, sucrose, fructose, maltose, an oligosaccharide, an isomerized sugar, lactose, psicose, allose, tagatose, and a combination thereof.

[2-7]
The food or beverage according to any one of [2-1] to [2-6], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium arginate, sodium glucoheptonate, sodium gluconate, sodium glutamate, sodium tartrate, sodium aspartate, sodium lactate, casein sodium, sodium ascorbate, and a mixture thereof.

[2-8]
The food or beverage according to any one of [2-1] to [2-7], wherein 5 to 30 mg/100 ml of sodium is contained, the energy is 0 to 25 Kcal/100 ml, and X3 is 6 or more.

[2-9]
A sweetening composition comprising a natural sugar, a luo han guo extract, and sodium, wherein
a food or beverage in which the sweetening composition is blended comprises
(a) the natural sugar in an amount of a sweetness intensity X1,
(b) the luo han guo extract in an amount of a sweetness intensity X2, and
(c) 4 mg/100 ml or more and less than 34.5 mg/100 ml of sodium,
wherein (1) sweetness having a sweetness intensity X3 is exhibited by the ingredients (a) to (c), and
(2) energy is 50 Kcal/100 ml or less, and
wherein $0.1 < (X1+X2) < X3 \leq 20$ is satisfied.

[2-10]
The sweetening composition according to [2-9], wherein 0.5 {X3−(X1+X2)} 5 is satisfied.

[2-11]
The sweetening composition according to [2-9] or [2-10], wherein in the food or beverage,
the amount of the luo han guo extract is P2 ppm, and I) $0 \leq X1/(133.4 \times P2/10000) \leq 250$ and II) $2 \leq X1 + 133.4 \times P2/10000 < 16$ are satisfied.

[2-12]
The sweetening composition according to any one of [2-9] to [2-11], wherein the amount of sodium in the food or beverage is 5 to 30 mg/100 ml.

[2-13]
The sweetening composition according to any one of [2-9] to [2-12], wherein the energy of the food or beverage is 0 to 25 Kcal/100 ml.

[2-14]
The sweetening composition according to any one of [2-9] to [2-13], wherein the natural sugar is at least one selected from the group consisting of glucose, sucrose, fructose, maltose, an oligosaccharide, an isomerized sugar, lactose, psicose, allose, tagatose, and a combination thereof.

[2-15]
The sweetening composition according to any one of [2-9] to [2-14], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium arginate, sodium glucoheptonate, sodium gluconate, sodium glutamate, sodium tartrate, sodium aspartate, sodium lactate, casein sodium, sodium ascorbate, and a mixture thereof.

[2-16]
The sweetening composition according to any one of [2-9] to [2-15], wherein in the food or beverage, 5 to 30 mg/100 ml of sodium is contained, the energy is 0 to 25 Kcal/100 ml, and X3 is 6 or more.

[2-17]
A method for producing a food or beverage comprising: to raw materials,
(i) adding (a) a natural sugar in an amount of a sweetness intensity X1 and (b) a luo han guo extract in an amount of a sweetness intensity X2, and
(ii) adding (c) 4 mg/100 ml or more and less than 34.5 mg/100 ml of sodium,
wherein (1) sweetness having a sweetness intensity X3 is exhibited by the ingredients (a) to (c), and
(2) energy is 50 Kcal/100 ml or less, and
wherein $0.1 < (X1+X2) < X3 \leq 20$ is satisfied.

[2-18]
The method according to [2-17], wherein 0.5 {X3−(X1+X2)}<5 is satisfied.

[2-19]
The method according to [2-19] or [2-20], wherein in the food or beverage, the amount of the luo han guo extract is P2 ppm, and I) $0 \leq X1/(133.4 \times P2/10000) \leq 250$ and II) $2 \leq X1 + 133.4 \times P2/10000 < 16$ are satisfied.

[2-20]
The method according to any one of [2-17] to [2-19], wherein the amount of sodium in the food or beverage is 5 to 30 mg/100 ml.

[2-21]
The method according to any one of [2-17] to [2-20], wherein the energy of the food or beverage is 0 to 25 Kcal/100 ml.

[2-22]
The method according to any one of [2-17] to [2-21], wherein the natural sugar is at least one selected from the group consisting of glucose, sucrose, fructose, maltose, an oligosaccharide, an isomerized sugar, lactose, psicose, allose, tagatose, and a combination thereof.

[2-23]
The method according to any one of [2-17] to [2-22], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[2-24]
The method according to any one of [2-17] to [2-23], wherein in the food or beverage, 5 to 30 mg/100 ml of sodium is contained, the energy is 0 to 25 Kcal/100 ml, and X3 is 6 or more.

[3-1]
A food or beverage comprising
(a) a natural sugar in an amount corresponding to a sweetness intensity X1,
(b) mogroside V in an amount corresponding to a sweetness intensity X2, and
(c) 4 mg/100 ml or more and less than 23 mg/100 ml of sodium,
wherein (1) sweetness having a sweetness intensity X3 is exhibited by the ingredients (a) to (c), and
(2) energy is 50 Kcal/100 ml or less, and
wherein 0.1<(X1+X2)<X3≤20 is satisfied.

[3-2]
The food or beverage according to [3-1], wherein 0.5 {X3−(X1+X2)} 5 is satisfied.

[3-3]
The food or beverage according to [3-1] or [3-2], wherein the amount of mogroside V is P2 ppm, and $$\text{I)} \quad 0 \leq X1/(269.7 \times P2/10000) \leq 250 \text{ and}$$

$$\text{II)} \quad 2 \leq X1 + 269.7 \times P2/10000 \leq 11.5$$

are satisfied.

[3-4]
The food or beverage according to any one of [3-1] to [3-3], wherein the amount of sodium is 5 to 20 mg/100 ml.

[3-5]
The food or beverage according to any one of [3-1] to [3-4], wherein the energy is 0 to 25 Kcal/100 ml.

[3-6]
The food or beverage according to any one of [3-1] to [3-5], wherein the natural sugar is at least one selected from the group consisting of glucose, sucrose, fructose, maltose, an oligosaccharide, an isomerized sugar, lactose, psicose, allose, tagatose, and a combination thereof.

[3-7]
The food or beverage according to any one of [3-1] to [3-6], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[3-8]
The food or beverage according to any one of [3-1] to [3-7], wherein 5 to 20 mg/100 ml of sodium is contained, the energy is 0 to 25 Kcal/100 ml, and X3 is 6 or more.

[3-9]
A sweetening composition comprising a natural sugar, mogroside V, and sodium, wherein
a food or beverage in which the sweetening composition is blended comprises
(a) the natural sugar in an amount of a sweetness intensity X1,
(b) mogroside V in an amount of a sweetness intensity X2, and
(c) 4 mg/100 ml or more and less than 23 mg/100 ml of sodium,
wherein (1) sweetness having a sweetness intensity X3 is exhibited by the ingredients (a) to (c), and
(2) energy is 50 Kcal/100 ml or less, and
wherein 0.1<(X1+X2)<X3≤20 is satisfied.

[3-10]
The sweetening composition according to [3-9], wherein 0.5 {X3−(X1+X2)} 5 is satisfied.

[3-11]
The sweetening composition according to [3-9] or [3-10], wherein in the food or beverage,
the amount of mogroside V is P2 ppm, and $$0 \leq X1/(269.7 \times P2/10000) \leq 250 \text{ and} \qquad \text{I)}$$

$$2 \leq X1 + 269.7 \times P2/10000 \leq 11.5 \qquad \text{II)}$$

are satisfied.

[3-12]
The sweetening composition according to any one of [3-9] to [3-11], wherein the amount of sodium in the food or beverage is 5 to 20 mg/100 ml.

[3-13]
The sweetening composition according to any one of [3-9] to [3-12], wherein the energy of the food or beverage is 0 to 25 Kcal/100 ml.

[3-14]
The sweetening composition according to any one of [3-9] to [3-13], wherein the natural sugar is at least one selected from the group consisting of glucose, sucrose, fructose, maltose, an oligosaccharide, an isomerized sugar, lactose, psicose, allose, tagatose, and a combination thereof.

[3-15]
The sweetening composition according to any one of [3-9] to [3-14], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[3-16]

The sweetening composition according to any one of [3-9] to [3-16], wherein in the food or beverage, 5 to 20 mg/100 ml of sodium is contained, the energy is 0 to 25 Kcal/100 ml, and X3 is 6 or more.

[3-17]

A method for producing a food or beverage comprising: to raw materials,
(i) adding (a) a natural sugar in an amount of a sweetness intensity X1 and (b) mogroside V in an amount of a sweetness intensity X2, and
(ii) adding (c) 4 mg/100 ml or more and less than 23 mg/100 ml of sodium,
wherein (1) sweetness having a sweetness intensity X3 is exhibited by the ingredients (a) to (c), and
(2) energy is 50 Kcal/100 ml or less, and
wherein 0.1<(X1+X2)<X3≤20 is satisfied.

[3-18]

The method according to [3-17], wherein 0.5 {X3−(X1+X2)}<5 is satisfied.

[3-19]

The method according to [3-17] or [3-18], wherein in the food or beverage, the amount of mogroside V is P2 ppm, and $$0 \leq X1/(269.7 \times P2/10000) \leq 250 \text{ and} \quad \text{I)}$$

$$2 \leq X1 + 269.7 \times P2/10000 \leq 11.5 \quad \text{II)}$$

are satisfied.

[3-20]

The method according to any one of [3-17] to [3-19], wherein the amount of sodium in the food or beverage is 5 to 20 mg/100 ml.

[3-21]

The method according to any one of [3-17] to [3-20], wherein the energy of the food or beverage is 0 to 25 Kcal/100 ml.

[3-22]

The method according to any one of [3-17] to [3-21], wherein the natural sugar is at least one selected from the group consisting of glucose, sucrose, fructose, maltose, an oligosaccharide, an isomerized sugar, lactose, psicose, allose, tagatose, and a combination thereof.

[3-23]

The method according to any one of [3-17] to [3-22], wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

[3-24]

The method according to any one of [3-17] to [3-23], wherein in the food or beverage, 5 to 20 mg/100 ml of sodium is contained, the energy is 0 to 25 Kcal/100 ml, and X3 is 6 or more.

Advantageous Effects of Invention

According to the method of the present invention, a method for providing, not a simple sweetness as obtained by increasing the amount of a natural sugar or a high-intensity sweetener to be used, but a good taste quality by enhancing the sweetness of a food or beverage or a sweetening composition. Additionally, according to the method of the present invention, there is provided a food or beverage or a sweetening composition that exhibits a good taste quality having enhanced sweetness by means other than control of the amount of a sugar and a sweetener to be used.

DESCRIPTION OF EMBODIMENTS

Figure 1:
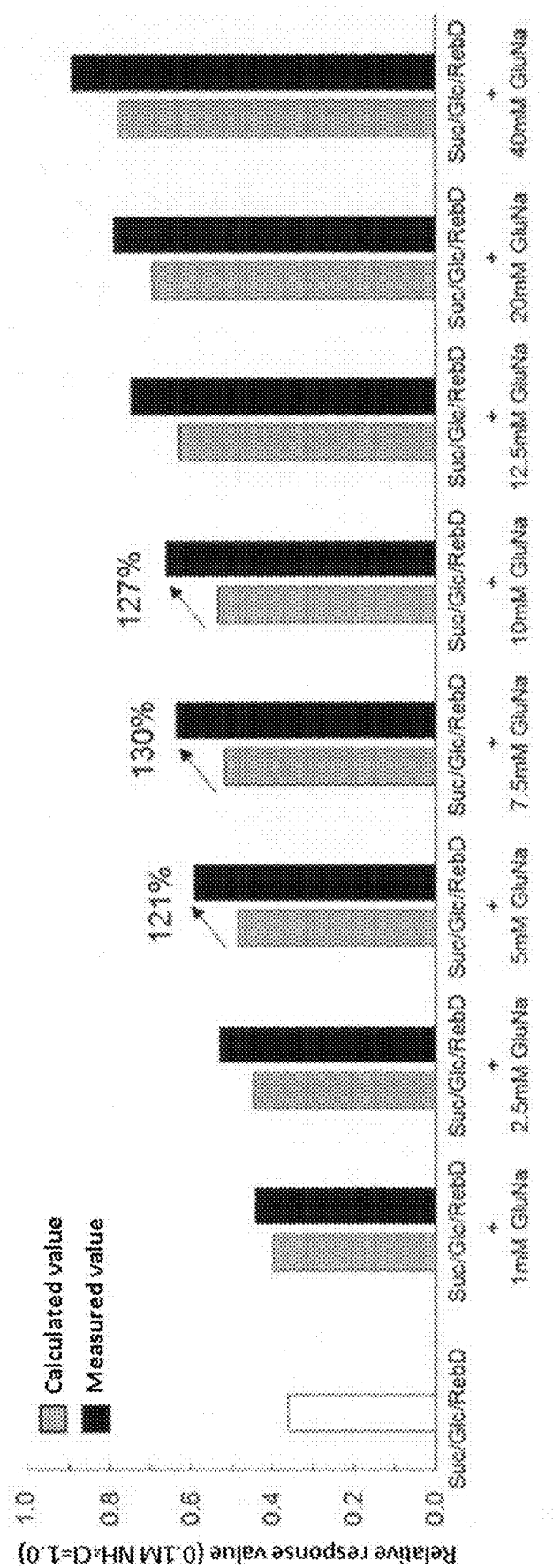
FIG. 1 shows the results of gustatory nerve response experiment using model animals.

The present invention will now be described in detail. The following embodiments are provided for illustrating the present invention and are not intended to limit the present invention only thereto. The present invention may be implemented in various forms, without departing from the spirit of the present invention.

Note that all documents, as well as laid-open application publications, patent application publications, and other patent documents cited herein shall be incorporated herein by reference. The present specification incorporates the contents of the specification of Japanese Patent Application No. 2017-113760, filed on Jun. 8, 2017, from which the present application claims priority, and the contents of the specification and the drawings of Japanese Patent Application No. 2017-198815, filed on Oct. 12, 2017, from which the present application claims priority.

1. Food or Beverage Having Enhanced Sweetness Exhibited by Natural Sugar and High-Intensity Sweetener The present invention provides the following food or beverage (hereinbelow, the food or beverage is referred to as "the food or beverage of the present invention"), as a first aspect.

A food or beverage comprising
(a) a natural sugar in an amount corresponding to a sweetness intensity X1,
(b) a high-intensity sweetener in an amount corresponding to a sweetness intensity X2, and
(c) less than 40 mg/100 ml of sodium,
wherein (1) sweetness having a sweetness intensity X3 is exhibited by the ingredients (a) to (c), and
(2) energy is 50 Kcal/100 ml or less, and
wherein 0.1<(X1+X2)<X3≤20 is satisfied.

That is, in the food or beverage of the present invention, the ingredients providing sweetness are (a) the natural sugar in an amount corresponding to a sweetness intensity X1 and (b) the high-intensity sweetener in an amount corresponding to a sweetness intensity X2, and the sweetness exhibited by the food or beverage of the present invention should correspond to the sum of the sweetness intensities of X1 and X2 in terms of calculation. However, (c) the sodium exists, although at a low concentration, in the food or beverage, and thus the sweetness exhibited by (a) the natural sugar and (b) the high-intensity sweetener is enhanced to the sweetness intensity X3, wherein $0.1<(X1+X2)<X3\leq20$ is satisfied. It is intended that the present invention may contain additional ingredients such as an acidulant, a fragrance, and an extract in addition to these ingredients (a) to (c). However, the food or beverage of the present invention contains no ingredient contributing to the sweetness other than the ingredients (a) to (c).

In the present invention, a "natural sugar", which is represented by the general formula of $C(H_2O)_n$, wherein m and n independently represent a natural number, contains a D-form carbohydrate, digestible by humans. Examples of the D-form carbohydrate include glucose, sucrose, fructose, maltose, oligosaccharides (for example, fructooligosaccharide, maltooligosaccharide, isomaltooligosaccharide, and galactooligosaccharide), isomerized sugars, lactose, psicose, allose, tagatose, and combinations thereof.

Examples of the combination of glucose, sucrose, fructose, maltose, oligosaccharides, isomerized sugars, and lactose include the following. Specifically, the combination includes sucrose and an isomerized sugar, sucrose and glucose, sucrose and fructose, sucrose and maltose, sucrose and an oligosaccharide, sucrose and lactose, an isomerized sugar and an oligosaccharide, sucrose and psicose, sucrose, an isomerized sugar, and glucose, sucrose, an isomerized sugar, and fructose, sucrose, an isomerized sugar, and maltose, sucrose, an isomerized sugar, and an oligosaccharide, sucrose, an isomerized sugar, glucose, and an oligosaccharide, sucrose, glucose, fructose, and an oligosaccharides, and glucose, sucrose, fructose, maltose, an oligosaccharide, an isomerized sugar, lactose, and tagatose.

Natural sugars have high energy, and thus, the major portion of the energy in the requirement (2) of the present invention, "energy is 50 Kcal/100 ml or less", is derived from the natural sugar. According to the present invention, while the concentration of the natural sugar is maintained low and low energy (that is, low calories) is provided, the sweetness is strongly sensed on ingestion due to the combination of the natural sugar, high-intensity sweetener, and sodium. Accordingly, the amount of the sweetness intensity X1 of the natural sugar is an amount that provides 50 Kcal/100 ml or less of energy. The energy of the food or beverage of the present invention may be 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 22 Kcal/100 ml, 0 to 20 Kcal/100 ml, 0 to 15 Kcal/100 ml, 0 to 10 Kcal/100 ml, 0 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 50 Kcal/100 ml, 25 to 45 Kcal/100 ml, 25 to 40 Kcal/100 ml, 25 to 35 Kcal/100 ml, 25 to 30 Kcal/100 ml, 25 to 25 Kcal/100 ml, 25 to 20 Kcal/100 ml, 25 to 15 Kcal/100 ml, 25 to 10 Kcal/100 ml, or 25 to 5 Kcal/100 ml, depending on embodiments. The energy of the food or beverage of the present invention may also be 0 to 32 Kcal/100 ml, 0 to 24 Kcal/100 ml, 0 to 8 Kcal/100 ml, 0 to 4 Kcal/100 ml, 4 to 32 Kcal/100 ml, 4 to 24 Kcal/100 ml, 4 to 8 Kcal/100 ml, 8 to 32 Kcal/100 ml, 8 to 24 Kcal/100 ml, 24 to 32 Kcal/100 ml, depending on embodiments.

Additionally, X1 of "the sweetness intensity X1" may be 0 to 0.5, 0 to 1.0, 0 to 1.5, 0 to 2.0, 0 to 2.5, 0 to 3.0, 0 to 3.5, 0 to 4.0, 0 to 4.5, 0 to 5.0, 0 to 5.5, 0 to 6.0, 0 to 6.5, 0 to 7.0, 0 to 7.5, 0 to 8.0, 0 to 8.25, 0 to 8.5, 0 to 8.75, 0 to 9.0, 0 to 9.25, 0 to 9.5, 0 to 9.75, 0 to 10.0, 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.05 to 6.0, 0.05 to 6.5, 0.05 to 7.0, 0.05 to 7.5, 0.05 to 8.0, 0.05 to 8.25, 0.05 to 8.5, 0.05 to 8.75, 0.05 to 9.0, 0.05 to 9.25, 0.05 to 9.5, 0.05 to 9.75, 0.05 to 10.0, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 6.0, 0.1 to 6.5, 0.1 to 7.0, 0.1 to 7.5, 0.1 to 8.0, 0.1 to 8.25, 0.1 to 8.5, 0.1 to 8.75, 0.1 to 9.0, 0.1 to 9.25, 0.1 to 9.5, 0.1 to 9.75, 0.1 to 10.0, 0.5 to 0.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 0.5 to 6.0, 0.5 to 6.5, 0.5 to 7.0, 0.5 to 7.5, 0.5 to 8.0, 0.5 to 8.25, 0.5 to 8.5, 0.5 to 8.75, 0.5 to 9.0, 0.5 to 9.25, 0.5 to 9.5, 0.5 to 9.75, 0.5 to 10.0, 1.0 to 0.5, 1.0 to 1.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.0 to 6.0, 1.0 to 6.5, 1.0 to 7.0, 1.0 to 7.5, 1.0 to 8.0, 1.0 to 8.25, 1.0 to 8.5, 1.0 to 8.75, 1.0 to 9.0, 1.0 to 9.25, 1.0 to 9.5, 1.0 to 9.75, 1.0 to 10.0, 1.5 to 0.5, 1.5 to 1.0, 1.5 to 1.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 1.5 to 6.0, 1.5 to 6.5, 1.5 to 7.0, 1.5 to 7.5, 1.5 to 8.0, 1.5 to 8.25, 1.5 to 8.5, 1.5 to 8.75, 1.5 to 9.0, 1.5 to 9.25, 1.5 to 9.5, 1.5 to 9.75, 1.5 to 10.0, 2.0 to 0.5, 2.0 to 1.0, 2.0 to 1.5, 2.0 to 2.0, 2.0 to 2.5, 2.0 to 3.0, 2.0 to 3.5, 2.0 to 4.0, 2.0 to 4.5, 2.0 to 5.0, 2.0 to 5.5, 2.0 to 6.0, 2.0 to 6.5, 2.0 to 7.0, 2.0 to 7.5, 2.0 to 8.0, 2.0 to 8.25, 2.0 to 8.5, 2.0 to 8.75, 2.0 to 9.0, 2.0 to 9.25, 2.0 to 9.5, 2.0 to 9.75, 2.0 to 10.0, 2.5 to 0.5, 2.5 to 1.0, 2.5 to 1.5, 2.5 to 2.0, 2.5 to 2.5, 2.5 to 3.0, 2.5 to 3.5, 2.5 to 4.0, 2.5 to 4.5, 2.5 to 5.0, 2.5 to 5.5, 2.5 to 6.0, 2.5 to 6.5, 2.5 to 7.0, 2.5 to 7.5, 2.5 to 8.0, 2.5 to 8.25, 2.5 to 8.5, 2.5 to 8.75, 2.5 to 9.0, 2.5 to 9.25, 2.5 to 9.5, 2.5 to 9.75, or 2.5 to 10.0.

X1 may also be 0 to 10.5, 0 to 11.0, 0 to 11.5, 0 to 12.0, 0 to 12.5, 0 to 13.0, 0 to 13.5, 0 to 14.0, 0 to 14.5, 0 to 15.0, 0.05 to 10.5, 0.05 to 11.0, 0.05 to 11.5, 0.05 to 12.0, 0.05 to 12.5, 0.05 to 13.0, 0.05 to 13.5, 0.05 to 14.0, 0.05 to 14.5, 0.05 to 15.0, 0.1 to 10.5, 0.1 to 11.0, 0.1 to 11.5, 0.1 to 12.0, 0.1 to 12.5, 0.1 to 13.0, 0.1 to 13.5, 0.1 to 14.0, 0.1 to 14.5, 0.1 to 15.0, 0.5 to 10.5, 0.5 to 11.0, 0.5 to 11.5, 0.5 to 12.0, 0.5 to 12.5, 0.5 to 13.0, 0.5 to 13.5, 0.5 to 14.0, 0.5 to 14.5, 0.5 to 15.0, 1.0 to 10.5, 1.0 to 11.0, 1.0 to 11.5, 1.0 to 12.0, 1.0 to 12.5, 1.0 to 13.0, 1.0 to 13.5, 1.0 to 14.0, 1.0 to 14.5, 1.0 to 15.0, 1.5 to 10.5, 1.5 to 11.0, 1.5 to 11.5, 1.5 to 12.0, 1.5 to 12.5, 1.5 to 13.0, 1.5 to 13.5, 1.5 to 14.0, 1.5 to 14.5, 1.5 to 15.0, 2.0 to 10.5, 2.0 to 11.0, 2.0 to 11.5, 2.0 to 12.0, 2.0 to 12.5, 2.0 to 13.0, 2.0 to 13.5, 2.0 to 14.0, 2.0 to 14.5, 2.0 to 15.0, 2.5 to 10.5, 2.5 to 11.0, 2.5 to 11.5, 2.5 to 12.0, 2.5 to 12.5, 2.5 to 13.0, 2.5 to 13.5, 2.5 to 14.0, 2.5 to 14.5, 2.5 to 15.0.

The amount corresponding to the sweetness intensity X1 of the natural sugar refers to an amount (a concentration) that exhibits the sweetness of the sweetness intensity X1 under conditions where the natural sugar is dissolved in water at 20° C. having a volume equivalent to that of the food or beverage of the present invention.

Here, the sweetness intensity means sweetness exhibited by a substance. For example, in the case where the sweetness intensity exhibited by sucrose per unit concentration Brix 1 is defined as a degree of sweetness of 1, glucose has a degree of sweetness of 0.6 to 0.7 (center value: 0.65). A numerical value obtained by multiplying this degree of sweetness by the concentration Brix value of glucose is the sweetness intensity of glucose. Thus, when the concentration of glucose is Brix 1.5, the sweetness intensity of glucose is 0.65×1.5=0.975.

TABLE 1

| Sugar (D-form) | Degree of sweetness |
| --- | --- |
| Sucrose | 1 |
| Glucose | 0.6 to 0.7 |
| Fructose | 1.3 to 1.7 |
| Maltose | 0.4 |
| Fructooligosaccharide | 0.6 |
| Maltooligosaccharide | 0.3 |
| Isomaltooligosaccharide | 0.4 to 0.5 |
| Galactooligosaccharide | 0.7 |
| Isomerized sugar | 0.8 to 0.9 |
| Lactose | 0.2 to 0.3 |
| Psicose | 0.7 |
| Allose | 0.8 |
| Tagatose | 0.9 |

In the present invention, the "high-intensity sweetener" refers to a compound having sweetness more intense than that of sucrose, and may be a naturally occurring compound, a synthetic compound, and a combination of a naturally occurring compound and a synthetic compound. The high-intensity sweetener, in an amount equivalent to sucrose, exhibits sweetness 5 times or more, 10 times or more, 50 times or more, 100 times or more, 500 times or more, 1000 times or more, 5000 times or more, 10000 times or more, 50000 times or more, or 100000 times or more as that of sucrose. The high-intensity sweetener exhibits extremely intense sweetness in this way. When the existence of the natural sugar and high-intensity sweetener in the food or beverage of the present invention is expressed in a weight ratio, "natural sugar:high-intensity sweetener" is 5:1 to 10:1, 50:1 to 100:1, 50:1 to 200:1, 500:1 to 1000:1, 5000:1 to 10000:1, and 50000:1 to 100000:1.

Specific examples of the "high-intensity sweetener" include peptide based sweeteners such as aspartame and neotame, sucrose derivatives such as sucralose, synthetic sweeteners such as acesulfame K and saccharin, protein-based sweeteners extracted from plants such as thaumatin and monellin, or plant extracts containing other high-intensity sweetener ingredients, Stevia extract, Glycyrrhiza extract, and luo han guo (monk fruit) extract and sweetener ingredients in such extracts, glycosides obtained from plant extracts such as steviol glycosides such as Stevia derivatives including enzyme-treated Stevia obtained by treating Stevia extract or Stevia with an enzyme and adding glucose thereto, and mogrol glycosides obtained by treating luo han guo and luo han guo extract. Examples of the steviol glycoside include stevioside, rebaudioside A, rebaudioside B, rebaudioside C, rebaudioside D, rebaudioside N, rebaudioside O, and rebaudioside M. Examples of the mogrol glycoside include mogroside V. However, as a sweetness enhancement effect cannot be obtained by rebaudioside A singly, single rebaudioside A is excluded from the "high-intensity sweeteners" in the present invention.

The Glycyrrhiza extract refers to extract mainly based on glycyrrhizinic acid obtained from roots or root tubers of Glycyrrhiza uralensis, Glycyrrhiza inflata or Glycyrrhiza glabra. Examples of the Glycyrrhiza extract include Glycyrrhiza extract, glycyrrhizin, and licorice extract.

The Sucrose derivatives are obtained by substituting an OH group or a H group of sucrose with another substituent, and examples thereof include halogen derivatives of sucrose (sucralose), oxathiazinone dioxide derivatives, sugar alcohol, aldonic acid, and uronic acid.

In a certain aspect, the high-intensity sweetener is at least one selected from the group consisting of rebaudioside M, rebaudioside D, rebaudioside A, steviol, steviol glycosides, Stevia extract, stevioside, mogroside IV, mogroside V, luo han guo (monk fruit) sweeteners, monatin, curculin, glycyrrhizin, thaumatin, monellin, aspartame, advantame, alitame, saccharin, sodium cyclohexylsulfamate, acesulfame K, sucralose, dulcin, brazzein, neohesperidin dihydrochalcone and combinations thereof.

In the present invention, as the high-intensity sweetener, rebaudioside D, rebaudioside M, or a mixture of rebaudioside D and rebaudioside M can be suitably used. Rebaudioside D or rebaudioside M can be prepared by treating Stevia extract and Stevia with an enzyme and has sweetness about 200 times that of sucrose. Additionally, rebaudioside D or rebaudioside M has less negative flavors such as astringent taste and metallic taste, which are observed in rebaudioside A, and has characteristics of sweetness of a good quality and the like, showing promise for use in the field of foods and beverages (NIPPON KAGAKU KAISHI (5), (1981) 726 to 735, "Sweet diterpene-glycosides of leaves of Stevia rebaudiana Bertoni-Synthesis and structure-sweetness relationship of rebaudiosides-A, -D, -E, and their related glycosides-", Kasai, Kaneda, Tanaka, Yamasaki, Sakamoto, Morimoto, Okada, Kitahata, and Furukawa). In this manner, rebaudioside D or rebaudioside M is excellent, when used singly, in that rebaudioside D or rebaudioside M has less unpleasant taste than rebaudioside A and has sweetness close to that of sucrose. Rebaudioside D and rebaudioside M have a degree of sweetness of about 200.

Further, in the present invention, luo han guo extract or mogroside V can be suitably used as the high-intensity sweetener.

Luo han guo extract as sweetener is an extract of luo han guo containing a sweet substance derived from luo han guo. Luo han guo extract is approved as food additive in different countries including Japan, and is commercially available. Sweet substances derived from luo han guo include mogroside V, mogroside IV, 11-oxo-mogroside V, siamenoside I, etc. Luo han guo extract preferably contains mogroside V, and the content of mogroside V may be, but not limited to, 10 wt % or more, 15 wt % or more, 20 wt % or more, 25 wt % or more, 30 wt % or more, 35 wt % or more, 40 wt % or more, 45 wt % or more, 50 wt % or more, 55 wt % or more, 60 wt % or more, 65 wt % or more, 70 wt % or more, 75 wt % or more, and the like based on the dry weight of entire luo han guo extract. The content of mogroside V may be determined by known method, for instance, by liquid chromatography, etc. Luo han guo extract is obtainable by extracting a fruit and the like of luo han guo (Siraitia grosvenorii) with a suitable solvent (for instance, aqueous solvent such as water, alcohol solvent such ethanol, methanol, etc., mixed solvent of aqueous solvent and alcohol solvent such as hydrous ethanol, hydrous methanol, etc.), and then, optionally, by a treatment such as defatting, purification, concentration, drying, etc.

Mogroside V is one of major mogrol glycosides contained in luo han guo, and reported to show good sweetness properties closer to sucrose compared to rebaudioside A. Further, the degree of sweetness of mogroside V is about 300 times higher than the one of sucrose (Murata Y et al., Nippon Shokuhin Kagaku Kogaku Kaishi Vol. 53, No. 10, 527-533 (2006)). Mogroside V is obtainable from a luo han guo extract (e.g., alcohol extract of luo han guo) by purifying it by chromatography, etc. Mogroside V used as high-intensity sweetener of the present invention may be of high purity, and its purity may be, for example, 80% or more, 85% or more, 90% or more, 91% or more, 92% or more, 93% or more, 94% or more, 95% or more, 96% or more, 97% or more, or 98% or more, and the like. Regarding mogroside V obtained by purifying a luo han guo extract, of course, more the purity is high, less the ingredients of luo han guo extract other than mogroside V are present.

Examples of the combination of high-intensity sweeteners include the following. Specifically, the combination includes rebaudioside D and rebaudioside M; rebaudioside D and rebaudioside A; rebaudioside M and rebaudioside A; rebaudioside M and mogroside V; steviol glycoside and mogroside V; steviol glycoside and advantame; steviol glycoside and acesulfame K; steviol glycoside and sucralose; rebaudioside M, rebaudioside D, and rebaudioside A; rebaudioside M, rebaudioside D, and mogroside V; rebaudioside M, rebaudioside D, and advantame; rebaudioside M, rebaudioside D, and acesulfame K; rebaudioside M, rebaudioside D, and sucralose; rebaudioside A, rebaudioside M, rebaudioside D, and mogroside V; rebaudioside A, rebaudioside M, mogroside V, and sucralose; rebaudioside D, rebaudioside M, mogroside V, and acesulfame K; rebaudioside M, rebaudioside A, mogroside V, and neohesperidin dihydrochalcone; and rebaudioside M, rebaudioside D, sucralose, neohesperidin dihydrochalcone, and brazzein.

The combination also includes rebaudioside D and mogroside V; rebaudioside D and luo han guo extract; rebaudioside M and luo han guo extract; steviol glycoside and luo han guo extract; rebaudioside M, rebaudioside D, and luo han guo extract; rebaudioside A, rebaudioside M, rebaudioside D, and luo han guo extract; rebaudioside A, rebaudioside M, luo han guo extract, and sucralose; rebaudioside D, rebaudioside M, luo han guo extract, and acesulfame K; rebaudioside M, rebaudioside A, luo han guo extract, and neohesperidin dihydrochalcone. Here, when the high-intensity sweetener is rebaudioside A singly, no effect is provided.

X2 of "the sweetness intensity X2" may be 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, 3.0 to 5.5, 2.0 to 6.5, 2.0 to 7.0, 2.0 to 7.5, 2.0 to 6.0, 2.5 to 7.0, 2.5 to 7.5, 2.5 to 6.0, 2.5 to 6.5, 3.0 to 7.5, 3.0 to 6.0, 3.0 to 6.5, 3.0 to 7.0, 3.0 to 8.0, 3.0 to 8.5, 3.0 to 9.0, 3.0 to 9.5, 3.5 to 7.0, 3.5 to 7.5, 3.5 to 8.0, 4.5 to 8.5, 3.5 to 9.0, 3.5 to 9.5, 4.0 to 7.5, 4.0 to 8.0, 4.0 to 8.5, 4.0 to 9.0, 4.0 to 9.5, 3.5 to 8.5, 3.5 to 10.0, 3.5 to 10.5, 3.5 to 11.0, 3.5 to 11.5, or 4.0 to 11.5.

X2 may also be 0.05 to 6.0, 0.05 to 6.5, 0.05 to 7.0, 0.05 to 7.5, 0.05 to 8.0, 0.05 to 8.5, 0.05 to 9.0, 0.05 to 9.5, 0.05 to 10.0, 0.05 to 10.5, 0.05 to 11.0, 0.05 to 11.5, 0.05 to 12.0, 0.05 to 13.0, 0.05 to 14.0, 0.05 to 15.0, 0.05 to 16.0, 0.05 to 17.0, 0.05 to 18.0, 0.5 to 6.0, 0.5 to 6.5, 0.5 to 7.0, 0.5 to 7.5, 0.5 to 8.0, 0.5 to 8.5, 0.5 to 9.0, 0.5 to 9.5, 0.5 to 10.0, 0.5 to 10.5, 0.5 to 11.0, 0.5 to 11.5, 0.5 to 12.0, 0.5 to 13.0, 0.5 to 14.0, 0.5 to 15.0, 0.5 to 16.0, 0.5 to 17.0, 0.5 to 18.0, 1.0 to 6.0, 1.0 to 6.5, 1.0 to 7.0, 1.0 to 7.5, 1.0 to 8.0, 1.0 to 8.5, 1.0 to 9.0, 1.0 to 9.5, 1.0 to 10.0, 1.0 to 10.5, 1.0 to 11.0, 1.0 to 11.5, 1.0 to 12.0, 1.0 to 13.0, 1.0 to 14.0, 1.0 to 15.0, 1.0 to 16.0, 1.0 to 17.0, 1.0 to 18.0, 1.5 to 6.0, 1.5 to 6.5, 1.5 to 7.0, 1.5 to 7.5, 1.5 to 8.0, 1.5 to 8.5, 1.5 to 9.0, 1.5 to 9.5, 1.5 to 10.0, 1.5 to 10.5, 1.5 to 11.0, 1.5 to 11.5, 1.5 to 12.0, 1.5 to 13.0, 1.5 to 14.0, 1.5 to 15.0, 1.5 to 16.0, 1.5 to 17.0, 1.5 to 18.0, 2.0 to 8.0, 2.0 to 8.5, 2.0 to 9.0, 2.0 to 9.5, 2.0 to 10.0, 2.0 to 10.5, 2.0 to 11.0, 2.0 to 11.5, 2.0 to 12.0, 2.0 to 13.0, 2.0 to 14.0, 2.0 to 15.0, 2.0 to 16.0, 2.0 to 17.0, 2.0 to 18.0, 2.5 to 8.0, 2.5 to 8.5, 2.5 to 9.0, 2.5 to 9.5, 2.5 to 10.0, 2.5 to 10.5, 2.5 to 11.0, 2.5 to 11.5, 2.5 to 12.0, 2.5 to 13.0, 2.5 to 14.0, 2.5 to 15.0, 2.5 to 16.0, 2.5 to 17.0, 2.5 to 18.0, 3.0 to 10.0, 3.0 to 10.5, 3.0 to 11.0, 3.0 to 11.5, 3.0 to 12.0, 3.0 to 13.0, 3.0 to 14.0, 3.0 to 15.0, 3.0 to 16.0, 3.0 to 17.0, 3.0 to 18.0, 3.5 to 4.0, 3.5 to 4.5, 3.5 to 5.0, 3.5 to 5.5, 3.5 to 6.0, 3.5 to 6.5, 3.5 to 12.0, 3.5 to 13.0, 3.5 to 14.0, 3.5 to 15.0, 3.5 to 16.0, 3.5 to 17.0, 3.5 to 18.0, 4.0 to 4.5, 4.0 to 5.0, 4.0 to 5.5, 4.0 to 6.0, 4.0 to 6.5, 4.0 to 7.0, 4.0 to 10.0, 4.0 to 10.5, 4.0 to 11.0, 4.0 to 12.0, 4.0 to 13.0, 4.0 to 14.0, 4.0 to 15.0, 4.0 to 16.0, 4.0 to 17.0, or 4.0 to 18.0.

The amount corresponding to the sweetness intensity X2 of the high-intensity sweetener refers to an amount that exhibits the sweetness of the sweetness intensity X2 under conditions where the high-intensity sweetener is dissolved in water at 20° C. having a volume equivalent to that of the food or beverage of the present invention.

The amount of the high-intensity sweetener also may be P2 ppm, wherein P2 ppm is an amount corresponding to the sweetness intensity X2. Here, P2 may take a value of 20 to 550, 25 to 550, 30 to 550, 35 to 550, 40 to 550, 45 to 550, 50 to 550, 55 to 550, 20 to 540, 25 to 540, 30 to 540, 35 to 540, 40 to 540, 45 to 540, 50 to 540, 55 to 540, 20 to 530, 25 to 530, 30 to 530, 35 to 530, 40 to 530, 45 to 530, 50 to 530, 55 to 530, 20 to 520, 25 to 520, 30 to 520, 35 to 520, 40 to 520, 45 to 520, 50 to 520, 55 to 520, 20 to 510, 25 to 510, 30 to 510, 35 to 510, 40 to 510, 45 to 510, 50 to 510, 55 to 510, 20 to 505, 25 to 505, 30 to 505, 35 to 505, 40 to 505, 45 to 505, 50 to 505, 55 to 505, 20 to 500, 25 to 500, 30 to 500, 35 to 500, 40 to 500, 45 to 500, 50 to 500, 55 to 500, 20 to 495, 25 to 495, 30 to 495, 35 to 495, 40 to 495, 45 to 495, 50 to 495, 55 to 495, 20 to 490, 25 to 490, 30 to 490, 35 to 490, 40 to 490, 45 to 490, 50 to 490, or 55 to 490.

P2 may also take a value of 1 to 1500, 1 to 1200, 5 to 1200, 1 to 1000, 5 to 1000, 10 to 1000, 1 to 900, 5 to 900, 10 to 900, 15 to 900, 20 to 900, 25 to 900, 30 to 900, 35 to 900, 40 to 900, 45 to 900, 50 to 900, 55 to 900, 1 to 800, 5 to 800, 10 to 800, 15 to 800, 20 to 800, 25 to 800, 30 to 800, 35 to 800, 40 to 800, 45 to 800, 50 to 800, 55 to 800, 1 to 700, 5 to 700, 10 to 700, 15 to 700, 20 to 700, 25 to 700, 30 to 700, 35 to 700, 40 to 700, 45 to 700, 50 to 700, 55 to 700, 1 to 600, 5 to 600, 10 to 600, 15 to 600, 20 to 600, 25 to 600, 30 to 600, 35 to 600, 40 to 600, 45 to 600, 50 to 600, 55 to 600, 1 to 550, 1 to 540, 1 to 530, 1 to 520, 1 to 510, 1 to 505, 1 to 500, 1 to 495, 1 to 490, 5 to 550, 5 to 540, 5 to 530, 5 to 520, 5 to 510, 5 to 505, 5 to 500, 5 to 495, 5 to 490, 10 to 550, 10 to 540, 10 to 530, 10 to 520, 10 to 510, 10 to 505, 10 to 500, 10 to 495, 10 to 490, 15 to 550, 15 to 550, 15 to 530, 15 to 520, 15 to 510, 15 to 505, 15 to 500, 15 to 495, or 15 to 490.

In one embodiment, P2 satisfies the following formulas:

A-I)

$$N1 \le X1/(225.2 \times P2/10000) \le N1' \text{ and} \quad \text{(Embodiment A)}$$

$$N2 \le X1 + 225.2 \times P2/10000 \le N2'. \quad \text{A-II)}$$

Wherein N1 is any numerical value selected from 0, 0.5, 1, 1.5, 2, 2.5, 3, and 3.5, N1' is any numerical value selected from 5, 5.5, 6, 6.5, 7, 7.5, 8, 8.5, 9, 9.5, 10, 10.5, 11, 11.5, 12, and 12.5, N2 is any numerical value selected from 0.5, 1, 1.5, 2, 2.5, 3, 3.5, 4, 4.5, and 5, and N2' is any numerical value selected from 5, 5.5, 6, 6.5, 7, 7.5, 8, 8.5, 9, 9.5, 10, 10.5, 11, 11.5, 12, and 12.5.

The combination of numerical values N1, N1', N2, and N2' may be any of those described above.

For example, N1, N1', N2, and N2' may take a combination of numerical values as follows, which are merely by way of illustration, without limitation thereto.

A1-I)

$$0 \le X1/(225.2 \times P2/10000) \le 9 \text{ and} \quad \text{(Embodiment A1)}$$

$$2 \le X1 + 225.2 \times P2/10000 \le 11.5. \quad \text{A1-II)}$$

In a certain embodiment, P2 satisfies the following formulas:

A2-I)

$$0 \le X1/(225.2 \times P2/10000) \le 8.17 \text{ and} \quad \text{(Embodiment A2)}$$

$$2 \le X1 + 225.2 \times P2/10000 \le 11.5. \quad \text{A2-II)}$$

In another embodiment, P2 satisfies the following formulas:

A3-I)

$$0 \le X1/(225.2 \times P2/10000) \le 8 \text{ and} \quad \text{(Embodiment A3)}$$

$$2 \le X1 + 225.2 \times P2/10000 \le 11.5. \quad \text{A3-II)}$$

In another embodiment, P2 satisfies the following formulas:

A4-I)

$$0 \le X1/(225.2 \times P2/10000) \le 7 \text{ and} \quad \text{(Embodiment A4)}$$

$$2 \le X1 + 225.2 \times P2/10000 \le 11.0. \quad \text{A4-II)}$$

In still another embodiment, P2 satisfies the following formulas:

A5-I)

$$0 \le X1/(225.2 \times P2/10000) \le 6 \text{ and} \quad \text{(Embodiment A5)}$$

$$2 \le X1 + 225.2 \times P2/10000 \le 11.5. \quad \text{A5-II)}$$

In still another embodiment, P2 satisfies the following formulas:

A6-I)

$$0 \le X1/(225.2 \times P2/10000) \le 5 \text{ and} \quad \text{(Embodiment A6)}$$

$$2 \le X1 + 225.2 \times P2/10000 \le 8. \quad \text{A6-II)}$$

Preferred high-intensity sweetener in Embodiment A (including Embodiments A1-A6) is the one with a coefficient of degree of sweetness of about 225.2, such as rebaudioside D.

In another embodiment, P2 satisfies the following formulas:

B-I)

$$N1 \le X1/(231.0 \times P2/10000) \le N1' \text{ and} \quad \text{(Embodiment B)}$$

$$N2 \le X1 + 231.0 \times P2/10000 \le N2'. \quad \text{B-II)}$$

Wherein N1 is any numerical value selected from 0, 0.5, 1, 1.5, 2, 2.5, 3, and 3.5, N1' is any numerical value selected from 5, 5.5, 6, 6.5, 7, 7.5, 8, 8.5, 9, 9.5, 10, 10.5, 11, 11.5, 12, and 12.5, N2 is any numerical value selected from 0.5, 1, 1.5, 2, 2.5, 3, 3.5, 4, 4.5, and 5, and N2' is any numerical value selected from 5, 5.5, 6, 6.5, 7, 7.5, 8, 8.5, 9, 9.5, 10, 10.5, 11, 11.5, 12, and 12.5.

The combination of numerical values N1, N1', N2, and N2' may be any of those described above.

For example, N1, N1', N2, and N2' may take a combination of numerical values as follows, which are merely by way of illustration, without limitation thereto.

B1-I)

$$0 \le X1/(231.0 \times P2/10000) \le 9 \text{ and} \quad \text{(Embodiment B1)}$$

$$2 \le X1 + 231.0 \times P2/10000 \le 11.5. \quad \text{B1-II)}$$

In a certain embodiment, P2 satisfies the following formulas:

B2-I)

$$0 \le X1/(231.0 \times P2/10000) \le 8.17 \text{ and} \quad \text{(Embodiment B2)}$$

$$2 \le X1 + 231.0 \times P2/10000 \le 11.5. \quad \text{B2-II)}$$

In another embodiment, P2 satisfies the following formulas:

$$0 \leq X1/(231.0 \times P2/10000) \leq 8 \text{ and} \quad \text{(Embodiment B3)} \quad \text{B3-I)}$$

$$2 \leq X1 + 231.0 \times P2/10000 \leq 11.5. \quad \text{B3-II)}$$

In another embodiment, P2 satisfies the following formulas:

$$0 \leq X1/(231.0 \times P2/10000) \leq 7 \text{ and} \quad \text{(Embodiment B4)} \quad \text{B4-I)}$$

$$2 \leq X1 + 231.0 \times P2/10000 \leq 11.0. \quad \text{B4-II)}$$

In still another embodiment, P2 satisfies the following formulas:

$$0 \leq X1/(231.0 \times P2/10000) \leq 6 \text{ and} \quad \text{(Embodiment B5)} \quad \text{B5-I)}$$

$$2 \leq X1 + 231.0 \times P2/10000 \leq 11.5. \quad \text{B5-II)}$$

In still another embodiment, P2 satisfies the following formulas:

$$0 \leq X1/(231.0 \times P2/10000) \leq 5 \text{ and} \quad \text{B6-I)}$$

$$2 \leq X1 + 231.0 \times P2/10000 \leq 8 \text{(Embodiment } B6\text{)}. \quad \text{B6-II)}$$

Preferred high-intensity sweetener in Embodiment B (including Embodiments B1-B6) is the one with a coefficient of degree of sweetness of about 231.0, such as rebaudioside M.

In another embodiment, P2 satisfies the following formulas:

$$N1 \leq X1/(133.4 \times P2/10000) \leq N1' \text{ and} \quad \text{C-I)}$$

$$N2 \leq X1 + 133.4 \times P2/10000 \leq N2' \text{(Embodiment } C\text{)}. \quad \text{C-II)}$$

Wherein N1 is any numerical value selected from 0, 0.5, 1, 1.5, 2, 2.5, 3, and 3.5, N1' is any numerical value selected from 5, 5.5, 6, 6.5, 7, 7.5, 8, 8.5, 9, 9.5, 10, 10.5, 11, 11.5, 12, 12.5, 20, 30, 40, 50, 75, 100, 125, 150, 175, 200, 210, 250, and 300, N2 is any numerical value selected from 0.5, 1, 1.5, 2, 2.5, 3, 3.5, 4, 4.5, and 5, and N2' is any numerical value selected from 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, and 17.

The combination of numerical values N1, N1', N2, and N2' may be any of those described above.

For example, N1, N1', N2, and N2' may take a combination of numerical values as follows, which are merely by way of illustration, without limitation thereto.

$$0 \leq X1/(133.4 \times P2/10000) \leq 250 \text{ and} \quad \text{C1-I)}$$

$$2 \leq X1 + 133.4 \times P2/10000 < 16 \text{(Embodiment } C1\text{)}. \quad \text{C1-II)}$$

In a certain embodiment, P2 satisfies the following formulas:

$$0 \leq X1/(133.4 \times P2/10000) \leq 210 \text{ and} \quad \text{C2-I)}$$

$$2 \leq X1 + 133.4 \times P2/10000 < 16 \text{(Embodiment } C2\text{)}. \quad \text{C2-II)}$$

In another embodiment, P2 satisfies the following formulas:

$$0 \leq X1/(133.4 \times P2/10000) \leq 200 \text{ and} \quad \text{C3-I)}$$

$$2 \leq X1 + 133.4 \times P2/10000 < 16 \text{(Embodiment } C3\text{)}. \quad \text{C3-II)}$$

In another embodiment, P2 satisfies the following formulas:

$$0 \leq X1/(133.4 \times P2/10000) \leq 150 \text{ and} \quad \text{C4-I)}$$

$$2 \leq X1 + 133.4 \times P2/10000 \leq 14.0 \text{(Embodiment } C4\text{)}. \quad \text{C4-II)}$$

In still another embodiment, P2 satisfies the following formulas:

$$0 \leq X1/(133.4 \times P2/10000) \leq 100 \text{ and} \quad \text{C5-I)}$$

$$2 \leq X1 + 133.4 \times P2/10000 < 16 \text{(Embodiment } C5\text{)}. \quad \text{C5-II)}$$

In still another embodiment, P2 satisfies the following formulas:

$$0 \leq X1/(133.4 \times P2/10000) \leq 50 \text{ and} \quad \text{C6-I)}$$

$$2 \leq X1 + 133.4 \times P2/10000 \leq 12 \text{(Embodiment } C6\text{)}. \quad \text{C6-II)}$$

Preferred high-intensity sweetener in Embodiment C (including Embodiments C1-C6) is the one with a coefficient of degree of sweetness of about 133.4, such as luo han guo extract.

In one embodiment, P2 satisfies the following formulas:

$$N1 \leq X1/(269.7 \times P2/10000) \leq N1' \text{ and} \quad \text{D-I)}$$

$$N2 \leq X1 + 269.7 \times P2/10000 \leq N2' \text{(Embodiment } D\text{)}. \quad \text{D-II)}$$

Wherein N1 is any numerical value selected from 0, 0.5, 1, 1.5, 2, 2.5, 3, and 3.5, N1' is any numerical value selected from 5, 5.5, 6, 6.5, 7, 7.5, 8, 8.5, 9, 9.5, 10, 10.5, 11, 11.5, 12, and 12.5, N2 is any numerical value selected from 0.5, 1, 1.5, 2, 2.5, 3, 3.5, 4, 4.5, and 4, and N2' is any numerical value selected from 5, 5.5, 6, 6.5, 7, 7.5, 8, 8.5, 9, 9.5, 10, 10.5, 11, 11.5, 12, and 12.5.

The combination of numerical values N1, N1', N2, and N2' may be any of those described above.

For example, N1, N1', N2, and N2' may take a combination of numerical values as follows, which are merely by way of illustration, without limitation thereto.

$$0 \leq X1/(269.7 \times P2/10000) \leq 9 \text{ and} \qquad \text{D1-I}$$

$$2 \leq X1 + 269.7 \times P2/10000 \leq 11.5 \text{(Embodiment } D1). \qquad \text{D1-II}$$

In a certain embodiment, P2 satisfies the following formulas:

$$0 \leq X1/(269.7 \times P2/10000) \leq 8.17 \text{ and} \qquad \text{D2-I}$$

$$2 \leq X1 + 269.7 \times P2/10000 \leq 11.5 \text{(Embodiment } D2). \qquad \text{D2-II}$$

In another embodiment, P2 satisfies the following formulas:

$$0 \leq X1/(269.7 \times P2/10000) \leq 8 \text{ and} \qquad \text{D3-I}$$

$$2 \leq X1 + 269.7 \times P2/10000 \leq 11.5 \text{(Embodiment } D3). \qquad \text{D3-II}$$

In another embodiment, P2 satisfies the following formulas:

$$0 \leq X1/(269.7 \times P2/10000) \leq 7 \text{ and} \qquad \text{D4-I}$$

$$2 \leq X1 + 269.7 \times P2/10000 \leq 11.0 \text{(Embodiment } D4). \qquad \text{D4-II}$$

In still another embodiment, P2 satisfies the following formulas:

$$0 \leq X1/(269.7 \times P2/10000) \leq 6 \text{ and} \qquad \text{D5-I}$$

$$2 \leq X1 + 269.7 \times P2/10000 \leq 11.5 \text{(Embodiment } D5). \qquad \text{D5-II}$$

In still another embodiment, P2 satisfies the following formulas:

$$0 \leq X1/(269.7 \times P2/10000) \leq 5 \text{ and} \qquad \text{D6-I}$$

$$2 \leq X1 + 269.7 \times P2/10000 \leq 8 \text{(Embodiment } D6). \qquad \text{D6-II}$$

Preferred high-intensity sweetener in Embodiment D (including Embodiments D1-D6) is the one with a coefficient of degree of sweetness of about 269.7, such as rebaudioside D.

The present invention contains (c) less than 40 mg/100 ml of sodium, which means that the amount of sodium atoms is less than 40 mg/100 ml. The amount of sodium may be the amount of 0.1 to 40 mg/100 ml, 0.1 to 35 mg/100 ml, 0.1 to 30 mg/100 ml, 0.1 to 25 mg/100 ml, 0.1 to 20 mg/100 ml, 0.1 to 19 mg/100 ml, 0.1 to 18 mg/100 ml, 0.1 to 17 mg/100 ml, 0.1 to 16 mg/100 ml, 0.1 to 15 mg/100 ml, 0.1 to 14 mg/100 ml, 0.1 to 13 mg/100 ml, 0.1 to 12 mg/100 ml, 0.1 to 11 mg/100 ml, 0.1 to 10 mg/100 ml, 1 to 40 mg/100 ml, 1 to 35 mg/100 ml, 1 to 30 mg/100 ml, 1 to 25 mg/100 ml, 1 to 20 mg/100 ml, 1 to 19 mg/100 ml, 1 to 18 mg/100 ml, 1 to 17 mg/100 ml, 1 to 16 mg/100 ml, 1 to 15 mg/100 ml, 1 to 14 mg/100 ml, 1 to 13 mg/100 ml, 1 to 12 mg/100 ml, 1 to 11 mg/100 ml, 1 to 10 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 40 mg/100 ml, 15 to 35 mg/100 ml, 15 to 30 mg/100 ml, 15 to 25 mg/100 ml, or 15 to 20 mg/100 ml, depending on embodiments.

The amount of sodium may be the amount of 0.1 to 22 mg/100 ml, 0.1 to 21 mg/100 ml, 1 to 22 mg/100 ml, 1 to 21 mg/100 ml, 4 to 40 mg/100 ml, 4 to 35 mg/100 ml, 4 to 34 mg/100 ml, 4 to 33 mg/100 ml, 4 to 32 mg/100 ml, 4 to 31 mg/100 ml, 4 to 30 mg/100 ml, 4 to 29 mg/100 ml, 4 to 26 mg/100 ml, 4 to 25 mg/100 ml, 4 to 22 mg/100 ml, 4 to 21 mg/100 ml, 4 to 20 mg/100 ml, 4 to 19 mg/100 ml, 4 to 18 mg/100 ml, 4 to 17 mg/100 ml, 4 to 16 mg/100 ml, 4 to 15 mg/100 ml, 4 to 14 mg/100 ml, 4 to 13 mg/100 ml, 4 to 12 mg/100 ml, 4 to 11 mg/100 ml, 4 to 10 mg/100 ml, 5 to 34 mg/100 ml, 5 to 33 mg/100 ml, 5 to 32 mg/100 ml, 5 to 31 mg/100 ml, 5 to 29 mg/100 ml, 5 to 22 mg/100 ml, 5 to 21 mg/100 ml, 10 to 34 mg/100 ml, 10 to 33 mg/100 ml, 10 to 32 mg/100 ml, 10 to 31 mg/100 ml, 10 to 29 mg/100 ml, 10 to 22 mg/100 ml, 10 to 21 mg/100 ml, 11.5 to 34 mg/100 ml, 11.5 to 33 mg/100 ml, 11.5 to 32 mg/100 ml, 11.5 to 31 mg/100 ml, 11.5 to 30 mg/100 ml, 11.5 to 29 mg/100 ml, 11.5 to 22 mg/100 ml, 11.5 to 21 mg/100 ml, 11.5 to 20 mg/100 ml, 11.5 to 19 mg/100 ml, 11.5 to 18 mg/100 ml, 11.5 to 17 mg/100 ml, 11.5 to 16 mg/100 ml, 11.5 to 15 mg/100 ml, 11.5 to 14 mg/100 ml, 11.5 to 13 mg/100 ml, 11.5 to 12 mg/100 ml, 5.75 to 34.5 mg/100 ml, 5.75 to 28.75 mg/100 ml, 5.75 to 23 mg/100 ml, 5.75 to 17.25 mg/100 ml, 5.75 to 11.5 mg/100 ml, 11.5 to 34.5 mg/100 ml, 11.5 to 28.75 mg/100 ml, 11.5 to 23 mg/100 ml, 11.5 to 17.25 mg/100 ml, 17.25 to 34.5 mg/100 ml, 17.25 to 28.75 mg/100 ml, 17.25 to 23 mg/100 ml, 23 to 34.5 mg/100 ml, 23 to 28.75 mg/100 ml, or 28.75 to 34.5 mg/100 ml, depending on embodiments.

So-called sports drinks generally contain an amount of sodium of more than 40 mg/100 ml.

Forms of sodium is not particularly limited provided that sodium in an ingestible state is contained in the food or beverage of the present invention, and may be in at least one form selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof, for example.

The food or beverage of the present invention exhibits the sweetness of the sweetness intensity X3, as already described. The sweetness of the food or beverage of the present invention can be evaluated by sensory-trained panelists. For specific measurement conditions in this case, reference can be made to examples described later. Also in this case, food or beverage standards (for example, sucrose water), which will be the standards of sweetness, are prepared, and the sucrose concentration as the sweetness intensity, such as 1, 2, 3, 4, 5, 6, 7, 8, 9, 10, 12, 13, 14, and 15, is assigned to each of the standards. Then, panelists compare the sweetness of the food or beverage of the present invention with the sweetness of the food or beverage standards to enable the sweetness of the food or beverage of the present invention to be measured.

Additionally, in the above measurement, from the food or beverage standards having less sweetness than the food or beverage of the present invention, the food or beverage standard having sweetness closest to that of the food or beverage of the present invention is selected. The selected food or beverage standard is adjusted so as to exhibit the same sweetness as the food or beverage of the present invention by adding sucrose to the selected food or beverage standard. In this case, it is possible to measure the sweetness intensity X3 of the food or beverage of the present invention from the amount of sucrose contained in the adjusted food or beverage standard.

As another method for measuring the sweetness of the food or beverage of the present invention, sweetness intensity evaluation using the Visual Analogue Scale (VAS method) can be exemplified. With respect to the VAS method, reference can be made to literatures such as J. Jpn. Soc. Stomatognath. Funct. (2014) 20 pp. 115-129 ("Construction of a Screening Test for Gustatory Function in Four Basic Tastes" Toyota, et al.). Specifically, in measurement of the sweetness intensity according to the VAS method, for example, an evaluator defines the lower limit of the sweetness intensity as "not sweet at all" and the upper limit as "nothing sweeter than this could be imagined". By means of a sheet of paper on which a vertical straight line having marks representing sweetness intensities is drawn, the evaluator evaluates the sweetness intensity the evaluator felt at the time by representing the intensity as a point on the straight line.

The sweetness intensity $X3$ to be measured here has the following relation with the sweetness intensity $X1$ of the natural sugar and the sweetness intensity $X2$ of the high-intensity sweetener: $0.1<(X1+X2)<X3\leq 20$. Wherein $X3$ may be 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, or 10.5 to 12.5. $X3$ may also be 4.0 to 18, 4.0 to 16, 4.0 to 15.5, 4.0 to 14, 4.5 to 18, 4.5 to 16, 4.5 to 15.5, 4.5 to 14, 5.0 to 18, 5.0 to 16, 5.0 to 15.5, 5.0 to 14, 5.5 to 18, 5.5 to 16, 5.5 to 15.5, 5.5 to 14, 6.0 to 18, 6.0 to 16, 6.0 to 15.5, 6.0 to 14, 6.5 to 18, 6.5 to 16, 6.5 to 15.5, 6.5 to 14, 7.0 to 18, 7.0 to 16, 7.0 to 15.5, 7.0 to 14, 7.5 to 18, 7.5 to 16, 7.5 to 15.5, 7.5 to 14, 7.5 to 9, 7.5 to 8, 8.0 to 18, 8.0 to 18, 8.0 to 16, 8.0 to 15.5, 8.0 to 14, 8.5 to 18, 8.5 to 16, 8.5 to 15.5, 8.5 to 14, 9.0 to 18, 9.0 to 16, 9.0 to 15.5, 9.0 to 14, 9.5 to 18, 9.5 to 16, 9.5 to 15.5, 9.5 to 14, 10.0 to 18, 10.0 to 16, 10.0 to 15.5, 10.5 to 18, 10.5 to 16, or 10.5 to 15.5.

Furthermore, in the relation among X1, X2, and X3, 0.5 $\{X3-(X1+X2)\}\leq 10$, 0.5 $\{X3-(X1+X2)\}\leq 9$, 0.5 $\{X3-(X1+X2)\}\leq 8$, 0.5 $\{X3-(X1+X2)\}\leq 7$, 0.5 $\{X3-(X1+X2)\}\leq 6$, 0.5 $\{X3-(X1+X2)\}\leq 5$, 0.5 $\{X3-(X1+X2)\}\leq 4$, 0.5 $\{X3-(X1+X2)\}$ 3, 1 $\{X3-(X1+X2)\}$ 10, 1 $\{X3-(X1+X2)\}$ 9, 1 $\{X3-(X1+X2)\}$ 8, 1 $\{X3-(X1+X2)\}\leq 7$, 1 $\{X3-(X1+X2)\}\leq 6$, 1 $\{X3-(X1+X2)\}\leq 5$, 1 $\{X3-(X1+X2)\}\leq 4$, 1 $\{X3-(X1+X2)\}\leq 3$, 2 $\{X3-(X1+X2)\}\leq 10$, 2 $\{X3-(X1+X2)\}\leq 9$, 2 $\{X3-(X1+X2)\}$ 8, 2 $\{X3-(X1+X2)\}$ 7, 2 $\{X3-(X1+X2)\}$ 6, 2 $\{X3-(X1+X2)\}\leq 5$, 2 $\{X3-(X1+X2)\}\leq 4$, 2 $\{X3-(X1+X2)\}\leq 3$, 3 $\{X3-(X1+X2)\}\leq 10$, $3\leq\{X3-(X1+X2)\}$ 9, $3\leq\{X3-(X1+X2)\}$ 8, 3 $\{X3-(X1+X2)\}$ 7, $3\leq\{X3-(X1+X2)\}\leq 6$, 3 $\{X3-(X1+X2)\}\leq 5$, or 3 $\{X3-(X1+X2)\}\leq 4$ may be satisfied.

In a certain embodiment, the food or beverage of the present invention comprises
(a) a natural sugar in an amount corresponding to a sweetness intensity of 0.1 to 5,
(b) a high-intensity sweetener in an amount corresponding to a sweetness intensity of 0.1 to 3, and
(c) less than 40 mg/100 ml of sodium,
wherein (1) sweetness having a sweetness intensity of 5.5 to 12.5 is exhibited by the ingredients (a) to (c), and
(2) energy is 50 Kcal/100 ml or less, and
wherein $0.1<(X1+X2)<X3\leq 12.5$ is satisfied.

In another embodiment, the food or beverage of the present invention comprises
(a) a natural sugar in an amount corresponding to a sweetness intensity of 3 to 5,
(b) a high-intensity sweetener in an amount corresponding to a sweetness intensity of 1 to 3, and
(c) 5 to 25 mg/100 ml of sodium,
wherein (1) sweetness having a sweetness intensity of 5.5 to 12.5 is exhibited by the ingredients (a) to (c), and
(2) energy is 0 to 40 Kcal/100 ml, and
wherein $0.1<(X1+X2)<X3\leq 12.5$ is satisfied.

In the food or beverage of the present invention, the sweetness intensity X1 of the natural sugar, the sweetness intensity X2 of the high-intensity sweetener, the amount of sodium, the sweetness intensity X3 exhibited by the food or beverage, and the energy of the food or beverage may take any value provided that the relation: $0.1<(X1+X2)<X3\leq 20$ is satisfied, and it is also possible to combine any of the numerical values of the sweetness intensity X1, the sweetness intensity X2, the amount of sodium, the sweetness intensity X3, and the energy as shown below, for example.

"The sweetness intensity X1": 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"The sweetness intensity X2": 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"The amount of sodium": 0.1 to 40 mg/100 ml, 0.1 to 35 mg/100 ml, 0.1 to 30 mg/100 ml, 0.1 to 25 mg/100 ml, 0.1 to 20 mg/100 ml, 0.1 to 19 mg/100 ml, 0.1 to 18 mg/100 ml, 0.1 to 17 mg/100 ml, 0.1 to 16 mg/100 ml, 0.1 to 15 mg/100 ml, 0.1 to 14 mg/100 ml, 0.1 to 13 mg/100 ml, 0.1 to 12 mg/100 ml, 0.1 to 11 mg/100 ml, 0.1 to 10 mg/100 ml, 1 to 40 mg/100 ml, 1 to 35 mg/100 ml, 1 to 30 mg/100 ml, 1 to 25 mg/100 ml, 1 to 20 mg/100 ml, 1 to 19 mg/100 ml, 1 to 18 mg/100 ml, 1 to 17 mg/100 ml, 1 to 16 mg/100 ml, 1 to 15 mg/100 ml, 1 to 14 mg/100 ml, 1 to 13 mg/100 ml, 1 to 12 mg/100 ml, 1 to 11 mg/100 ml, 1 to 10 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 40 mg/100 ml, 15 to 35 mg/100 ml, 15 to 30 mg/100 ml, 15 to 25 mg/100 ml, or 15 to 20 mg/100 ml.

"The sweetness intensity X3": 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, or 10.5 to 12.5.

The energy: 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 50 Kcal/100 ml, 25 to 45 Kcal/100 ml, 25 to 40 Kcal/100 ml, 25 to 35 Kcal/100 ml, or 25 to 30 Kcal/100 ml.

Further, in the food or beverage of the present invention, the sweetness intensity X1 of the natural sugar, the sweetness intensity X2 of the high-intensity sweetener, the amount of sodium, the sweetness intensity X3 exhibited by the food or beverage, and the energy of the food or beverage are not limited to the combination of values exemplified above. It is possible to combine any of the numerical values of the sweetness intensity X1, the sweetness intensity X2, the amount of sodium, the sweetness intensity X3, and the energy as shown herein, provided that the relation: $0.1<(X1+X2)<X3 \leq 20$ is satisfied.

In a particular embodiment, the present invention provides the following food or beverage (hereinbelow, referred to as "Food or Beverage A of the present invention").

A food or beverage comprising
(a) a natural sugar in an amount corresponding to a sweetness intensity X1,
(b) a high-intensity sweetener selected from the group consisting of rebaudioside M, rebaudioside D and a combination thereof in an amount corresponding to a sweetness intensity X2, and
(c) 4 to 26 mg/100 ml of sodium,
wherein (1) sweetness having a sweetness intensity X3 is exhibited by the ingredients (a) to (c), and
(2) energy is 25 Kcal/100 ml or less, and
wherein $0.1<(X1+X2)<X3 \leq 20$ is satisfied.

Preferred ranges of sweetness intensity X1, of sweetness intensity X2, of amount of sodium, of sweetness intensity X3, of concentration of high-intensity sweetener P2 and of energy in Food or Beverage A of the present invention, are as shown below, for example. These values may be combined in any way, provided that the relation: $0.1<(X1+X2)<X3 \leq 20$ is satisfied.

"Sweetness intensity X1": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.05 to 6.0, 0.05 to 6.5, 0.05 to 7.0, 0.05 to 7.5, 0.05 to 8.0, 0.05 to 8.25, 0.05 to 8.5, 0.05 to 8.75, 0.05 to 9.0, 0.05 to 9.25, 0.05 to 9.5, 0.05 to 9.75, 0.05 to 10.0, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 6.0, 0.1 to 6.5, 0.1 to 7.0, 0.1 to 7.5, 0.1 to 8.0, 0.1 to 8.25, 0.1 to 8.5, 0.1 to 8.75, 0.1 to 9.0, 0.1 to 9.25, 0.1 to 9.5, 0.1 to 9.75, 0.1 to 10.0, 0.5 to 0.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 0.5 to 6.0, 0.5 to 6.5, 0.5 to 7.0, 0.5 to 7.5, 0.5 to 8.0, 0.5 to 8.25, 0.5 to 8.5, 0.5 to 8.75, 0.5 to 9.0, 0.5 to 9.25, 0.5 to 9.5, 0.5 to 9.75, 0.5 to 10.0, 1.0 to 0.5, 1.0 to 1.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.0 to 6.0, 1.0 to 6.5, 1.0 to 7.0, 1.0 to 7.5, 1.0 to 8.0, 1.0 to 8.25, 1.0 to 8.5, 1.0 to 8.75, 1.0 to 9.0, 1.0 to 9.25, 1.0 to 9.5, 1.0 to 9.75, 1.0 to 10.0, 1.5 to 0.5, 1.5 to 1.0, 1.5 to 1.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 1.5 to 6.0, 1.5 to 6.5, 1.5 to 7.0, 1.5 to 7.5, 1.5 to 8.0, 1.5 to 8.25, 1.5 to 8.5, 1.5 to 8.75, 1.5 to 9.0, 1.5 to 9.25, 1.5 to 9.5, 1.5 to 9.75, 1.5 to 10.0, 2.0 to 0.5, 2.0 to 1.0, 2.0 to 1.5, 2.0 to 2.0, 2.0 to 2.5, 2.0 to 3.0, 2.0 to 3.5, 2.0 to 4.0, 2.0 to 4.5, 2.0 to 5.0, 2.0 to 5.5, 2.0 to 6.0, 2.0 to 6.5, 2.0 to 7.0, 2.0 to 7.5, 2.0 to 8.0, 2.0 to 8.25, 2.0 to 8.5, 2.0 to 8.75, 2.0 to 9.0, 2.0 to 9.25, 2.0 to 9.5, 2.0 to 9.75, 2.0 to 10.0, 2.5 to 0.5, 2.5 to 1.0, 2.5 to 1.5, 2.5 to 2.0, 2.5 to 2.5, 2.5 to 3.0, 2.5 to 3.5, 2.5 to 4.0, 2.5 to 4.5, 2.5 to 5.0, 2.5 to 5.5, 2.5 to 6.0, 2.5 to 6.5, 2.5 to 7.0, 2.5 to 7.5, 2.5 to 8.0, 2.5 to 8.25, 2.5 to 8.5, 2.5 to 8.75, 2.5 to 9.0, 2.5 to 9.25, 2.5 to 9.5, 2.5 to 9.75, 2.5 to 10.0. More preferably, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"Sweetness intensity X2": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, 3.0 to 5.5, 2.0 to 6.5, 2.0 to 7.0, 2.0 to 7.5, 2.0 to 6.0, 2.5 to 7.0, 2.5 to 7.5, 2.5 to 6.0, 2.5 to 6.5, 3.0 to 6.0, 3.0 to 6.5, 3.0 to 7.0, 3.0 to 7.5, 3.0 to 8.0, 3.0 to 8.5, 3.0 to 9.0, 3.0 to 9.5, 3.5 to 7.0, 3.5 to 7.5, 3.5 to 8.0, 4.5 to 8.5, 3.5 to 9.0, 3.5 to 9.5, 4.0 to 7.5, 4.0 to 8.0, 4.0 to 8.5, 4.0 to 9.0, 4.0 to 9.5, 3.5 to 8.5, 3.5 to 10.0, 3.5 to 10.5, 3.5 to 11.0, 3.5 to 11.5, 4.0 to 11.5, 0.05 to 6.0, 0.05 to 6.5, 0.05 to 7.0, 0.05 to 7.5, 0.05 to 8.0, 0.05 to 8.5, 0.05 to 9.0, 0.05 to 9.5, 0.05 to 10.0, 0.05 to 10.5, 0.05 to 11.0, 0.05 to 11.5, 0.5 to 6.0, 0.5 to 6.5, 0.5 to 7.0, 0.5 to 7.5, 0.5 to 8.0, 0.5 to 8.5, 0.5 to 9.0, 0.5 to 9.5, 0.5 to 10.0, 0.5 to 10.5, 0.5 to 11.0, 0.5 to 11.5, 1.0 to 6.0, 1.0 to 6.5, 1.0 to 7.0, 1.0 to 7.5, 1.0 to 8.0, 1.0 to 8.5, 1.0 to 9.0, 1.0 to 9.5, 1.0 to 10.0, 1.0 to 10.5, 1.0 to 11.0, 1.0 to 11.5, 1.5 to 6.0, 1.5 to 6.5, 1.5 to 7.0, 1.5 to 7.5, 1.5 to 8.0, 1.5 to 8.5, 1.5 to 9.0, 1.5 to 9.5, 1.5 to 10.0, 1.5 to 10.5, 1.5 to 11.0, 1.5 to 11.5, 2.0 to 8.0, 2.0 to 8.5, 2.0 to 9.0, 2.0 to 9.5, 2.0 to 10.0, 2.0 to 10.5, 2.0 to 11.0, 2.0 to 11.5, 2.5 to 8.0, 2.5 to 8.5, 2.5 to 9.0, 2.5 to 9.5, 2.5 to 10.0, 2.5 to 10.5, 2.5 to 11.0, 2.5 to 11.5, 3.0 to 10.0, 3.0 to 10.5, 3.0 to 11.0, 3.0 to 11.5, 3.5 to 4.0, 3.5 to 4.5, 3.5 to 5.0, 3.5 to 5.5, 3.5 to 6.0, 3.5 to 6.5, 4.0 to 4.5, 4.0 to 5.0, 4.0 to 5.5, 4.0 to 6.0, 4.0 to 6.5, 4.0 to 7.0, 4.0 to 10.0, 4.0 to 10.5, or 4.0 to 11.00 More preferably, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"Amount of sodium": 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 25 mg/100 ml, 15 to 20 mg/100 ml, 4 to 26 mg/100 ml, 4 to 25 mg/100 ml, 4 to 20 mg/100 ml, 4 to 19 mg/100 ml, 4 to 18 mg/100 ml, 4 to 17 mg/100 ml, 4 to 16 mg/100 ml, 4 to 15 mg/100 ml, 4 to 14 mg/100 ml, 4 to 13 mg/100 ml, 4 to 12 mg/100 ml, 4 to 11 mg/100 ml, or 4 to 10 mg/100 ml.

"Sweetness intensity X3": 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, or 10.5 to 12.5.

"Amount of high-intensity sweetener P2 (ppm)": 20 to 550, 25 to 550, 30 to 550, 35 to 550, 40 to 550, 45 to 550, 50 to 550, 55 to 550, 20 to 540, 25 to 540, 30 to 540, 35 to 540, 40 to 540, 45 to 540, 50 to 540, 55 to 540, 20 to 530, 25 to 530, 30 to 530, 35 to 530, 40 to 530, 45 to 530, 50 to 530, 55 to 530, 20 to 520, 25 to 520, 30 to 520, 35 to 520, 40 to 520, 45 to 520, 50 to 520, 55 to 520, 20 to 510, 25 to 510, 30 to 510, 35 to 510, 40 to 510, 45 to 510, 50 to 510, 55 to 510, 20 to 505, 25 to 505, 30 to 505, 35 to 505, 40 to 505, 45 to 505, 50 to 505, 55 to 505, 20 to 500, 25 to 500, 30 to 500, 35 to 500, 40 to 500, 45 to 500, 50 to 500, 55 to 500, 20 to 495, 25 to 495, 30 to 495, 35 to 495, 40 to 495, 45 to 495, 50 to 495, 55 to 495, 20 to 490, 25 to 490, 30 to 490, 35 to 490, 40 to 490, 45 to 490, 50 to 490, or 55 to 490.

Energy: 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 25 Kcal/100 ml, 5 to 20 Kcal/100 ml, 5 to 15 Kcal/100 ml, 5 to 10 Kcal/100 ml, 10 to 25 Kcal/100 ml, 10 to 20 Kcal/100 ml, 10 to 15 Kcal/100 ml, 15 to 25 Kcal/00 ml, 15 to 20 Kcal/100 ml, 20 to 25 Kcal/100 ml, 0 to 24 Kcal/100 ml, 0 to 8 Kcal/100 ml, 0 to 4 Kcal/100 ml, 4 to 24 Kcal/100 ml, 4 to 8 Kcal/100 ml, 8 to 24 Kcal/100 ml.

The sweetness intensity X1 and the concentration of high-intensity sweetener P2 (ppm) in Food or Beverage A of the present invention preferably satisfy the formula of Embodiment A above (including Embodiments A1-A6) or of Embodiment B (including Embodiments B1-B6). In Food or Beverage A of the present invention, natural sugar (including examples of the combinations of glucose, sucrose, fructose, maltose, oligosaccharides, isomerized sugars, and lactose) and the form of sodium are the same as the definitions described in the section of food or beverage of the present invention.

In another embodiment, the present invention provides the following food or beverage (hereinbelow, referred to as "Food or Beverage B of the present invention").

A food or beverage comprising
  (a) a natural sugar in an amount corresponding to a sweetness intensity X1,
  (b) a luo han guo extract in an amount corresponding to a sweetness intensity X2, and
  (c) 4 mg/100 ml or more and less than 34.5 mg/100 ml of sodium,
  wherein (1) sweetness having a sweetness intensity X3 is exhibited by the ingredients (a) to (c), and
  (2) energy is 50 Kcal/100 ml or less, and
  wherein $0.1 < (X1+X2) < X3 \leq 20$ is satisfied.

Preferred ranges of sweetness intensity X1, of sweetness intensity X2, of amount of sodium, of sweetness intensity X3, of concentration of luo han guo extract P2 and of energy in Food or Beverage B of the present invention, are as shown below, for example. These values may be combined in any way, provided that the relation: $0.1 < (X1+X2) < X3 \leq 20$ is satisfied.

"Sweetness intensity X1": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.05 to 6.0, 0.05 to 6.5, 0.05 to 7.0, 0.05 to 7.5, 0.05 to 8.0, 0.05 to 8.25, 0.05 to 8.5, 0.05 to 8.75, 0.05 to 9.0, 0.05 to 9.25, 0.05 to 9.5, 0.05 to 9.75, 0.05 to 10.0, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 6.0, 0.1 to 6.5, 0.1 to 7.0, 0.1 to 7.5, 0.1 to 8.0, 0.1 to 8.25, 0.1 to 8.5, 0.1 to 8.75, 0.1 to 9.0, 0.1 to 9.25, 0.1 to 9.5, 0.1 to 9.75, 0.1 to 10.0, 0.5 to 0.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 0.5 to 6.0, 0.5 to 6.5, 0.5 to 7.0, 0.5 to 7.5, 0.5 to 8.0, 0.5 to 8.25, 0.5 to 8.5, 0.5 to 8.75, 0.5 to 9.0, 0.5 to 9.25, 0.5 to 9.5, 0.5 to 9.75, 0.5 to 10.0, 1.0 to 0.5, 1.0 to 1.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.0 to 6.0, 1.0 to 6.5, 1.0 to 7.0, 1.0 to 7.5, 1.0 to 8.0, 1.0 to 8.25, 1.0 to 8.5, 1.0 to 8.75, 1.0 to 9.0, 1.0 to 9.25, 1.0 to 9.5, 1.0 to 9.75, 1.0 to 10.0, 1.0 to 0.5, 1.5 to 1.0, 1.5 to 1.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 1.5 to 6.0, 1.5 to 6.5, 1.5 to 7.0, 1.5 to 7.5, 1.5 to 8.0, 1.5 to 8.25, 1.5 to 8.5, 1.5 to 8.75, 1.5 to 9.0, 1.5 to 9.25, 1.5 to 9.5, 1.5 to 9.75, 1.5 to 10.0, 2.0 to 0.5, 2.0 to 1.0, 2.0 to 1.5, 2.0 to 2.0, 2.0 to 2.5, 2.0 to 3.0, 2.0 to 3.5, 2.0 to 4.0, 2.0 to 4.5, 2.0 to 5.0, 2.0 to 5.5, 2.0 to 6.0, 2.0 to 6.5, 2.0 to 7.0, 2.0 to 7.5, 2.0 to 8.0, 2.0 to 8.25, 2.0 to 8.5, 2.0 to 8.75, 2.0 to 9.0, 2.0 to 9.25, 2.0 to 9.5, 2.0 to 9.75, 2.0 to 10.0, 2.5 to 0.5, 2.5 to 1.0, 2.5 to 1.5, 2.5 to 2.0, 2.5 to 2.5, 2.5 to 3.0, 2.5 to 3.5, 2.5 to 4.0, 2.5 to 4.5, 2.5 to 5.0, 2.5 to 5.5, 2.5 to 6.0, 2.5 to 6.5, 2.5 to 7.0, 2.5 to 7.5, 2.5 to 8.0, 2.5 to 8.25, 2.5 to 8.5, 2.5 to 8.75, 2.5 to 9.0, 2.5 to 9.25, 2.5 to 9.5, 2.5 to 9.75, 2.5 to 10.0, 0 to 10.5, 0 to 11.0, 0 to 11.5, 0 to 12.0, 0 to 12.5, 0 to 13.0, 0 to 13.5, 0 to 14.0, 0 to 14.5, 0 to 15.0, 0.05 to 10.5, 0.05 to 11.0, 0.05 to 11.5, 0.05 to 12.0, 0.05 to 12.5, 0.05 to 13.0, 0.05 to 13.5, 0.05 to 14.0, 0.05 to 14.5, 0.05 to 15.0, 0.1 to 10.5, 0.1 to 11.0, 0.1 to 11.5, 0.1 to 12.0, 0.1 to 12.5, 0.1 to 13.0, 0.1 to 13.5, 0.1 to 14.0, 0.1 to 14.5, 0.1 to 15.0, 0.5 to 10.5, 0.5 to 11.0, 0.5 to 11.5, 0.5 to 12.0, 0.5 to 12.5, 0.5 to 13.0, 0.5 to 13.5, 0.5 to 14.0, 0.5 to 14.5, 0.5 to 15.0, 1.0 to 10.5, 1.0 to 11.0, 1.0 to 11.5, 1.0 to 12.0, 1.0 to 12.5, 1.0 to 13.0, 1.0 to 13.5, 1.0 to 14.0, 1.0 to 14.5, 1.0 to 15.0, 1.5 to 10.5, 1.5 to 11.0, 1.5 to 11.5, 1.5 to 12.0, 1.5 to 12.5, 1.5 to 13.0, 1.5 to 13.5, 1.5 to 14.0, 1.5 to 14.5, 1.5 to 15.0, 2.0 to 10.5, 2.0 to 11.0, 2.0 to 11.5, 2.0 to 12.0, 2.0 to 12.5, 2.0 to 13.0, 2.0 to 13.5, 2.0 to 14.0, 2.0 to 14.5, 2.0 to 15.0, 2.5 to 10.5, 2.5 to 11.0, 2.5 to 11.5, 2.5 to 12.0, 2.5 to 12.5, 2.5 to 13.0, 2.5 to 13.5, 2.5 to 14.0, 2.5 to 14.5, or 2.5 to 15.0. More preferably 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"Sweetness intensity X2": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, 3.0 to 5.5, 2.0 to 6.5, 2.0 to 7.0, 2.0 to 7.5, 2.0 to 6.0, 2.0 to 6.5, 2.0 to 7.0, 2.0 to 7.5, 2.5 to 7.0, 2.5 to 7.5, 2.5 to 6.0, 2.5 to 6.5, 2.5 to 7.0, 2.5 to 7.5, 3.0 to 7.5, 3.0 to 6.0, 3.0 to 6.5, 3.0 to 7.0, 3.0 to 7.5, 3.0 to 8.0, 3.0 to 8.5, 3.0 to 9.0, 3.0 to 9.5, 3.5 to 7.0, 3.5 to 7.5, 3.5 to 8.0, 4.5 to 8.5, 3.5 to 9.0, 3.5 to 9.5, 4.0 to 7.5, 4.0 to 8.0, 4.0 to 8.5, 4.0 to 9.0, 4.0 to 9.5, 3.5 to 8.5, 3.5 to 9.0, 3.5 to 9.5, 3.5 to 10.0, 3.5 to 10.5, 3.5 to 11.0, 3.5 to 11.5, 4.0 to 11.5, 0.05 to 6.0, 0.05 to 6.5, 0.05 to 7.0, 0.05 to 7.5, 0.05 to 8.0, 0.05 to 8.5, 0.05 to 9.0, 0.05 to 9.5, 0.05 to 10.0, 0.05 to 10.5, 0.05 to 11.0, 0.05 to 11.5, 0.05 to 12.0, 0.05 to 13.0, 0.05 to 14.0, 0.05 to 15.0, 0.05 to 16.0, 0.05 to 17.0, 0.05 to 18.0, 0.5 to 6.0, 0.5 to 6.5, 0.5 to 7.0, 0.5 to 7.5, 0.5 to 8.0, 0.5 to 8.5, 0.5 to 9.0, 0.5 to 9.5, 0.5 to 10.0, 0.5 to 10.5, 0.5 to 11.0, 0.5 to 11.5, 0.5 to 12.0, 0.5 to 13.0, 0.5 to 14.0, 0.5 to 15.0, 0.5 to 16.0, 0.5 to 17.0, 0.5 to 18.0, 1.0 to 6.0, 1.0 to 6.5, 1.0 to 7.0, 1.0 to 7.5, 1.0 to 8.0, 1.0 to 8.5, 1.0 to 9.0, 1.0 to 9.5, 1.0 to 10.0, 1.0 to 10.5, 1.0 to 11.0, 1.0 to 11.5, 1.0 to 12.0, 1.0 to 13.0, 1.0 to 14.0, 1.0 to 15.0, 1.0 to 16.0, 1.0 to 17.0, 1.0 to 18.0, 1.5 to 6.0, 1.5 to 6.5, 1.5 to 7.0, 1.5 to 7.5, 1.5 to 8.0, 1.5 to 8.5, 1.5 to 9.0, 1.5 to 9.5, 1.5 to 10.0, 1.5 to 10.5, 1.5 to 11.0, 1.5 to 11.5, 1.5 to 12.0, 1.5 to 13.0, 1.5 to 14.0, 1.5 to 15.0, 1.5 to 16.0, 1.5 to 17.0, 1.5 to 18.0, 2.0 to 8.0, 2.0 to 8.5, 2.0 to 9.0, 2.0 to 9.5, 2.0 to 10.0, 2.0 to 10.5, 2.0 to 11.0, 2.0 to 11.5, 2.0 to 12.0, 2.0 to 13.0, 2.0 to 14.0, 2.0 to 15.0, 2.0 to 16.0, 2.0 to 17.0, 2.0 to 18.0, 2.5 to 8.0, 2.5 to 8.5, 2.5 to 9.0, 2.5 to 9.5, 2.5 to 10.0, 2.5 to 10.5, 2.5 to 11.0, 2.5 to 11.5, 2.5 to 12.0, 2.5 to 13.0, 2.5 to 14.0, 2.5 to 15.0, 2.5 to 16.0, 2.5 to 17.0, 2.5 to 18.0, 3.0 to 10.0, 3.0 to 10.5, 3.0 to 11.0, 3.0 to 11.5, 3.0 to 12.0, 3.0 to 13.0, 3.0 to 14.0, 3.0 to 15.0, 3.0 to 16.0, 3.0 to 17.0, 3.0 to 18.0, 3.5 to 4.0, 3.5 to 4.5, 3.5 to 5.0, 3.5 to 5.5, 3.5 to 6.0, 3.5 to 6.5, 3.5 to 12.0, 3.5 to 13.0, 3.5 to 14.0, 3.5 to 15.0, 3.5 to 16.0, 3.5 to 17.0, 3.5 to 18.0, 4.0 to 4.5, 4.0 to 5.0, 4.0 to 5.5, 4.0 to 6.0, 4.0 to 6.5, 4.0 to 7.0, 4.0 to 10.0, 4.0 to 10.5, 4.0 to 11.0, 4.0 to 12.0, 4.0 to 13.0, 4.0 to 14.0, 4.0 to 15.0, 4.0 to 16.0, 4.0 to 17.0, or 4.0 to 18.0. More preferably, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"Amount of sodium": 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 30 mg/100 ml, 15 to 25 mg/100 ml, 15 to 20 mg/100 ml, 4 to 34 mg/100 ml, 4 to 33 mg/100 ml, 4 to 32 mg/100 ml, 4 to 31 mg/100 ml, 4 to 30 mg/100 ml, 4 to 29 mg/100 ml, 4 to 26 mg/100 ml, 4 to 25 mg/100 ml, 4 to 22 mg/100 ml, 4 to 21 mg/100 ml, 4 to 20 mg/100 ml, 4 to 19 mg/100 ml, 4 to 18 mg/100 ml, 4 to 17 mg/100 ml, 4 to 16 mg/100 ml, 4 to 15 mg/100 ml, 4 to 14 mg/100 ml, 4 to 13 mg/100 ml, 4 to 12 mg/100 ml, 4 to 11 mg/100 ml, 4 to 10 mg/100 ml, 5 to 34 mg/100 ml, 5 to 33 mg/100 ml, 5 to 32 mg/100 ml, 5 to 31 mg/100 ml, 5 to 29 mg/100 ml, 5 to 22 mg/100 ml, 5 to 21 mg/100 ml, 10 to 34 mg/100 ml, 10 to 33 mg/100 ml, 10 to 32 mg/100 ml, 10 to 31 mg/100 ml, 10 to 29 mg/100 ml, 10 to 22 mg/100 ml, 10 to 21 mg/100 ml, 11.5 to 34 mg/100 ml, 11.5 to 33 mg/100 ml, 11.5 to 32 mg/100 ml, 11.5 to 31 mg/100 ml, 11.5 to 30 mg/100 ml, 11.5 to 29 mg/100 ml, 11.5 to 22 mg/100 ml, 11.5 to 21 mg/100 ml, 11.5 to 20 mg/100 ml, 11.5 to 19 mg/100 ml, 11.5 to 18 mg/100 ml, 11.5 to 17 mg/100 ml, 11.5 to 16 mg/100 ml, 11.5 to 15 mg/100 ml, 11.5 to 14 mg/100 ml, 11.5 to 13 mg/100 ml, 11.5 to 12 mg/100 ml, 5.75 to 28.75 mg/100 ml, 5.75 to 23 mg/100 ml, 5.75 to 17.25 mg/100 ml, 5.75 to 11.5 mg/100 ml, 11.5 to 28.75 mg/100 ml, 11.5 to 23 mg/100 ml, 11.5 to 17.25 mg/100 ml, 17.25 to 28.75 mg/100 ml, 17.25 to 23 mg/100 ml, 23 to 28.75 mg/100 ml.

"Sweetness intensity X3": 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, 10.5 to 12.5, 4.0 to 18, 4.0 to 16, 4.0 to 15.5, 4.0 to 14, 4.5 to 18, 4.5 to 16, 4.5 to 15.5, 4.5 to 14, 5.0 to 18, 5.0 to 16, 5.0 to 15.5, 5.0 to 14, 5.5 to 18, 5.5 to 16, 5.5 to 15.5, 5.5 to 14, 6.0 to 18, 6.0 to 16, 6.0 to 15.5, 6.0 to 14, 6.5 to 18, 6.5 to 16, 6.5 to 15.5, 6.5 to 14, 7.0 to 18, 7.0 to 16, 7.0 to 15.5, 7.0 to 14, 7.5 to 18, 7.5 to 16, 7.5 to 15.5, 7.5 to 14, 7.5 to 9, 7.5 to 8, 8.0 to 18, 8.0 to 16, 8.0 to 15.5, 8.0 to 14, 8.5 to 18, 8.5 to 16, 8.5 to 15.5, 8.5 to 14, 9.0 to 18, 9.0 to 16, 9.0 to 15.5, 9.0 to 14, 9.5 to 18, 9.5 to 16, 9.5 to 15.5, 9.5 to 14, 10.0 to 18, 10.0 to 16, 10.0 to 15.5, 10.5 to 18, 10.5 to 16, or 10.5 to 15.5.

"Amount of luo han guo extract P2 (ppm)": 20 to 550, 25 to 550, 30 to 550, 35 to 550, 40 to 550, 45 to 550, 50 to 550, 55 to 550, 20 to 540, 25 to 540, 30 to 540, 35 to 540, 40 to 540, 45 to 540, 50 to 540, 55 to 540, 20 to 530, 25 to 530, 30 to 530, 35 to 530, 40 to 530, 45 to 530, 50 to 530, 55 to 530, 20 to 520, 25 to 520, 30 to 520, 35 to 520, 40 to 520, 45 to 520, 50 to 520, 55 to 520, 20 to 510, 25 to 510, 30 to 510, 35 to 510, 40 to 510, 45 to 510, 50 to 510, 55 to 510, 20 to 505, 25 to 505, 30 to 505, 35 to 505, 40 to 505, 45 to 505, 50 to 505, 55 to 505, 20 to 500, 25 to 500, 30 to 500, 35 to 500, 40 to 500, 45 to 500, 50 to 500, 55 to 500, 20 to 495, 25 to 495, 30 to 495, 35 to 495, 40 to 495, 45 to 495, 50 to 495, 55 to 495, 20 to 490, 25 to 490, 30 to 490, 35 to 490, 40 to 490, 45 to 490, 50 to 490, 55 to 490, 1 to 1500, 1 to 1200, 5 to 1200, 1 to 1000, 5 to 1000, 10 to 1000, 1 to 900, 5 to 900, 10 to 900, 15 to 900, 20 to 900, 25 to 900, 30 to 900, 35 to 900, 40 to 900, 45 to 900, 50 to 900, 55 to 900, 1 to 800, 5 to 800, 10 to 800, 15 to 800, 20 to 800, 25 to 800, 30 to 800, 35 to 800, 40 to 800, 45 to 800, 50 to 800, 55 to 800, 1 to 700, 5 to 700, 10 to 700, 15 to 700, 20 to 700, 25 to 700, 30 to 700, 35 to 700, 40 to 700, 45 to 700, 50 to 700, 55 to 700, 1 to 600, 5 to 600, 10 to 600, 15 to 600, 20 to 600, 25 to 600, 30 to 600, 35 to 600, 40 to 600, 45 to 600, 50 to 600, 55 to 600, 1 to 550, 1 to 540, 1 to 530, 1 to 520, 1 to 510, 1 to 505, 1 to 500, 1 to 495, 1 to 490, 5 to 550, 5 to 540, 5 to 530, 5 to 520, 5 to 510, 5 to 505, 5 to 500, 5 to 495, 5 to 490, 10 to 550, 10 to 540, 10 to 530, 10 to 520, 10 to 510, 10 to 505, 10 to 500, 10 to 495, 10 to 490, 15 to 550, 15 to 540, 15 to 530, 15 to 520, 15 to 510, 15 to 505, 15 to 500, 15 to 495, or 15 to 490.

Energy: 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 50 Kcal/100 ml, 25 to 45 Kcal/100 ml, 25 to 40 Kcal/100 ml, 25 to 35 Kcal/100 ml, 25 to 30 Kcal/100 ml, 0 to 32 Kcal/100 ml, 0 to 24 Kcal/100 ml, 0 to 8 Kcal/100 ml, 0 to 4 Kcal/100 ml, 4 to 32 Kcal/100 ml, 4 to 24 Kcal/100 ml, 4 to 8 Kcal/100 ml, 8 to 32 Kcal/100 ml, 8 to 24 Kcal/100 ml, or 24 to 32 Kcal/100 ml.

The sweetness intensity X1 and the concentration of luo han guo extract P2 (ppm) in Food or Beverage B of the present invention preferably satisfy the formula of Embodiment C above (including Embodiments C1-C6). In Food or Beverage B of the present invention, natural sugar (including examples of the combinations of glucose, sucrose, fructose, maltose, oligosaccharides, isomerized sugars, and lactose) and the form of sodium are the same as the definitions described in the section of food or beverage of the present invention.

In another embodiment, the present invention provides the following food or beverage (hereinbelow, referred to as "Food or Beverage C of the present invention").

A food or beverage comprising
(a) a natural sugar in an amount corresponding to a sweetness intensity X1,
(b) mogroside V in an amount corresponding to a sweetness intensity X2, and
(c) 4 mg/100 ml or more and less than 23 mg/100 ml of sodium,
wherein (1) sweetness having a sweetness intensity X3 is exhibited by the ingredients (a) to (c), and
(2) energy is 50 Kcal/100 ml or less, and
wherein 0.1<(X1+X2)<X3≤20 is satisfied.

Preferred ranges of sweetness intensity X1, of sweetness intensity X2, of amount of sodium, of sweetness intensity X3, of concentration of mogroside V P2 and of energy in Food or Beverage C of the present invention, are as shown below, for example. These values may be combined in any way, provided that the relation: 0.1<(X1+X2)<X3≤20 is satisfied.

"Sweetness intensity X1": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.05 to 6.0, 0.05 to 6.5, 0.05 to 7.0, 0.05 to 7.5, 0.05 to 8.0, 0.05 to 8.25, 0.05 to 8.5, 0.05 to 8.75, 0.05 to 9.0, 0.05 to 9.25, 0.05 to 9.5, 0.05 to 9.75, 0.05 to 10.0, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 6.0, 0.1 to 6.5, 0.1 to 7.0, 0.1 to 7.5, 0.1 to 8.0, 0.1 to 8.25, 0.1 to 8.5, 0.1 to 8.75, 0.1 to 9.0, 0.1 to 9.25, 0.1 to 9.5, 0.1 to 9.75, 0.1 to 10.0, 0.5 to 0.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 0.5 to 6.0, 0.5 to 6.5, 0.5 to 7.0, 0.5 to 7.5, 0.5 to 8.0, 0.5 to 8.25, 0.5 to 8.5, 0.5 to 8.75, 0.5 to 9.0, 0.5 to 9.25, 0.5 to 9.5, 0.5 to 9.75, 0.5 to 10.0, 1.0 to 0.5, 1.0 to 1.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.0 to 6.0, 1.0 to 6.5, 1.0 to 7.0, 1.0 to 7.5, 1.0 to 8.0, 1.0 to 8.25, 1.0 to 8.5, 1.0 to 8.75, 1.0 to 9.0, 1.0 to 9.25, 1.0 to 9.5, 1.0 to 9.75, 1.0 to 10.0, 1.5 to 0.5, 1.5 to 1.0, 1.5 to 1.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 1.5 to 6.0, 1.5 to 6.5, 1.5 to 7.0, 1.5 to 7.5, 1.5 to 8.0, 1.5 to 8.25, 1.5 to 8.5, 1.5 to 8.75, 1.5 to 9.0, 1.5 to 9.25, 1.5 to 9.5, 1.5 to 9.75, 1.5 to 10.0, 2.0 to 0.5, 2.0 to 1.0, 2.0 to 1.5, 2.0 to 2.0, 2.0 to 2.5, 2.0 to 3.0, 2.0 to 3.5, 2.0 to 4.0, 2.0 to 4.5, 2.0 to 5.0, 2.0 to 5.5, 2.0 to 6.0, 2.0 to 6.5, 2.0 to 7.0, 2.0 to 7.5, 2.0 to 8.0, 2.0 to 8.25, 2.0 to 8.5, 2.0 to 8.75, 2.0 to 9.0, 2.0 to 9.25, 2.0 to 9.5, 2.0 to 9.75, 2.0 to 10.0, 2.5 to 0.5, 2.5 to 1.0, 2.5 to 1.5, 2.5 to 2.0, 2.5 to 2.5, 2.5 to 3.0, 2.5 to 3.5, 2.5 to 4.0, 2.5 to 4.5, 2.5 to 5.0, 2.5 to 5.5, 2.5 to 6.0, 2.5 to 6.5, 2.5 to 7.0, 2.5 to 7.5, 2.5 to 8.0, 2.5 to 8.25, 2.5 to 8.5, 2.5 to 8.75, 2.5 to 9.0, 2.5 to 9.25, 2.5 to 9.5, 2.5 to 9.75, 2.5 to 10.0, 0 to 10.5, 0 to 11.0, 0 to 11.5, 0 to 12.0, 0 to 12.5, 0 to 13.0, 0 to 13.5, 0 to 14.0, 0 to 14.5, 0 to 15.0, 0.05 to 10.5, 0.05 to 11.0, 0.05 to 11.5, 0.05 to 12.0, 0.05 to 12.5, 0.05 to 13.0, 0.05 to 13.5, 0.05 to 14.0, 0.05 to 14.5, 0.05 to 15.0, 0.1 to 10.5, 0.1 to 11.0, 0.1 to 11.5, 0.1 to 12.0, 0.1 to 12.5, 0.1 to 13.0, 0.1 to 13.5, 0.1 to 14.0, 0.1 to 14.5, 0.1 to 15.0, 0.5 to 10.5, 0.5 to 11.0, 0.5 to 11.5, 0.5 to 12.0, 0.5 to 12.5, 0.5 to 13.0, 0.5 to 13.5, 0.5 to 14.0, 0.5 to 14.5, 0.5 to 15.0, 1.0 to 10.5, 1.0 to 11.0, 1.0 to 11.5, 1.0 to 12.0, 1.0 to 12.5, 1.0 to 13.0, 1.0 to 13.5, 1.0 to 14.0, 1.0 to 14.5, 1.0 to 15.0, 1.5 to 10.5, 1.5 to 11.0, 1.5 to 11.5, 1.5 to 12.0, 1.5 to 12.5, 1.5 to 13.0, 1.5 to 13.5, 1.5 to 14.0, 1.5 to 14.5, 1.5 to 15.0, 2.0 to 10.5, 2.0 to 11.0, 2.0 to 11.5, 2.0 to 12.0, 2.0 to 12.5, 2.0 to 13.0, 2.0 to 13.5, 2.0 to 14.0, 2.0 to 14.5, 2.0 to 15.0, 2.5 to 10.5, 2.5 to 11.0, 2.5 to 11.5, 2.5 to 12.0, 2.5 to 12.5, 2.5 to 13.0, 2.5 to 13.5, 2.5 to 14.0, 2.5 to 14.5, or 2.5 to 15.0. More preferably 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"Sweetness intensity X2": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, 3.0 to 5.5, 2.0 to 6.5, 2.0 to 7.0, 2.0 to 7.5, 2.0 to 6.0, 2.0 to 6.5, 2.0 to 7.0, 2.0 to 7.5, 2.5 to 7.0, 2.5 to 7.5, 2.5 to 6.0, 2.5 to 6.5, 2.5 to 7.0, 2.5 to 7.5, 3.0 to 7.5, 3.0 to 6.0, 3.0 to 6.5, 3.0 to 7.0, 3.0 to 7.5, 3.0 to 8.0, 3.0 to 8.5, 3.0 to 9.0, 3.0 to 9.5, 3.5 to 7.0, 3.5 to 7.5, 3.5 to 8.0, 4.5 to 8.5, 3.5 to 9.0, 3.5 to 9.5, 4.0 to 7.5, 4.0 to 8.0, 4.0 to 8.5, 4.0 to 9.0, 4.0 to 9.5, 3.5 to 8.5, 3.5 to 9.0, 3.5 to 9.5, 3.5 to 10.0, 3.5 to 10.5, 3.5 to 11.0, 3.5 to 11.5, 4.0 to 11.5, 0.05 to 6.0, 0.05 to 6.5, 0.05 to 7.0, 0.05 to 7.5, 0.05 to 8.0, 0.05 to 8.5, 0.05 to 9.0, 0.05 to 9.5, 0.05 to 10.0, 0.05 to 10.5, 0.05 to 11.0, 0.05 to 11.5, 0.05 to 12.0, 0.05 to 13.0, 0.05 to 14.0, 0.05 to 15.0, 0.05 to 16.0, 0.05 to 17.0, 0.05 to 18.0, 0.5 to 6.0, 0.5 to 6.5, 0.5 to 7.0, 0.5 to 7.5, 0.5 to 8.0, 0.5 to 8.5, 0.5 to 9.0, 0.5 to 9.5, 0.5 to 10.0, 0.5 to 10.5, 0.5 to 11.0, 0.5 to 11.5, 0.5 to 12.0, 0.5 to 13.0, 0.5 to 14.0, 0.5 to 15.0, 0.5 to 16.0, 0.5 to 17.0, 0.5 to 18.0, 1.0 to 6.0, 1.0 to 6.5, 1.0 to 7.0, 1.0 to 7.5, 1.0 to 8.0, 1.0 to 8.5, 1.0 to 9.0, 1.0 to 9.5, 1.0 to 10.0, 1.0 to 10.5, 1.0 to 11.0, 1.0 to 11.5, 1.0 to 12.0, 1.0 to 13.0, 1.0 to 14.0, 1.0 to 15.0, 1.0 to 16.0, 1.0 to 17.0, 1.0 to 18.0, 1.5 to 6.0, 1.5 to 6.5, 1.5 to 7.0, 1.5 to 7.5, 1.5 to 8.0, 1.5 to 8.5, 1.5 to 9.0, 1.5 to 9.5, 1.5 to 10.0, 1.5 to 10.5, 1.5 to 11.0, 1.5 to 11.5, 1.5 to 12.0, 1.5 to 13.0, 1.5 to 14.0, 1.5 to 15.0, 1.5 to 16.0, 1.5 to 17.0, 1.5 to 18.0, 2.0 to 8.0, 2.0 to 8.5, 2.0 to 9.0, 2.0 to 9.5, 2.0 to 10.0, 2.0 to 10.5, 2.0 to 11.0, 2.0 to 11.5, 2.0 to 12.0, 2.0 to 13.0, 2.0 to 14.0, 2.0 to 15.0, 2.0 to 16.0, 2.0 to 17.0, 2.0 to 18.0, 2.5 to 8.0, 2.5 to 8.5, 2.5 to 9.0, 2.5 to 9.5, 2.5 to 10.0, 2.5 to 10.5, 2.5 to 11.0, 2.5 to 11.5, 2.5 to 12.0, 2.5 to 13.0, 2.5 to 14.0, 2.5 to 15.0, 2.5 to 16.0, 2.5 to 17.0, 2.5 to 18.0, 3.0 to 10.0, 3.0 to 10.5, 3.0 to 11.0, 3.0 to 11.5, 3.0 to 12.0, 3.0 to 13.0, 3.0 to 14.0, 3.0 to 15.0, 3.0 to 16.0, 3.0 to 17.0, 3.0 to 18.0, 3.5 to 4.0, 3.5 to 4.5, 3.5 to 5.0, 3.5 to 5.5, 3.5 to 6.0, 3.5 to 6.5, 3.5 to 12.0, 3.5 to 13.0, 3.5 to 14.0, 3.5 to 15.0, 3.5 to 16.0, 3.5 to 17.0, 3.5 to 18.0, 4.0 to 4.5, 4.0 to 5.0, 4.0 to 5.5, 4.0 to 6.0, 4.0 to 6.5, 4.0 to 7.0, 4.0 to 10.0, 4.0 to 10.5, 4.0 to 11.0, 4.0 to 12.0, 4.0 to 13.0, 4.0 to 14.0, 4.0 to 15.0, 4.0 to 16.0, 4.0 to 17.0, or 4.0 to 18.0. More preferably 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"Amount of sodium": 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 20 mg/100 ml, 4 to 22 mg/100 ml, 4 to 21 mg/100 ml, 4 to 20 mg/100 ml, 4 to 19 mg/100 ml, 4 to 18 mg/100 ml, 4 to 17 mg/100 ml, 4 to 16 mg/100 ml, 4 to 15 mg/100 ml, 4 to 14 mg/100 ml, 4 to 13 mg/100 ml, 4 to 12 mg/100 ml, 4 to 11 mg/100 ml, 4 to 10 mg/100 ml, 5 to 22 mg/100 ml, 5 to 21 mg/100 ml, 10 to 22 mg/100 ml, 10 to 21 mg/100 ml, 11.5 to 22 mg/100 ml, 11.5 to 21 mg/100 ml, 11.5 to 20 mg/100 ml, 11.5 to 19 mg/100 ml, 11.5 to 18 mg/100 ml, 11.5 to 17 mg/100 ml, 11.5 to 16 mg/100 ml, 11.5 to 15 mg/100 ml, 11.5 to 14 mg/100 ml, 11.5 to 13 mg/100 ml, 11.5 to 12 mg/100 ml, 5.75 to 17.25 mg/100 ml, 5.75 to 11.5 mg/100 ml, or 11.5 to 17.25 mg/100 ml.

"Sweetness intensity X3": 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, 10.5 to 12.5, 4.0 to 18, 4.0 to 16, 4.0 to 15.5, 4.0 to 14, 4.5 to 18, 4.5 to 16, 4.5 to 15.5, 4.5 to 14, 5.0 to 18, 5.0 to 16, 5.0 to 15.5, 5.0 to 14, 5.5 to 18, 5.5 to 16, 5.5 to 15.5, 5.5 to 14, 6.0 to 18, 6.0 to 16, 6.0 to 15.5, 6.0 to 14, 6.5 to 18, 6.5 to 16, 6.5 to 15.5, 6.5 to 14, 7.0 to 18, 7.0 to 16, 7.0 to 15.5, 7.0 to 14, 7.5 to 18, 7.5 to 16, 7.5 to 15.5, 7.5 to 14, 7.5 to 9, 7.5 to 8, 8.0 to 18, 8.0 to 16, 8.0 to 15.5, 8.0 to 14, 8.5 to 18, 8.5 to 16, 8.5 to 15.5, 8.5 to 14, 9.0 to 18, 9.0 to 16, 9.0 to 15.5, 9.0 to 14, 9.5 to 18, 9.5 to 16, 9.5 to 15.5, 9.5 to 14, 10.0 to 18, 10.0 to 16, 10.0 to 15.5, 10.5 to 18, 10.5 to 16, or 10.5 to 15.5.

"Amount of mogroside V P2 (ppm)": 20 to 550, 25 to 550, 30 to 550, 35 to 550, 40 to 550, 45 to 550, 50 to 550, 55 to 550, 20 to 540, 25 to 540, 30 to 540, 35 to 540, 40 to 540, 45 to 540, 50 to 540, 55 to 540, 20 to 530, 25 to 530, 30 to 530, 35 to 530, 40 to 530, 45 to 530, 50 to 530, 55 to 530, 20 to 520, 25 to 520, 30 to 520, 35 to 520, 40 to 520, 45 to 520, 50 to 520, 55 to 520, 20 to 510, 25 to 510, 30 to 510, 35 to 510, 40 to 510, 45 to 510, 50 to 510, 55 to 510, 20 to 505, 25 to 505, 30 to 505, 35 to 505, 40 to 505, 45 to 505, 50 to 505, 55 to 505, 20 to 500, 25 to 500, 30 to 500, 35 to 500, 40 to 500, 45 to 500, 50 to 500, 55 to 500, 20 to 495, 25 to 495, 30 to 495, 35 to 495, 40 to 495, 45 to 495, 50 to 495, 55 to 495, 20 to 490, 25 to 490, 30 to 490, 35 to 490, 40 to 490, 45 to 490, 50 to 490, 55 to 490, 1 to 700, 5 to 700, 10 to 700, 15 to 700, 20 to 700, 25 to 700, 30 to 700, 35 to 700, 40 to 700, 45 to 700, 50 to 700, 55 to 700, 1 to 600, 5 to 600, 10 to 600, 15 to 600, 20 to 600, 25 to 600, 30 to 600, 35 to 600, 40 to 600, 45 to 600, 50 to 600, 55 to 600, 1 to 550, 1 to 540, 1 to 530, 1 to 520, 1 to 510, 1 to 505, 1 to 500, 1 to 495, 1 to 490, 5 to 550, 5 to 540, 5 to 530, 5 to 520, 5 to 510, 5 to 505, 5 to 500, 5 to 495, 5 to 490, 10 to 550, 10 to 540, 10 to 530, 10 to 520, 10 to 510, 10 to 505, 10 to 500, 10 to 495, 10 to 490, 15 to 550, 15 to 550, 15 to 530, 15 to 520, 15 to 510, 15 to 505, 15 to 500, 15 to 495, or 15 to 490.

Energy: 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 50 Kcal/100 ml, 25 to 45 Kcal/100 ml, 25 to 40 Kcal/100 ml, 25 to 35 Kcal/100 ml, 25 to 30 Kcal/100 ml, 0 to 32 Kcal/100 ml, 0 to 24 Kcal/100 ml, 0 to 8 Kcal/100 ml, 0 to 4 Kcal/100 ml, 4 to 32 Kcal/100 ml, 4 to 24 Kcal/100 ml, 4 to 8 Kcal/100 ml, 8 to 32 Kcal/100 ml, 8 to 24 Kcal/100 ml, or 24 to 32 Kcal/100 ml.

The sweetness intensity X1 and the concentration of mogroside V P2 (ppm) in Food or Beverage C of the present invention preferably satisfy the formula of Embodiment D above (including Embodiments D1-D6). In Food or Beverage C of the present invention, natural sugar (including examples of the combinations of glucose, sucrose, fructose, maltose, oligosaccharides, isomerized sugars, and lactose) and the form of sodium are the same as the definitions described in the section of food or beverage of the present invention.

In the present invention, the "food or beverage" includes solids, fluids, liquid, and mixtures thereof and is a generic name of orally-ingestible ones. Examples of the food or beverage of the present invention include nutritional supplement foods and beverages, health foods and beverages, functional foods and beverages, foods and beverages for infants, infant milk formulas, premature infant milk formulas, and geriatric foods and beverages.

Nutritional supplement foods and beverages refer to foods and beverages in which a specific nutritional ingredient is fortified. Health foods and beverages refer to foods and beverages that are healthful or are considered good for health, and include nutritional supplement foods and beverages, natural foods and beverages, diet foods and beverages. Functional foods and beverages refer to foods and beverages for supplying a nutritional ingredient that fulfills regulatory functions of the body, being synonymous with foods for specified health uses. Foods and beverages for infants refer to foods and beverages that are provided to children aged up to about six. Geriatric foods and beverages refer to foods and beverages processed to be digested and absorbed more easily than non-processed foods and beverages. Infant milk formulas refer to milk formulas to be provided to infants aged up to about one. Premature infant milk formulas refer to milk formulas to be provided to premature infants until about six months after birth.

Forms of the foods and beverages are not particularly limited, and various forms may be taken. Examples of such forms include beverages, confectionery, and supplements. The beverages may be either of alcoholic beverages or non-alcoholic beverages. Examples of the non-alcoholic beverages include, but not limited to, non-alcoholic beer, malt beverages, *Lactobacillus* beverages, cocoa, sports drinks, nutritional supplement drinks, tea beverages, coffee beverages, carbonated beverages, functional beverages, fruit and vegetable beverages, milk-based beverages, soy milk beverages, and flavor water.

The non-alcoholic beer herein, which means a carbonated beverage having a beer-like flavor, is a non-fermented non-alcoholic type, substantially free of alcohol. Here, non-alcoholic beer is not intended to exclude beverages containing a trace amount of alcohol at an undetectable level.

When the composition of the present invention is a tea beverage, the composition is preferably a black tea beverage or sugarless tea beverage. Examples of the sugarless tea beverage include green tea beverages, oolong tea beverages, barley tea beverages, brown rice tea beverages, adlay tea beverages, and sugarless black tea beverages. The coffee beverage may be either container-packed coffee or liquid coffee.

Forms of the carbonated beverage are preferably cola-flavored beverages, transparent carbonated beverages, ginger ale, fruit juice-based carbonated beverages, milk-containing carbonated beverages, or sugarless carbonated beverages. Examples of the functional beverage include sports drinks, energy drinks, health support beverages, and jelly pouches.

Examples of the fruit and vegetable beverage include 100% fruit beverages, fruit-containing beverages, low fruit juice-containing refreshing beverages, fruit granule-containing fruit beverages or fruit pulp-containing beverages. Examples of the milk-based beverage include milk, drink yogurt, *Lactobacillus* beverages, or milk-containing refreshing beverages, and examples of the soy milk beverage include soy milk or soy beverages.

Alcoholic beverages refer to beverages that contains alcohol raw material. The alcoholic beverage may be shochu highball, or chuhai. Examples of the alcohol raw material include fermented liquors, distilled liquors, and mixed liquors. Examples of the fermented liquor include wine and beer. Examples of the distilled liquor include spirits (such as gin, vodka, rum, tequila, new spirits, and alcohol for raw material), liqueurs, whiskeys (such as whiskey and brandy), and shochu. Here, alcoholic beverages may be those containing alcohol at a detectable level and contain, for example, 1% by volume or more, 2% by volume or more, 3% by volume or more, 4% by volume or more, and 5% by volume or more of alcohol.

Examples of processed food include processed foods of cereal, seafood, and meat (such as bread, noodles, tortilla, pasta, ham, bacon, sausage, steamed fish paste cakes, fried fish paste cakes, and puffy fish cakes).

Examples of milk product include butter, cheese, yogurt, and ghee.

Examples of the confectionery include, but not limited to, candy, jam, chewing gum, ice cream, snack food, cookies, biscuits, cakes, wafers, sweet buns, chocolate, and Japanese sweets.

The food or beverage of the present invention also may be in the form of pharmaceutical products or quasi-pharmaceutical products such as fine granules, tablets, granules, powders, capsules (including soft capsules and hard capsules), chewable agents, syrups, mouthwash, toothpaste, oral ointment, collutorium, throat spray or may be in a processed form where the composition of the present invention is blended in protein, sugar, fat, trace elements, vitamins, an emulsifier, a fragrance, and the like, such as natural liquid food, half-digested nutrient food, and elemental diet, Health drink, and enteral nutrients.

Therefore, the present invention also provide an oral product such as a pharmaceutical product, a quasi-pharmaceutical product, a natural liquid food, a half-digested nutrient food, an elemental diet, a Health drink, enteral nutrients, comprising
- (a) a natural sugar in an amount corresponding to a sweetness intensity $X1$,
- (b) a high-intensity sweetener in an amount corresponding to a sweetness intensity $X2$, and
- (c) less than 40 mg/100 ml of sodium,
- wherein (1) sweetness having a sweetness intensity $X3$ is exhibited by the ingredients (a) to (c), and
- (2) energy is 50 Kcal/100 ml or less, and
- wherein $0.1<(X1+X2)<X3\leq20$ is satisfied.

Here, an oral product is a generic term for a product which is to be introduced in the mouth regardless of whether the product is to be ingested or not.

In the oral product of the present invention, "natural sugar", "sweetness intensity $X1$", "high-intensity sweetener", "sweetness intensity $X2$", amount of sodium, form of sodium, "sweetness intensity $X3$", and energy are the same as the definitions described in the above section for food or beverage, and the numerical values given in the above section, as they are, apply to their numerical values. Examples of the "combinations of glucose, sucrose, fructose, maltose, oligosaccharides, isomerized sugars, and lactose" and "combinations of high-intensity sweeteners" are also the same as the examples given in the above section for food or beverage.

2. Sweetener Composition

The present invention provides a sweetener composition as follows (hereinbelow, the composition is referred to as "the composition of the present invention"), as a second aspect.

A sweetening composition comprising a natural sugar, a high-intensity sweetener, and sodium, wherein
a food or beverage in which the sweetening composition is blended comprises
- (a) a natural sugar in an amount corresponding to a sweetness intensity $X1$,
- (b) a high-intensity sweetener in an amount corresponding to a sweetness intensity $X2$, and
- (c) less than 40 mg/100 ml of sodium,
- wherein (1) sweetness having a sweetness intensity $X3$ is exhibited by the ingredients (a) to (c), and
- (2) energy is 50 Kcal/100 ml or less, and
- wherein $0.1<(X1+X2)<X3\leq20$ is satisfied.

The composition of the present invention is a raw material for the food or beverage of the present invention described in the above section "1. Food or beverage having enhanced sweetness exhibited by natural sugar and high-intensity sweetener". Blending the composition of the present invention with other raw materials enables production of the food or beverage of the present invention. In this case, the food or beverage of the present invention contains no ingredient contributing to sweetness other than the ingredients (a) to (c), as described in the above section of the food or beverage of the present invention. Accordingly, when the food or beverage of the present invention is produced, no ingredient contributing to sweetness is included in the "other raw materials" to be blended with together the composition of the present invention.

The composition of the present invention can be blended with the "other raw materials" in any volume ratio, and the food or beverage produced thereof has to satisfy the following requirement:
the food or beverage comprises:
- (a) a natural sugar in an amount corresponding to a sweetness intensity $X1$,
- (b) a high-intensity sweetener in an amount corresponding to a sweetness intensity $X2$, and
- (c) less than 40 mg/100 ml of sodium,
- wherein (1) sweetness having a sweetness intensity $X3$ is exhibited by the ingredients (a) to (c), and
- (2) energy is 50 Kcal/100 ml or less, and
- wherein $0.1<(X1+X2)<X3\leq20$ is satisfied.

In the composition of the present invention, the "food or beverage", "natural sugar", "sweetness intensity $X1$", "high-intensity sweetener", "sweetness intensity $X2$", amount of sodium, form of sodium in the food or beverage and composition, "sweetness intensity $X3$", and energy are the same as the definitions described in the above section for food or beverage, and the numerical values given in the above section, as they are, apply to their numerical values. Examples of the "combinations of glucose, sucrose, fructose, maltose, oligosaccharides, isomerized sugars, and lactose" and "combinations of high-intensity sweeteners" are also the same as the examples given in the above section for food or beverage.

The numerical values given in the above section for food or beverage, as they are, apply to the numerical values in the relational expressions $0.1<(X1+X2)<X3\leq20$ and $\{X3-(X1+X2)\}$ among the sweetness intensity $X3$ exhibited by the food or beverage of the present invention, the sweetness intensity $X1$ of the natural sugar, and the sweetness intensity $X2$ of the high-intensity sweetener.

In a certain embodiment, a food or beverage in which the composition of the present invention is blended comprises
- (a) a natural sugar in an amount corresponding to a sweetness intensity of 0.1 to 5,
- (b) a high-intensity sweetener in an amount corresponding to a sweetness intensity of 0.1 to 3, and
- (c) less than 40 mg/100 ml of sodium,
- wherein (1) sweetness having a sweetness intensity of 5.5 to 12.5 is exhibited by the ingredients (a) to (c), and
- (2) energy is 50 Kcal/100 ml or less, and
- wherein $0.1<(X1+X2)<X3\leq12.5$ is satisfied.

In another embodiment, a food or beverage in which the composition of the present invention is blended comprises
- (a) a natural sugar in an amount corresponding to a sweetness intensity of 3 to 5,
- (b) a high-intensity sweetener in an amount corresponding to a sweetness intensity of 1 to 3, and
- (c) 5 to 25 mg/100 ml of sodium,
- wherein (1) sweetness having a sweetness intensity of 5.5 to 12.5 is exhibited by the ingredients (a) to (c), and
- (2) energy is 0 to 40 Kcal/100 ml, and
- wherein $0.1<(X1+X2)<X3\leq12.5$ is satisfied.

In yet another embodiment, a food or beverage in which the composition of the present invention is blended comprises
- (a) a natural sugar in an amount corresponding to a sweetness intensity of 0.1 to 5,
- (b) a high-intensity sweetener in an amount corresponding to a sweetness intensity of 0.1 to 3, and
- (c) less than 40 mg/100 ml of sodium,
- wherein (1) sweetness having a sweetness intensity of 2.0 to 12.0 is exhibited by the ingredients (a) to (c), and
- (2) energy is 50 Kcal/100 ml or less, and wherein $0.1<(X1+X2)<X3\leq12.5$ is satisfied.

Further, in another embodiment, a food or beverage in which the composition of the present invention is blended comprises (a) a natural sugar in an amount corresponding to a sweetness intensity of 3 to 5, (b) a high-intensity sweetener in an amount corresponding to a sweetness intensity of 1 to 3, and (c) 5 to 25 mg/100 ml of sodium, wherein (1) sweetness having a sweetness intensity of 2.0 to 12.0 is exhibited by the ingredients (a) to (c), and (2) energy is 0 to 40 Kcal/100 ml, and wherein $0.1<(X1+X2)<X3\leq12.5$ is satisfied.

In particular embodiment, the present invention provides the following composition (hereinbelow, referred to as "Composition A of the present invention").

A sweetening composition comprising a natural sugar, high-intensity sweetener selected from the group consisting of rebaudioside M, rebaudioside D and a combination thereof, and sodium, wherein a food or beverage in which the sweetening composition is blended comprises (a) the natural sugar in an amount of a sweetness intensity X1, (b) the high-intensity sweetener in an amount of a sweetness intensity X2, and (c) 4 to 26 mg/100 ml of sodium, wherein (1) sweetness having a sweetness intensity X3 is exhibited by the ingredients (a) to (c), and (2) energy is 25 Kcal/100 ml or less, and wherein $0.1<(X1+X2)<X3\leq20$ is satisfied.

In Composition A of the present invention, the "food or beverage", "natural sugar" (including examples of the combinations of glucose, sucrose, fructose, maltose, oligosaccharides, isomerized sugars, and lactose), "sweetness intensity X1", "high-intensity sweetener", "sweetness intensity X2", amount of sodium, form of sodium in the food or beverage, "sweetness intensity X3", and energy are the same as the definitions described in the above section for Food or Beverage A, and the numerical values given in the above section, as they are, apply to numerical values thereof. The food or beverage in Composition A of the present invention corresponds to Food or Beverage A of the present invention, and the above-mentioned features for Food or Beverage A of the present invention, as they are, apply to the food or beverage in Composition A.

In particular embodiment, the present invention provides the following composition (hereinbelow, referred to as "Composition B of the present invention").

A sweetening composition comprising a natural sugar, a luo han guo extract, and sodium, wherein a food or beverage in which the sweetening composition is blended comprises (a) the natural sugar in an amount of a sweetness intensity X1, (b) the luo han guo extract in an amount of a sweetness intensity X2, and (c) 4 mg/100 ml or more and less than 34.5 mg/100 ml of sodium, wherein (1) sweetness having a sweetness intensity X3 is exhibited by the ingredients (a) to (c), and (2) energy is 50 Kcal/100 ml or less, and wherein $0.1<(X1+X2)<X3\leq20$ is satisfied.

In Composition B of the present invention, the "food or beverage", "natural sugar" (including examples of the combinations of glucose, sucrose, fructose, maltose, oligosaccharides, isomerized sugars, and lactose), "sweetness intensity X1", "luo han guo extract", "sweetness intensity X2", amount of sodium, form of sodium in the food or beverage, "sweetness intensity X3", and energy are the same as the definitions described in the above section for Food or Beverage B, and the numerical values given in the above section, as they are, apply to numerical values thereof. The food or beverage in Composition B of the present invention corresponds to Food or Beverage B of the present invention, and the above-mentioned features for Food or Beverage B of the present invention, as they are, apply to the food or beverage in Composition B.

In particular embodiment, the present invention provides the following composition (hereinbelow, referred to as "Composition C of the present invention").

A sweetening composition comprising a natural sugar, mogroside V, and sodium, wherein a food or beverage in which the sweetening composition is blended comprises (a) the natural sugar in an amount of a sweetness intensity X1, (b) mogroside V in an amount of a sweetness intensity X2, and (c) 4 mg/100 ml or more and less than 23 mg/100 ml of sodium, wherein (1) sweetness having a sweetness intensity X3 is exhibited by the ingredients (a) to (c), and (2) energy is 50 Kcal/100 ml or less, and wherein $0.1<(X1+X2)<X3\leq20$ is satisfied.

In Composition C of the present invention, the "food or beverage", "natural sugar" (including examples of the combinations of glucose, sucrose, fructose, maltose, oligosaccharides, isomerized sugars, and lactose), "sweetness intensity X1", "mogroside V", "sweetness intensity X2", amount of sodium, form of sodium in the food or beverage, "sweetness intensity X3", and energy are the same as the definitions described in the above section for Food or Beverage C, and the numerical values given in the above section, as they are, apply to numerical values thereof. The food or beverage in Composition C of the present invention corresponds to Food or Beverage C of the present invention, and the above-mentioned features for Food or Beverage C of the present invention, as they are, apply to the food or beverage in Composition C.

In the food or beverage in which the composition of the present invention is blended, the sweetness intensity X1 of the natural sugar, the sweetness intensity X2 of the high-intensity sweetener, the amount of sodium, the sweetness intensity X3 exhibited by the food or beverage, and the energy of the food or beverage may take any value provided that the relation: $0.1<(X1+X2)<X3<20$ is satisfied, and it is possible to combine any of the numerical values of the sweetness intensity X1, the sweetness intensity X2, the amount of sodium, the sweetness intensity X3, and the energy as shown in the section of the food or beverage of the present invention, for example.

Forms of the composition of the present invention are not particularly limited, and may be in the form such as powder, mixed powder, crystals, granules, liquid, concentrated liquid, mixed liquid, paste, and tablets.

The food or beverage of the present invention may be the one which is container-packed and sterilized. It has been confirmed that the composition of the present invention exhibits a sweetness enhancement effect even being container-packed and sterilized.

3. Method for Producing Food or Beverage

Even with a food or beverage of which energy (Kcal/100 ml) is maintained at a low level by setting a lower amount of a natural sugar and a high-intensity sweetener to be blended, it is possible to enhance the sweetness based on the natural sugar and high-intensity sweetener by addition of sodium at a concentration low enough not to be sensed by humans.

Accordingly, the present invention provides a method for producing a food or beverage having enhanced sweetness as follows (hereinbelow, the method is referred to as "the method of the present invention"), as still another aspect:

A method for producing a food or beverage comprising:
to raw materials,
(i) adding (a) a natural sugar in an amount corresponding to a sweetness intensity X1 and (b) a high-intensity sweetener in an amount corresponding to a sweetness intensity X2, and
(ii) adding (c) less than 40 mg/100 ml of sodium,
wherein (1) sweetness having a sweetness intensity X3 is exhibited by the ingredients (a) to (c), and
(2) energy is 50 Kcal/100 ml or less, and
wherein $0.1<(X1+X2)<X3\leq20$ is satisfied.

The food or beverage produced by the method of the present invention is the food or beverage of the present invention described in the above section "1. Food or beverage having enhanced sweetness exhibited by natural sugar and high-intensity sweetener". The "raw materials" in the method of the present invention may be respective materials required for production of the food or beverage or mixtures thereof and may include additional ingredients such as a preservative, fragrance, a carrier, and fruit juice. The "raw materials" may be composed of a plurality of materials. However, irrespective of the type of the raw materials, the food or beverage of the present invention finally produced contains no ingredient contributing to sweetness other than the ingredients (a) to (c).

In the method of the present invention, either of the following step (i) or (ii) may be carried out first:
(i) adding (a) a natural sugar in an amount corresponding to a sweetness intensity X1 and (b) a high-intensity sweetener in an amount corresponding to a sweetness intensity X2, or
(ii) adding (c) less than 40 mg/100 ml of sodium.

In the step (i), (a) the natural sugar in an amount corresponding to a sweetness intensity X1 and (b) the high-intensity sweetener in an amount corresponding to a sweetness intensity X2 are added to the raw materials, but (a) the natural sugar in an amount corresponding to a sweetness intensity X1 and (b) the high-intensity sweetener in an amount corresponding to a sweetness intensity X2 may be added separately.

Furthermore, even when (a) the natural sugar in an amount corresponding to a sweetness intensity X1 is added, the natural sugar in an amount corresponding to a sweetness intensity X1 does not have to be added in one portion, but may be added in portions. Likewise, even when (b) the high-intensity sweetener in an amount corresponding to a sweetness intensity X2 is added, the natural sugar in an amount corresponding to a sweetness intensity X2 does not have to be added in one portion, but may be added in portions.

As another aspect, by adding a mixture of the natural sugar and the high-intensity sweetener in portions, the amount of the natural sugar and the amount of the high-intensity sweetener contained in the food or beverage finally produced also can be adjusted to be the amount corresponding to an sweetness intensity X1 and to be the amount corresponding to an sweetness intensity X2, respectively.

In the step (ii), when (c) less than 40 mg/100 ml of sodium is added, less than 40 mg/100 ml of sodium does not have to be added in one portion, but may be added in portions.

In the step (ii), sodium to be added to the raw materials may be in at least one form selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

"Adding" herein means not only an operation of actually adding any of the ingredients (a), (b), and (c) to the raw materials, but also means an operation of adjusting the amount of ingredient (a), the amount of ingredient (b), and the amount of ingredient (c) in a food or beverage finally produced via the production process of the food or beverage of the present invention to an amount corresponding to a sweetness intensity X1, an amount corresponding to a sweetness intensity X2, and less than 40 mg/100 ml, respectively.

For example, the first raw material contains fruit juice, cereal, beans or extracts thereof, and thus the raw materials contains any one or more of the ingredients (a), (b), and (c) in advance, and the second raw material to be mixed with the first raw material also contains the ingredients (a), (b), and (c). When mixing the first and second raw materials enables production of the food or beverage of the present invention, there is no operation of adding the ingredients (a), (b), and (c) separately to the raw materials. However, in the method of the present invention, the steps (i) and (ii) are considered to have been conducted provided that the food or beverage of the present invention finally produced contains (a) the natural sugar in an amount corresponding to a sweetness intensity X1, (b) the high-intensity sweetener in an amount corresponding to a sweetness intensity X2, and (c) less than 40 mg/100 ml of sodium.

In the method of the present invention, the "food or beverage", "natural sugar", "sweetness intensity X1", "high-intensity sweetener", "sweetness intensity X2", amount of sodium, form of sodium in the food or beverage, "sweetness intensity X3", and energy are the same as the definitions described in the above section for food or beverage, and the numerical values given in the above section, as they are, apply to their numerical values. Examples of the "combinations of glucose, sucrose, fructose, maltose, oligosaccharides, isomerized sugars, and lactose" and "combinations of high-intensity sweeteners" are also the same as the examples given in the above section for food or beverage.

The numerical values given in the above section for food or beverage, as they are, apply to the numerical values in the relational expressions $0.1<(X1+X2)<X3\leq20$ and $\{X3-(X1+X2)\}$ among the sweetness intensity X3 exhibited by the food or beverage of the present invention, the sweetness intensity X1 of the natural sugar, and the sweetness intensity X2 of the high-intensity sweetener.

In a certain embodiment, the food or beverage produced by the method of the present invention comprises
(a) a natural sugar in an amount corresponding to a sweetness intensity value of 0.1 to 5, (b) a high-intensity sweetener in an amount corresponding to a sweetness intensity value of 0.1 to 3, and
(c) less than 40 mg/100 ml of sodium,
wherein (1) sweetness having a sweetness intensity of 5.5 to 12.5 is exhibited by the ingredients (a) to (c), and
(2) energy is 50 Kcal/100 ml or less, and
wherein $0.1<(X1+X2)<X3\leq12.5$ is satisfied.

In another embodiment, the food or beverage produced by the method of the present invention comprises
(a) a natural sugar in an amount corresponding to a sweetness intensity of 3 to 5,
(b) a high-intensity sweetener in an amount corresponding to a sweetness intensity of 1 to 3, and
(c) 5 to 25 mg/100 ml of sodium,
wherein (1) sweetness having a sweetness intensity of 5.5 to 12.5 is exhibited by the ingredients (a) to (c), and
(2) energy is 0 to 40 Kcal/100 ml, and
wherein $0.1<(X1+X2)<X3\leq12.5$ is satisfied.

In yet another embodiment, the food or beverage produced by the method of the present invention comprises
(a) a natural sugar in an amount corresponding to a sweetness intensity value of 0.1 to 5,
(b) a high-intensity sweetener in an amount corresponding to a sweetness intensity value of 0.1 to 3, and
(c) less than 40 mg/100 ml of sodium,
wherein (1) sweetness having a sweetness intensity of 2.0 to 12.0 is exhibited by the ingredients (a) to (c), and
(2) energy is 50 Kcal/100 ml or less, and
wherein $0.1<(X1+X2)<X3\leq12.5$ is satisfied.

In another embodiment, the food or beverage produced by the method of the present invention comprises
(a) a natural sugar in an amount corresponding to a sweetness intensity of 3 to 5,
(b) a high-intensity sweetener in an amount corresponding to a sweetness intensity of 1 to 3, and
(c) 5 to 25 mg/100 ml of sodium,
wherein (1) sweetness having a sweetness intensity of 2.0 to 12.0 is exhibited by the ingredients (a) to (c), and
(2) energy is 0 to 40 Kcal/100 ml, and
wherein $0.1<(X1+X2)<X3\leq12.5$ is satisfied.

In a particular embodiment, the present invention provides the following method (hereinbelow, referred to as "Method A of the present invention").

A method for producing a food or beverage comprising: to raw materials,
(i) adding (a) a natural sugar in an amount of a sweetness intensity X1 and (b) a high-intensity sweetener selected from the group consisting of rebaudioside M, rebaudioside D and a combination thereof in an amount of a sweetness intensity X2, and
(ii) adding (c) 4 to 26 mg/100 ml of sodium,
wherein (1) sweetness having a sweetness intensity X3 is exhibited by the ingredients (a) to (c), and
(2) energy is 25 Kcal/100 ml or less, and
wherein $0.1<(X1+X2)<X3\leq20$ is satisfied.

In Method A of the present invention, the "food or beverage", "natural sugar" (including examples of the combinations of glucose, sucrose, fructose, maltose, oligosaccharides, isomerized sugars, and lactose), "sweetness intensity X1", "high-intensity sweetener", "sweetness intensity X2", amount of sodium, form of sodium in the food or beverage, "sweetness intensity X3", and energy are the same as the definitions described in the above section for Food or Beverage A, and the numerical values given in the above section, as they are, apply to numerical values thereof. The food or beverage in Method A of the present invention corresponds to Food or Beverage A of the present invention, and the above-mentioned features for Food or Beverage A of the present invention, as they are, apply to the food or beverage in Method A. Further, "raw materials", "adding", the order of step (i) and step (ii), and the mode of addition of each ingredient in Method A of the present invention are the same as the definitions described above with respect to the method of the present invention.

In another particular embodiment, the present invention provides the following method (hereinbelow, referred to as "Method B of the present invention").

A method for producing a food or beverage comprising: to raw materials,
(i) adding (a) a natural sugar in an amount of a sweetness intensity X1 and (b) a luo han guo extract in an amount of a sweetness intensity X2, and
(ii) adding (c) 4 mg/100 ml or more and less than 34.5 mg/100 ml of sodium,
wherein (1) sweetness having a sweetness intensity X3 is exhibited by the ingredients (a) to (c), and
(2) energy is 50 Kcal/100 ml or less, and
wherein $0.1<(X1+X2)<X3\leq20$ is satisfied.

In Method B of the present invention, the "food or beverage", "natural sugar" (including examples of the combinations of glucose, sucrose, fructose, maltose, oligosaccharides, isomerized sugars, and lactose), "sweetness intensity X1", "luo han guo extract", "sweetness intensity X2", amount of sodium, form of sodium in the food or beverage, "sweetness intensity X3", and energy are the same as the definitions described in the above section for Food or Beverage B, and the numerical values given in the above section, as they are, apply to numerical values thereof. The food or beverage in Method B of the present invention corresponds to Food or Beverage B of the present invention, and the above-mentioned features for Food or Beverage B of the present invention, as they are, apply to the food or beverage in Method B. Further, "raw materials", "adding", the order of step (i) and step (ii), and the mode of addition of each ingredient in Method B of the present invention are the same as the definitions described above with respect to the method of the present invention.

In another particular embodiment, the present invention provides the following method (hereinbelow, referred to as "Method C of the present invention").

A method for producing a food or beverage comprising: to raw materials,
(i) adding (a) a natural sugar in an amount of a sweetness intensity X1 and (b) mogroside V in an amount of a sweetness intensity X2, and
(ii) adding (c) 4 mg/100 ml or more and less than 23 mg/100 ml of sodium,
wherein (1) sweetness having a sweetness intensity X3 is exhibited by the ingredients (a) to (c), and
(2) energy is 50 Kcal/100 ml or less, and
wherein $0.1<(X1+X2)<X3\leq20$ is satisfied.

In Method C of the present invention, the "food or beverage", "natural sugar" (including examples of the combinations of glucose, sucrose, fructose, maltose, oligosaccharides, isomerized sugars, and lactose), "sweetness intensity X1", "mogroside V", "sweetness intensity X2", amount of sodium, form of sodium in the food or beverage, "sweetness intensity X3", and energy are the same as the definitions described in the above section for Food or Beverage C, and the numerical values given in the above section, as they are, apply to numerical values thereof. The food or beverage in Method C of the present invention corresponds to Food or Beverage C of the present invention, and the above-mentioned features for Food or Beverage C of the present invention, as they are, apply to the food or beverage in Method C. Further, "raw materials", "adding", the order of step (i) and step (ii), and the mode of addition of each ingredient in Method C of the present invention are the same as the definitions described above with respect to the method of the present invention.

In the food or beverage produced by the method of the present invention, the sweetness intensity X1 of the natural sugar, the sweetness intensity X2 of the high-intensity sweetener, the amount of sodium, the sweetness intensity X3 exhibited by the food or beverage, and the energy of the food or beverage may take any value provided that the relation: $0.1<(X1+X2)<X3\leq 20$ is satisfied, and it is possible to combine any of the numerical values of the sweetness intensity X1, the sweetness intensity X2, the amount of sodium, the sweetness intensity X3, and the energy as shown in the section of the food or beverage of the present invention, for example.

In the present application, the term "at least" means that the number of a specific item may be equivalent to the number given or more. Additionally, in the present application, the term "about" means that the subject is in the range of the numerical value preceded by "about" ±25%, ±10%, ±5%, ±3%, ±2%, or ±1%. For example, "about 10" means the range of 7.5 to 12.5.

EXAMPLES

The present invention will be described more specifically by listing examples below, but the scope of the present invention is not restricted by the following examples.

[Examples 1] Evaluation of Sweetness Enhancement Effect by Addition of Sodium

Experiment Method

A natural sugar {sucrose (manufactured by Pacific Sugar Mfg. Co., Ltd.), glucose (manufactured by Showa Sangyo Co., Ltd.)}, rebaudioside D (RebD) (purity of 95% or more), and sodium gluconate were dissolved in pure water, in the ratio shown in Table 2 below, to prepare a beverage sample. Additionally, a solution containing no sodium gluconate was used as the control solution. The sweetness intensities of these solutions were sensory-compared to verify the sweetness enhancement effect by sodium. Sensory-trained persons (eight) conducted evaluation as panelists. Here, in Table 2, Brix was calculated from the concentration of the natural sugar, the amount of sodium was calculated from the concentration of sodium gluconate, and the energy (kcal/100 ml) was calculated based on that the energy derived from RebD and sodium are 0 (kcal/100 ml).

TABLE 2

| Content | Control solution | Sample solution (1-1) |
|---|---|---|
| Sucrose (w/v %) | 1 | 1 |
| Glucose (w/v %) | 3.5 | 3.5 |
| Brix (derived from sucrose + glucose) | 4.5 | 4.5 |
| RebD (ppm) | 208 | 208 |
| Sodium gluconate (mM) | 0 | 5 |
| As the amount of sodium (mg/100 ml) | 0 | 11.5 |
| Energy (Kcal/100 ml) | 18 | 18 |

Results

More than half of the panelists (six out of eight) evaluated that the sweetness intensity of the sample solution (1-1) was greater than that of the control solution, and thus, the sweetness enhancement effect by sodium was confirmed.

[Example 2] Sweetness Intensity Measurement of Control Solution

Experiment Method

The control solution used in Example 1 [mixed liquid of 4.5% natural sugar (1 w/v % sucrose and 3.5 w/v % glucose) and 208 ppm RebD, natural sugar-derived Brix 4.5, 18 kcal/100 ml] and sucrose solutions each having Brix 7, 8, or 9 (each 7, 8, or 9 w/v %) were compared and scored on the VAS scale, and the sweetness intensity of the control solution was calculated. Sensory-trained persons (six) conducted evaluation as panelists.

Results

The control solution was revealed to have a sweetness intensity corresponding to that of a sucrose solution having Brix 7.96 (; Brix 8) as the average of the six. The sweetness intensity ascribed to RebD (208 ppm) is also calculated. The sweetness intensity of the natural sugar was 1 (Brix of sucrose)+3.5 (Brix of glucose)×0.65 (coefficient of degree of sweetness of glucose to sucrose)=3.275. Thus, the coefficient of degree of sweetness of RebD to sucrose was (7.96−3.275)×10000/208=225.2.

Then, in experiments hereinbelow, a Brix 8 sucrose solution (8 w/v % sucrose, 32 kcal/100 ml) was used as the control solution, unless otherwise particularly described.

[Example 3] Verification of Optimal Concentration of Sodium Gluconate

Experiment Method

Sucrose, glucose, RebD, and sodium gluconate were dissolved in pure water, in the ratio shown in Table 3 below, to prepare sample solutions (1-1 and 3-1 to 3-8).

TABLE 3

| Content | 3-1 | 3-2 | 1-1 | 3-3 | 3-4 | 3-5 | 3-6 | 3-7 | 3-8 |
|---|---|---|---|---|---|---|---|---|---|
| Sucrose (w/v %) | 1 | 1 | 1 | 1 | 1 | 1 | 1 | 1 | 1 |
| Glucose (w/v %) | 3.5 | 3.5 | 3.5 | 3.5 | 3.5 | 3.5 | 3.5 | 3.5 | 3.5 |
| Brix (derived from sucrose + glucose) | 4.5 | 4.5 | 4.5 | 4.5 | 4.5 | 4.5 | 4.5 | 4.5 | 4.5 |
| RebD (ppm) | 208 | 208 | 208 | 208 | 208 | 208 | 208 | 208 | 208 |
| Sodium gluconate (mM) | 1 | 2.5 | 5 | 7.5 | 10 | 12.5 | 15 | 20 | 40 |
| As the amount of sodium (mg/100 ml) | 2.3 | 5.75 | 11.5 | 17.25 | 23 | 28.75 | 34.5 | 46 | 92 |
| Energy (Kcal/100 ml) | 18 | 18 | 18 | 18 | 18 | 18 | 18 | 18 | 18 |

The sweetness intensity of each sample solution was sensory-compared with that of a Brix 8 sucrose solution as the control. Concurrently, the saltiness intensity of each sample solution was evaluated. The evaluation criteria were as follows.

<Sweetness Enhancement Effect>
○ (score 2): Yes
X (score 0): No

<Saltiness Intensity>
◉ (score 3): No taste is sensed.
○ (score 2): A taste is sensed, but the taste cannot be identified as saltiness.
Δ (score 1): Saltiness is sensed.
X (score 0): Saltiness is strongly sensed.

<Comprehensive Evaluation>
X, Δ, ○, and ◉ were scored as 0, 1, 2, and 3, respectively, and the scores of the sweetness enhancement effect and saltiness intensity were summed up and used as the comprehensive evaluation score.

In accordance with the above evaluation criteria, sensory-trained persons (eight) conducted evaluation as panelists. Here, in the comprehensive evaluation, samples having a score of 4 or more were considered to have the effect of the present invention.

Results

The results are summarized in Table 4 below.

TABLE 4

| Content | 3-1 | 3-2 | 1-1 | 3-3 | 3-4 | 3-5 | 3-6 | 3-7 | 3-8 |
|---|---|---|---|---|---|---|---|---|---|
| Sucrose (w/v %) | 1 | 1 | 1 | 1 | 1 | 1 | 1 | 1 | 1 |
| Glucose (w/v %) | 3.5 | 3.5 | 3.5 | 3.5 | 3.5 | 3.5 | 3.5 | 3.5 | 3.5 |
| Brix (derived from sucrose + glucose) | 4.5 | 4.5 | 4.5 | 4.5 | 4.5 | 4.5 | 4.5 | 4.5 | 4.5 |
| RebD (ppm) | 208 | 208 | 208 | 208 | 208 | 208 | 208 | 208 | 208 |
| Sodium gluconate (mM) | 1 | 2.5 | 5 | 7.5 | 10 | 12.5 | 15 | 20 | 40 |
| As the amount of sodium (mg/100 ml) | 2.3 | 5.75 | 11.5 | 17.25 | 23 | 28.75 | 34.5 | 46 | 92 |
| Energy (Kcal/100 ml) | 18 | 18 | 18 | 18 | 18 | 18 | 18 | 18 | 18 |
| Saltiness intensity | ◉ | ◉ | ◉ | ◉ | ○ | Δ | Δ | X | X |
| Sweetness enhancement effect | X | ○ | ○ | ○ | ○ | ○ | ○ | ○ | ○ |
| Comprehensive evaluation | 3 | 5 | 5 | 5 | 4 | 3 | 3 | 2 | 2 |

When 5.75 mg/100 ml or more of sodium is contained, the sweetness enhancement effect is observed. However, when 28.75 mg/100 ml or more of sodium is contained, saltiness is sensed, and thus the sample is not suitable to be blended in beverages. From the above, it was revealed that containing a natural sugar and a high-intensity sweetener and containing 4.0 mg/100 ml or more and 26 mg/100 ml or less of sodium were optimal for beverages.

From this, it was found that a blend within the range was capable of imparting the sweetness of a sweetness intensity more than 8 as beverages although only the natural sugar having a sweetness intensity of 3.275 and the high-intensity sweetener having a sweetness intensity of 4.685 (=7.96-3.275) were blended.

[Example 4] Evaluation of Sweetness Enhancement Effect for Various Sodium Sources Experiment Method Sucrose, glucose, RebD, and sodium chloride or Sodium L-aspartate was dissolved in pure water, in the ratio shown in Table 5 below, to prepare sample solutions.

TABLE 5

| Content | 4-1 | 4-2 | 4-3 | 4-4 |
|---|---|---|---|---|
| Sucrose (w/v %) | 1 | 1 | 1 | 1 |
| Glucose (w/v %) | 3.5 | 3.5 | 3.5 | 3.5 |
| Brix (derived from sucrose + glucose) | 4.5 | 4.5 | 4.5 | 4.5 |
| RebD (ppm) | 208 | 208 | 208 | 208 |
| Sodium chloride (mM) | 5 | 10 | 0 | 0 |
| As the amount of sodium (mg/100 ml) | 11.5 | 23 | 0 | 0 |
| Sodium L-aspartate (mM) | 0 | 0 | 5 | 10 |
| As the amount of sodium (mg/100 ml) | 0 | 0 | 11.5 | 23 |
| Energy (kcal/100 ml) | 18 | 18 | 18 | 18 |

The beverage samples obtained were subjected to evaluation in the same manner as in Example 3 using a Brix 8 sucrose solution as the control.

Results

The results are summarized in Table 6 below.

TABLE 6

| Content | 4-1 | 4-2 | 4-3 | 4-4 |
|---|---|---|---|---|
| Sucrose (w/v %) | 1 | 1 | 1 | 1 |
| Glucose (w/v %) | 3.5 | 3.5 | 3.5 | 3.5 |
| Brix (derived from sucrose + glucose) | 4.5 | 4.5 | 4.5 | 4.5 |
| RebD (ppm) | 208 | 208 | 208 | 208 |
| Sodium chloride (mM) | 5 | 10 | 0 | 0 |
| As the amount of sodium (mg/100 ml) | 11.5 | 23 | 0 | 0 |
| Sodium L-aspartate (mM) | 0 | 0 | 5 | 10 |
| As the amount of sodium (mg/100 ml) | 0 | 0 | 11.5 | 23 |
| Energy (kcal/100 ml) | 18 | 18 | 18 | 18 |
| Saltiness intensity | ◉ | ○ | ◉ | ○ |
| Sweetness enhancement effect | ○ | ○ | ○ | ○ |
| Comprehensive evaluation | 5 | 4 | 5 | 4 |

Even when 5 mM (11.5 mg/100 ml sodium) and 10 mM (23 m/100 ml sodium) of sodium chloride or sodium L-aspartate were added, the results similar to that on addition of sodium gluconate was achieved. In other words, irrespective of the types of sodium source, it was possible to impart the sweetness enhancement effect to beverages without imparting saltiness, provided that a natural sugar and a high-intensity sweetener were contained and the content of sodium was similar to that in Example 3.

[Example 5] Evaluation of Sweetness Enhancement Effect by Sodium on Blending Various High-Intensity Sweeteners Experiment Method "Sucrose, glucose, and sodium gluconate" and "rebaudioside A (RebA) or rebaudioside M (RebM)" were dissolved in pure water to prepare sample solutions as shown in Table 7 below. Rebaudioside M used had a purity of 94% or more, and rebaudioside A had a purity of 99% or more. For each solution, a solution containing no sodium gluconate was used as the control solution. The samples obtained were sensory-evaluated for the sweetness enhancement effect in the same manner as in Example 1.

TABLE 7

| Content | 5-1 | 5-2 |
|---|---|---|
| Sucrose (w/v) % | 1 | 1 |
| Glucose (w/v) % | 3.5 | 3.5 |
| Brix (derived from sucrose + glucose) | 4.5 | 4.5 |
| RebA (ppm) | 208 | 0 |
| RebM (ppm) | 0 | 208 |
| Sodium gluconate (mM) | 5 | 5 |
| As the amount of sodium (mg/100 ml) | 11.5 | 11.5 |
| Energy (kcal/100 ml) | 18 | 18 |

Results

The results are summarized in Table 8 below.

TABLE 8

| Content | 5-1 | 5-2 |
|---|---|---|
| Sucrose (w/v) % | 1 | 1 |
| Glucose (w/v) % | 3.5 | 3.5 |
| Brix (derived from sucrose + glucose) | 4.5 | 4.5 |
| RebA (ppm) | 208 | 0 |
| RebM (ppm) | 0 | 208 |
| Sodium gluconate (mM) | 5 | 5 |
| As the amount of sodium (mg/100 ml) | 11.5 | 11.5 |
| Energy (kcal/100 ml) | 18 | 18 |
| Sweetness enhancement effect | X | ○ |

While RebA was not able to provide a sufficient sweetness enhancement effect, a sweetness enhancement effect due to sodium was observed when RebM was blended as was RebD.

[Example 6] Verification of Sugar Concentration Having Sweetness Enhancement Effect Experiment Method Sucrose, glucose, RebD, and sodium gluconate were dissolved in pure water, in the ratio shown in Table 9 below, to prepare sample solutions. The concentration of the natural sugar and RebD was adjusted such that the entire beverage had a sweetness intensity corresponding to 8. By reference to the result of the sample solution (1-1) of Example 2 (the solution of 1 (w/v) % sucrose, 3.5 (w/v) % glucose, and 208 ppm RebD had a sweetness intensity of Brix 8), each concentration was calculated with setting the ratio of the contents between sucrose and glucose to 1:3.5.

TABLE 9

| Content | 6-1 | 6-2 | 6-3 | 6-4 | 6-5 |
|---|---|---|---|---|---|
| Sucrose (w/v) % | 0 | 0.22 | 0.44 | 1.33 | 1.78 |
| Glucose (w/v) % | 0 | 0.78 | 1.56 | 4.67 | 6.22 |
| Brix (derived from sucrose + glucose) | 0 | 1 | 2 | 6 | 8 |
| RebD (ppm) | 355.24 | 322.96 | 290.67 | 161.39 | 96.67 |
| Sodium gluconate (mM) | 5 | 5 | 5 | 5 | 5 |
| As the amount of sodium (mg/100 ml) | 11.5 | 11.5 | 11.5 | 11.5 | 11.5 |
| Energy (kcal/100 ml) | 0 | 4 | 8 | 24 | 32 |

For each solution, a solution containing no sodium gluconate was used as the control solution. The samples obtained were sensory-evaluated for the sweetness enhancement effect. The evaluation criteria were as follows.

<Sweetness Enhancement Effect>
○ (score 2): Yes
X (score 0): No

Results

The results are summarized in Table 10 below.

TABLE 10

| Content | 6-1 | 6-2 | 6-3 | 6-4 | 6-5 |
|---|---|---|---|---|---|
| Sucrose (w/v) % | 0 | 0.22 | 0.44 | 1.33 | 1.78 |
| Glucose (w/v) % | 0 | 0.78 | 1.56 | 4.67 | 6.22 |
| Brix (derived from sucrose + glucose) | 0 | 1 | 2 | 6 | 8 |
| RebD (ppm) | 355.24 | 322.96 | 290.67 | 161.39 | 96.67 |
| Sodium gluconate (mM) | 5 | 5 | 5 | 5 | 5 |
| As the amount of sodium (mg/100 ml) | 11.5 | 11.5 | 11.5 | 11.5 | 11.5 |
| Energy (Kcal/100 ml) | 0 | 4 | 8 | 24 | 32 |
| Sweetness enhancement effect | ○ | ○ | ○ | X | X |

Under the conditions where the sweetness intensity of the entire beverage was set to a sweetness intensity corresponding to 8, it was found that the sweetness enhancement effect was observed in the case where Brix derived from the natural sugar was 1 and 2 and sodium was contained at a desired concentration. In the case where the content of rebaudioside D was 400 ppm or less, the sweetness enhancement effect was observed depending on the content of the natural sugar and the content of sodium. In combination with the results of Example 1 (the enhancement effect was observed even if Brix derived from the natural sugar was 4.5), it was found that sweetness enhancement effect was observed for 0 kcal or more and less than 24 kcal.

[Example 7] Verification of Sweetness Intensity Having Sweetness Enhancement Effect Experiment Method Sucrose, glucose, RebD, and sodium gluconate were dissolved in pure water, in the ratio shown in Table 11 below, to prepare beverage samples. By reference to the result of the sample solution (1-1) of Example 2 (the solution of 1 (w/v) % sucrose, 3.5 (w/v) % glucose, and 208 ppm RebD had a sweetness intensity of Brix 8), each concentration was adjusted with the ratio of the contents between sucrose and glucose maintained. For each solution, a solution containing no sodium gluconate was used as the control solution. The sample solutions obtained were sensory-evaluated for the sweetness enhancement effect.

The evaluation criteria were as follows.
<Sweetness Enhancement Effect>
◯ (score 2): Yes
X (score 0): No

TABLE 11

| Content | 7-1 | 7-2 | 7-3 | 7-4 | 7-5 | 7-6 | 7-7 |
|---|---|---|---|---|---|---|---|
| Sweetness intensity | 2 | 4 | 8 | 10 | 11 | 12 | 16 |
| Sucrose (w/v) % | 0.25 | 0.5 | 1 | 1.26 | 1.38 | 1.5 | 2 |
| Glucose (w/v) % | 0.875 | 1.75 | 3.5 | 4.4 | 4.84 | 5.25 | 7 |
| Brix (derived from sucrose + glucose) | 1.13 | 2.25 | 4.5 | 5.66 | 6.22 | 6.75 | 9 |
| RebD (ppm) | 52 | 104 | 208 | 216 | 288 | 312 | 416 |
| Sodium gluconate (mM) | 5 | 5 | 5 | 5 | 5 | 5 | 5 |
| As the amount of sodium (mg/100 ml) | 11.5 | 11.5 | 11.5 | 11.5 | 11.5 | 11.5 | 11.5 |
| Energy (kcal/100 ml) | 4.52 | 9 | 18 | 22.64 | 24.88 | 27 | 36 |

Results
The results are summarized in Table 12 below.

TABLE 12

| Content | 7-1 | 7-2 | 7-3 | 7-4 | 7-5 | 7-6 | 7-7 |
|---|---|---|---|---|---|---|---|
| Sweetness intensity | 2 | 4 | 8 | 10 | 11 | 12 | 16 |
| Sucrose (w/v) % | 0.25 | 0.5 | 1 | 1.26 | 1.38 | 1.5 | 2 |
| Glucose (w/v) % | 0.875 | 1.75 | 3.5 | 4.4 | 4.84 | 5.25 | 7 |
| Brix (derived from sucrose + glucose) | 1.13 | 2.25 | 4.5 | 5.66 | 6.22 | 6.75 | 9 |
| RebD (ppm) | 52 | 104 | 208 | 216 | 288 | 312 | 416 |
| Sodium gluconate (mM) | 5 | 5 | 5 | 5 | 5 | 5 | 5 |
| As the amount of sodium (mg/100 ml) | 11.5 | 11.5 | 11.5 | 11.5 | 11.5 | 11.5 | 11.5 |
| Energy (Kcal/100 ml) | 4.52 | 9 | 18 | 22.64 | 24.88 | 27 | 36 |
| Sweetness enhancement effect | ◯ | ◯ | ◯ | ◯ | ◯ | X | X |

It was found that the sweetness intensity enhancement effect was observed for a sweetness intensity of 2 or more and 12 or less by containing sodium.

[Example 8] Sweetness Intensity Measurement of RebM-Containing Control Solution

Experiment Method

In accordance with the method described in Example 2, the sweetness intensity of a control solution [mixed liquid of 4.5% natural sugar (1 w/v % sucrose and 3.5 w/v % glucose) and 208 ppm RebM] (natural sugar-derived Brix 4.5, 18 kcal/100 ml) was calculated.

Results

The control solution was revealed to have a sweetness intensity corresponding to that of a sucrose solution having Brix 8.08 (: Brix 8). The sweetness intensity ascribed to RebM (208 ppm) was also calculated in the same manner as for RebD to obtain a coefficient of degree of sweetness of RebM to sucrose of (8.08−3.275)×10000/208=231.0.

[Example 9] Evaluation in Container-Packed and Sterilized Beverage

Experiment Method

Sucrose, glucose, RebD, and sodium gluconate were dissolved in pure water, in the ratio shown in the following table, to prepare sample solutions. Thereafter, a container (a 200 ml glass bottle) was filled with each solution, hermetically sealed, and then thermally sterilized (85° C.-10 minutes) to thereby produce each container-packed and sterilized beverage.

TABLE 13

| Content | 3-1' | 3-3' | 3-7' |
|---|---|---|---|
| Sucrose (w/v %) | 1 | 1 | 1 |
| Glucose (w/v %) | 3.5 | 3.5 | 3.5 |
| Brix (derived from sucrose + glucose) | 4.5 | 4.5 | 4.5 |
| RebD (ppm) | 208 | 208 | 208 |
| Sodium gluconate (mM) | 1 | 7.5 | 20 |
| As the amount of sodium (mg/100 ml) | 2.3 | 17.25 | 46 |
| Energy (Kcal/100 ml) | 18 | 18 | 18 |

A solution containing no sodium gluconate was used as the control, and the sweetness enhancement effect and saltiness intensity of each sample solution were evaluated in accordance with the method described in Example 3.

Results

The results are summarized in the following table.

TABLE 14

| Content | 3-1' | 3-3' | 3-7' |
|---|---|---|---|
| Sucrose (w/v %) | 1 | 1 | 1 |
| Glucose (w/v %) | 3.5 | 3.5 | 3.5 |
| Brix (derived from sucrose + glucose) | 4.5 | 4.5 | 4.5 |

TABLE 14-continued

| Content | 3-1' | 3-3' | 3-7' |
|---|---|---|---|
| RebD (ppm) | 208 | 208 | 208 |
| Sodium gluconate (mM) | 1 | 7.5 | 20 |
| As the amount of sodium (mg/100 ml) | 2.3 | 17.25 | 46 |
| Energy (Kcal/100 ml) | 18 | 18 | 18 |
| Saltiness intensity | ⊙ | ◯ | Δ |
| Sweetness enhancement effect | X | ◯ | ◯ |
| Comprehensive evaluation | 3 | 4 | 3 |

As in Example 3, the result was that containing 4.0 mg/100 ml or more and 26 mg/100 ml or less of sodium was optimal for beverages. That is, it was revealed that the sodium range described above was optimal also for the container-packed and sterilized beverage.

[Example 10] Confirmation of Sweetness Enhancement Effect by Means of Animal Model (1) Verification of Optimal Concentration of Sodium Gluconate Experiment Method Gustatory (chorda tympani) nerve response in animals was carried out on 8- to 16-week-old C57BL/6J mice subjected to urethane anesthetization, in accordance with the method described in Kawai K, et al., PNAS. 2000: 97(20): 11044-9.

The sample solutions used were the same as used in Example 3. The average value of magnitudes from 5 seconds to 25 seconds after the start of tongue stimulation of each sample solution was determined and expressed as a relative value with respect to the 0.1 M $NH_4Cl$ (manufactured by NACALAI TESQUE, INC.) response, which was determined in the same manner and set to 1. A method for analyzing the sweetness enhancement effect was carried out in accordance with the analysis method described in Yamamoto T, et al., Chem Senses. 2009:34(9): 809-18. Specifically, the sum of the response value of a control solution [mixed liquid of 4.5% natural sugar (1 w/v % sucrose: Suc, 3.5 w/v % glucose: Glc) and 208 ppm RebD], natural sugar-derived Brix 4.5, 18 kcal/100 ml] and the response value of sodium gluconate (GluNa) (calculated value) was compared with the response value of the mixed solution thereof (measured value). When the response value of the mixed solution showed a higher value [measured value/calculated value×100(%)>100(%)], it was defined that an increase in the response was observed.

All animal experiments followed the Law for the Humane Treatment and Management of Animals and other related laws and regulations. All the experiments were conducted under a protocol approved by the internal committee for animal experiment.

Results

The results are shown in FIG. 1 (average of n=5). As shown in FIG. 1, the Suc+Glc+RebD (Brix. 4.5%) solutions each showed an increase in the chorda tympani nerve responses due to mixing of sodium gluconate. Intense increases were observed particularly in the concentration range of 5 to 10 mM (11.5 to 23 mg/100 ml as the Na amount) (in the rest, the increase was 120% or less).

(2) Verification of Sugar Concentration Having Sweetness Enhancement Effect

Experiment Method

Figure 2:
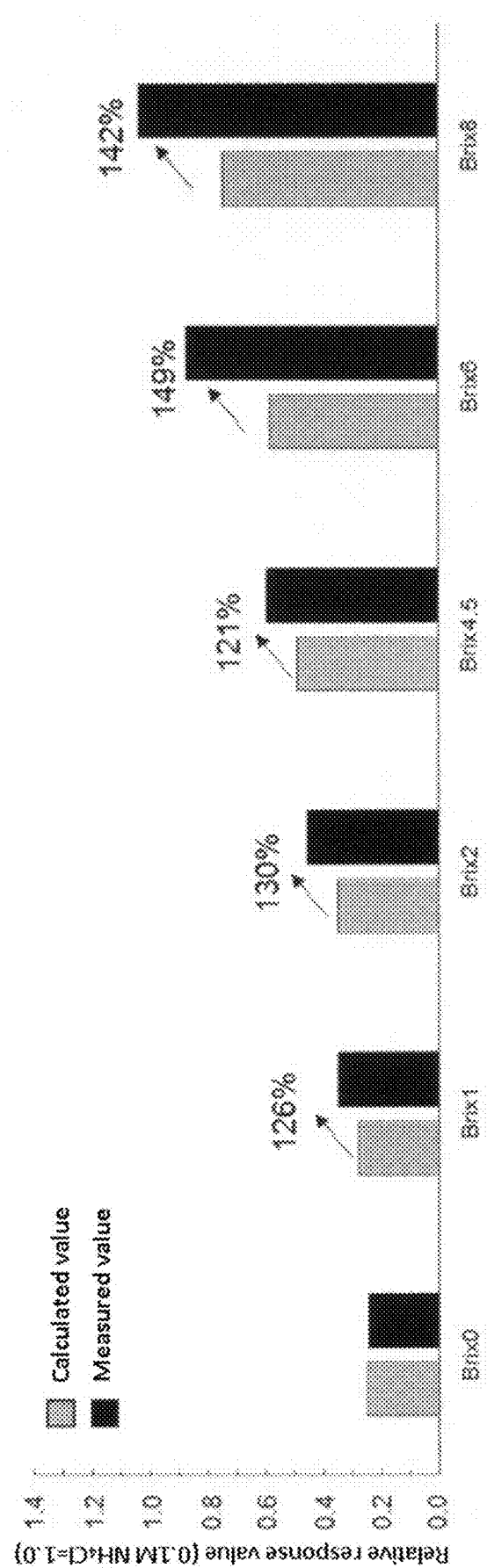
FIG. 2 shows the results of gustatory nerve response experiment using model animals.

Chorda tympani nerve responses of mice were carried out in the same manner as in the experiment (1) described above. The method for analyzing the sweetness enhancement effect was also carried out in the same manner as in the experiment (1) described above. In this experiment, the sample solutions used were the same as used in Example 6.
Results The results are shown in FIG. 2 (average of n=5). As shown in FIG. 2, increases in the chorda tympani nerve responses due to mixing of sodium gluconate were observed for Brix 1 to 8.

(3) Verification of Sweetness Intensity Having Sweetness Enhancement Effect

Experiment Method

Figure 3:
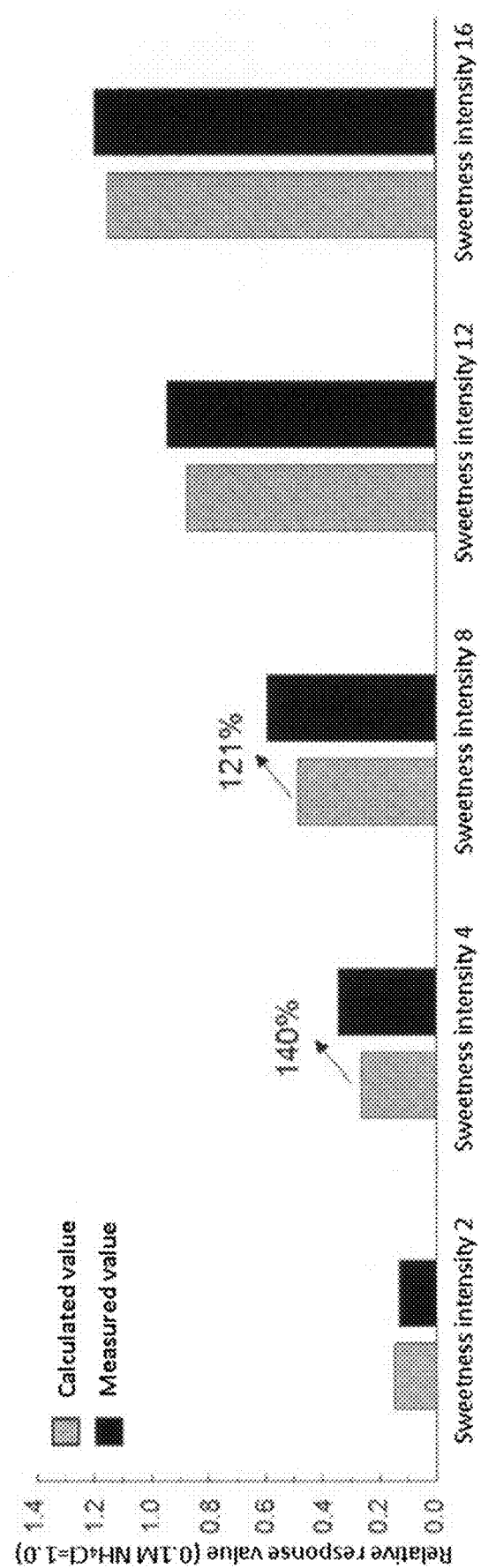
FIG. 3 shows the results of gustatory nerve response experiment using model animals.

Chorda tympani nerve responses of mice were carried out in the same manner as in the experiment (1) described above. The method for analyzing the sweetness enhancement effect was also carried out in the same manner as in the experiment (1) described above. In this experiment, the sample solutions used were the same as used in Example 7.
Results The results are shown in FIG. 3 (average of n=5). As shown in FIG. 3, increases in the chorda tympani nerve responses due to mixing of sodium gluconate were observed at the degree of sweetness of 4 to 8.

From the results of the present example, also in the case of using an animal model, the occurrence of the sweetness enhancement effect was noted as from the sensory results provided by the panelists.

[Example 11] Sweetness Intensity Measurement of Luo Han Guo Extract

Experiment Method

Luo han guo extract-containing solution [mixed liquid of 4.5% natural sugar (1 w/v % sucrose and 3.5 w/v % glucose) and 208 ppm luo han guo extract (water extract of luo han guo fruit containing 40 wt % mogroside V) dissolved in pure water, natural sugar-derived Brix 4.5, 18 kcal/100 ml] and sucrose solutions each having Brix 4, 5, 6, 7, or 8 (each 4, 5, 6, 7, or 8 w/v %) were compared and scored on the VAS scale, and the sweetness intensity of luo han guo extract-containing solution was calculated. Sensory-trained persons (six) conducted evaluation as panelists.
Results Luo han guo extract-containing solution was revealed to have a sweetness intensity corresponding to that of a sucrose solution having Brix 6.05 (≈Brix 6) as the average of the six. The sweetness intensity ascribed to luo han guo extract (208 ppm) is calculated in the same manner as Example 2, and the coefficient of degree of sweetness of luo han guo extract to sucrose was (6.05-3.275)×10000/208=133.4.

[Example 12] Verification of Optimal Concentration of Sodium Gluconate

Experiment Method

Sucrose, glucose, luo han guo extract, and sodium gluconate were dissolved in pure water, in the ratio shown in Table 15 below, to prepare sample solutions (12-1 to 12-9).

For each solution, a solution containing no sodium gluconate was used as a control solution. The sweetness intensity of each sample solution was sensory-compared with that of the control solution. Concurrently, the saltiness intensity of each sample solution was evaluated. The evaluation criteria same as those of Example 3 were used, and sensory-trained persons (eight) conducted evaluation as panelists. Final evaluation results of the entire panel for each evaluation item were determined by a majority vote based on evaluation results of each individual panelist, in the same manner as Example 3. That is, the sweetness enhancement effect was finally determined as "Yes" (O) when more than a half of the panelists evaluated as "Yes," and for the saltiness intensity, the most common evaluation result was chosen as the final evaluation result. In case that there are more than one most common evaluation results, the worst evaluation result was chosen as the final evaluation result (for instance, when there is a same number of O and A, and O and A are the most common, then A was chosen as a final evaluation result. Here, in the comprehensive evaluation, samples having a score of 4 or more were considered to have the effect of the present invention.

Results

The results are summarized in Table 15.

TABLE 15

| Content | 12-1 | 12-2 | 12-3 | 12-4 | 12-5 | 12-6 | 12-7 | 12-8 | 12-9 |
|---|---|---|---|---|---|---|---|---|---|
| Sucrose (w/v %) | 1 | 1 | 1 | 1 | 1 | 1 | 1 | 1 | 1 |
| Glucose (w/v %) | 3.5 | 3.5 | 3.5 | 3.5 | 3.5 | 3.5 | 3.5 | 3.5 | 3.5 |
| Brix (derived from sucrose + glucose) | 4.5 | 4.5 | 4.5 | 4.5 | 4.5 | 4.5 | 4.5 | 4.5 | 4.5 |
| luo han guo extract(ppm) | 208 | 208 | 208 | 208 | 208 | 208 | 208 | 208 | 208 |
| Sodium gluconate (mM) | 1 | 2.5 | 5 | 7.5 | 10 | 12.5 | 15 | 20 | 40 |
| As the amount of sodium (mg/100 ml) | 2.3 | 5.75 | 11.5 | 17.25 | 23 | 28.75 | 34.5 | 46 | 92 |
| Energy (Kcal/100 ml) | 18 | 18 | 18 | 18 | 18 | 18 | 18 | 18 | 18 |
| Saltiness intensity | ◉ | ◉ | O | O | O | O | Δ | X | X |
| Sweetness enhancement effect | X | O | O | O | O | O | O | X | O |
| Comprehensive evaluation | 3 | 5 | 4 | 4 | 4 | 4 | 3 | 0 | 2 |

When 5.75 mg/100 ml or more of sodium is contained, the sweetness enhancement effect is observed. On the other hand, when 34.5 mg/100 ml or more of sodium is contained, saltiness is sensed. From the above, it was found that even for a beverage containing luo han guo extract as a high-intensity sweetener, containing 4.0 mg/100 ml or more and 26 mg/100 ml or less of sodium provides beverages having preferable taste. In particular, in the case of beverages containing a natural sugar and luo han guo extract, beverages having preferable taste were obtained even when the upper limit of sodium is lower than 34.5 mg/100 ml, e.g., 30 mg/100 ml, in particular around 28.75 mg/100 ml.

[Example 13] Verification of Sugar Concentration Having Sweetness Enhancement Effect Experiment Method Sucrose, glucose, luo han guo extract, and sodium gluconate were dissolved in pure water, in the ratio shown in Table 16 below, to prepare sample solutions. The concentration of the natural sugar and luo han guo extract was adjusted such that the entire beverage had a sweetness intensity corresponding to 6. By reference to the result of luo han guo extract-containing solution of Example 11 (the solution of 1 (w/v) % sucrose, 3.5 (w/v) % glucose, and 208 ppm luo han guo extract had a sweetness intensity of about Brix 6), each concentration was calculated with setting the ratio of the contents between sucrose and glucose to 1:3.5.

For each solution, a solution containing no sodium gluconate was used as the control solution. The samples obtained were sensory-evaluated for the sweetness enhancement effect (n=8). The evaluation criteria same as those of Example 6 were used, and the sweetness enhancement effect was evaluated "Yes" (O) when the sample solution (with sodium gluconate) is sweeter than the control solution (without sodium gluconate) and otherwise, the sweetness enhancement effect was evaluated "No" (X). Final evaluation results by the entire panel were determined by a majority vote based on evaluation results of each individual panelist, in the same manner as Example 6. That is, the sweetness enhancement effect was finally determined as "Yes" (O) when more than a half of the panelists evaluated as "Yes."

Results

The results are summarized in Table 16 below.

TABLE 16

| Content | 13-1 | 13-2 | 13-3 | 13-4 | 13-5 |
|---|---|---|---|---|---|
| Sucrose (w/v) % | 0 | 0.22 | 0.44 | 1.33 | 1.78 |
| Glucose (w/v) % | 0 | 0.78 | 1.56 | 4.67 | 6.22 |
| Brix (derived from sucrose + glucose) | 0 | 1 | 2 | 6 | 8 |
| Luo han guo extract (ppm) | 450.0 | 395.2 | 340.7 | 122.4 | 13.3 |
| Sodium gluconate (mM) | 7.5 | 7.5 | 7.5 | 7.5 | 7.5 |
| As the amount of sodium (mg/100 ml) | 117.3 | 17.3 | 17.3 | 17.3 | 17.3 |
| Energy (Kcal/100 ml) | 0 | 4 | 8 | 24 | 32 |
| Sweetness enhancement effect | O | O | O | O | O |

Under the conditions where the sweetness intensity of the entire beverage was set to a sweetness intensity corresponding to 6, it was found that the sweetness enhancement effect was observed in the case where Brix derived from the natural sugar was from 1 to 8 and sodium was contained at a given concentration. In the case where even the content of luo han guo extract is as low as 13.3 ppm, the sweetness enhancement effect was observed depending on the content of the natural sugar and the content of sodium. From the above results, it was found that sweetness enhancement effect was observed even in a range of 0 kcal or more and 32 kcal or less, in case that luo han guo extract was used as high-intensity sweetener.

[Example 14] Verification of Sweetness Intensity Having Sweetness Enhancement Effect Experiment Method Sucrose, glucose, luo han guo extract, and sodium gluconate were dissolved in pure water, in the ratio shown in Table 17, to prepare beverage samples. By reference to the result of luo han guo extract-containing solution of Example 11 (the solution of 1 (w/v) % sucrose, 3.5 (w/v) % glucose, and 208 ppm luo han guo extract had a sweetness intensity of about Brix 6), each concentration was adjusted with the ratio of the contents between sucrose and glucose maintained. For each solution, a solution containing no sodium gluconate was used as the control solution. The sample solutions obtained were sensory-evaluated for the sweetness enhancement effect. The evaluation criteria same as those of Example 7 were used, and the sweetness enhancement effect was evaluated "Yes" (O) when the sample solution (with sodium gluconate) is sweeter than the control solution (without sodium gluconate) and otherwise, the sweetness enhancement effect was evaluated "No" (X). Final evaluation results by the entire panel were determined by a majority vote based on evaluation results of each individual panelist, in the same manner as Example 6. That is, the sweetness enhancement effect was finally determined as "Yes" (O) when more than a half of the panelists evaluated as "Yes.".

Results

The results are summarized in Table 17 below.

TABLE 17

| Content | 14-1 | 14-2 | 14-3 | 14-4 | 14-5 | 14-6 | 14-7 |
|---|---|---|---|---|---|---|---|
| Sweetness intensity | 2 | 4 | 8 | 10 | 11 | 12 | 16 |
| Sucrose (w/v) % | 0.33 | 0.66 | 1.32 | 1.65 | 1.82 | 1.98 | 2.64 |
| Glucose (w/v) % | 1.16 | 2.31 | 4.63 | 5.79 | 6.36 | 6.94 | 9.26 |
| Brix (derived from sucrose + glucose) | 1.49 | 2.98 | 5.95 | 7.44 | 8.18 | 8.93 | 11.9 |
| Luo han guo extract(ppm) | 68.8 | 137.5 | 275.0 | 343.8 | 378.2 | 412.6 | 550.1 |
| Sodium gluconate (mM) | 7.5 | 7.5 | 7.5 | 7.5 | 7.5 | 7.5 | 7.5 |
| As the amount of sodium (mg/100 ml) | 17.3 | 17.3 | 17.3 | 17.3 | 17.3 | 17.3 | 17.3 |
| Energy (Kcal/100 ml) | 5.96 | 11.92 | 23.8 | 29.76 | 32.72 | 35.72 | 47.6 |
| Sweetness enhancement effect | O | O | O | O | O | O | X |

It was found that, when luo han guo extract was used as high-intensity sweetener, the sweetness intensity enhancement effect was observed for a sweetness intensity of 2 or more and 12 or less by containing sodium.

[Example 15] Confirmation of Sweetness Enhancement Effect by Means of Animal Model (1) Verification of Optimal Concentration of Sodium Gluconate Experiment Method Chorda tympani nerve responses of mice were evaluated using a method similar to Example 10 except that sample solutions used were the same as used in Example 12.

Results

Figure 4:
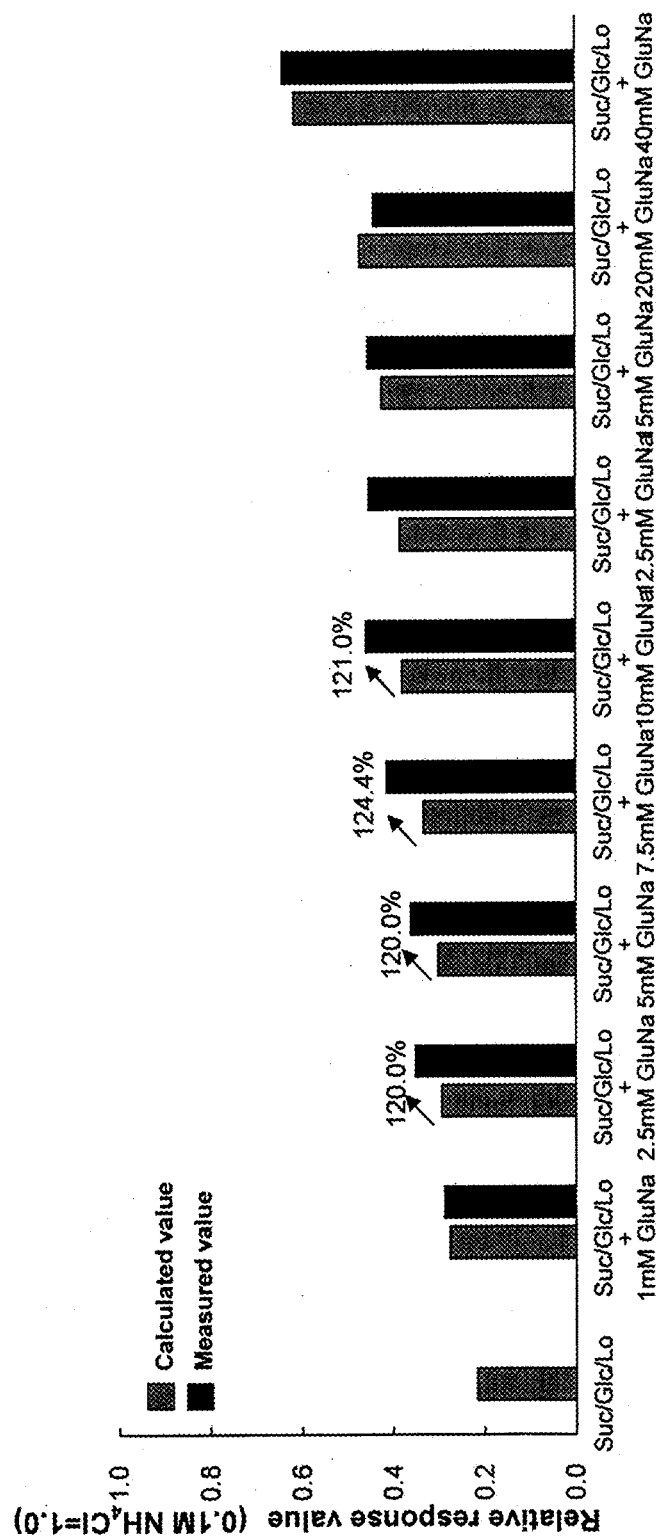
FIG. 4 shows the results of gustatory nerve response experiment using model animals.

The results are shown in FIG. 4 (average of n=6). As shown in FIG. 4, with respect to the sucrose (Suc)+glucose (Glc)+luo han guo extract (Lo) (Brix. 4.5%) solutions, each basically showed an increase in the chorda tympani nerve responses due to mixing of sodium gluconate (GluNa). Intense increases in the responses, for which the measured value was 120% or more of the calculated value, were observed particularly in the concentration range of 2.5 to 10 mM as the amount of GluNa (5.75 to 23 mg/100 ml as the Na amount) (in other concentrations, the measured value was less than 120% of the calculated value). The percentage above the bars of the graph shows measured value/calculated value×100(%).

(2) Verification of sugar concentration having sweetness enhancement effect

Experiment Method

Chorda tympani nerve responses of mice were evaluated in the same manner as in the experiment (1) described above. The method for analyzing the sweetness enhancement effect was also carried out in the same manner as in the experiment (1) described above. In this experiment, the sample solutions used were the same as used in Example 13.

Results

Figure 5:
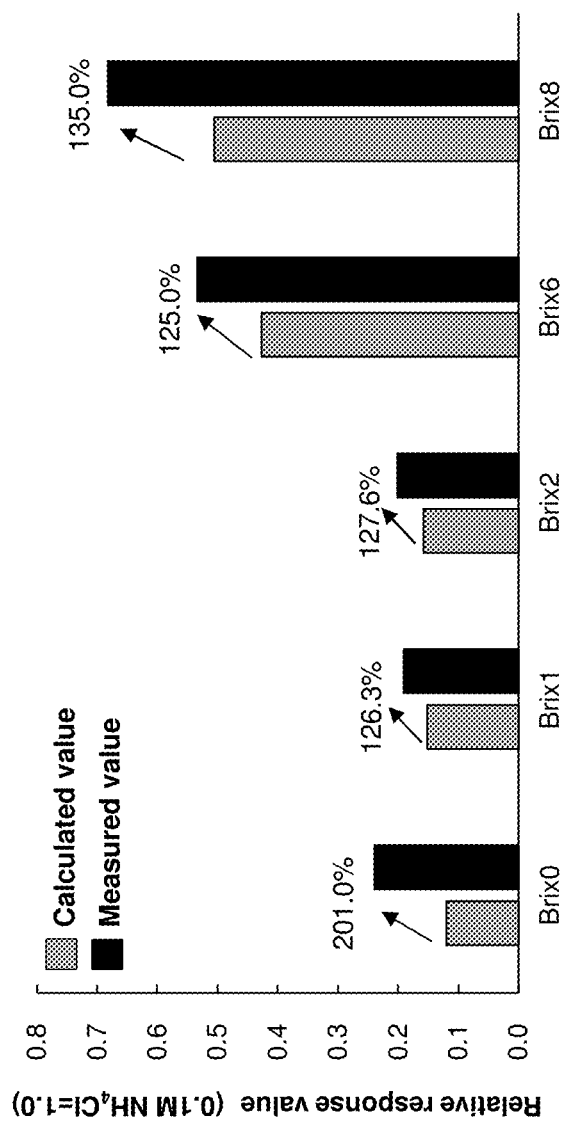
FIG. 5 shows the results of gustatory nerve response experiment using model animals.

The results are shown in FIG. 5 (average of n=6). As shown in FIG. 5, intense increases in the chorda tympani nerve responses, for which the measured value was 120% or more of the calculated value, due to mixing of sodium gluconate were observed for Brix 1 to 8. The percentage above the bars of the graph shows measured value/calculated value×100(%).

(3) Verification of Sweetness Intensity Having Sweetness Enhancement Effect

Experiment Method

Chorda tympani nerve responses of mice were evaluated in the same manner as in the experiment (1) described above. The method for analyzing the sweetness enhancement effect was also carried out in the same manner as in the experiment (1) described above. In this experiment, the sample solutions used were the same as used in Example 14.

Results

Figure 6:
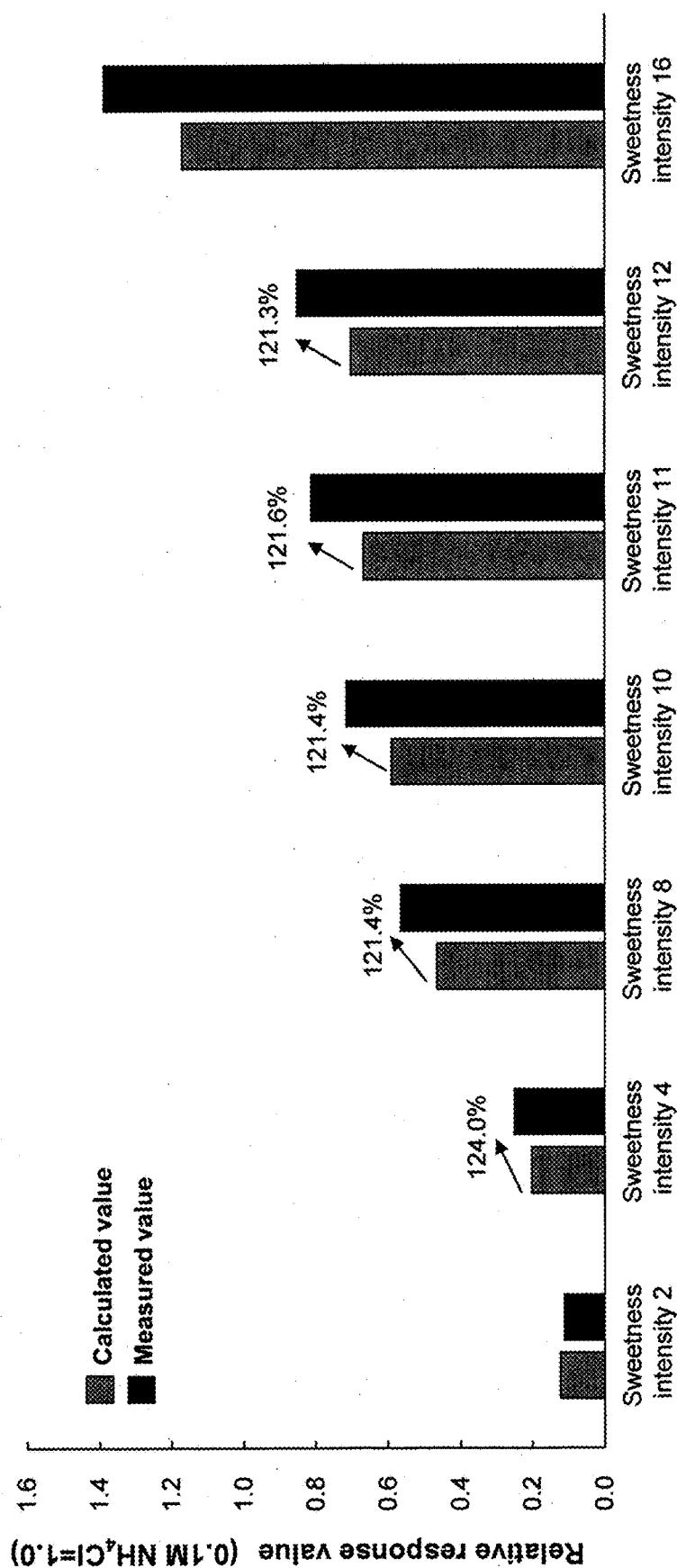
FIG. 6 shows the results of gustatory nerve response experiment using model animals.

The results are shown in FIG. 6 (average of n=6). As shown in FIG. 6, intense increases in the chorda tympani nerve responses, for which the measured value was 120% or more of the calculated value, due to mixing of sodium gluconate were observed at the degree of sweetness of 4 to 12. The percentage above the bars of the graph shows measured value/calculated value×100(%).

[Example 16] Sweetness Intensity Measurement of Mogroside V

Experiment Method

Mogroside V (MogV)-containing solution [mixed liquid in which 4.5% natural sugar (1 w/v % sucrose and 3.5 w/v % glucose) and 208 ppm MogV (purity of 97.7%) were dissolved in pure water, natural sugar-derived Brix 4.5, 18 kcal/100 ml] and sucrose solutions each having Brix 6, 7, 8, 9, or 10 (each 6, 7, 8, 9, or 10 w/v %) were compared and scored on the VAS scale, and the sweetness intensity of MogV-containing solution was calculated. Sensory-trained persons (eight) conducted evaluation as panelists.
Results MogV-containing solution was revealed to have a sweetness intensity corresponding to that of a sucrose solution having Brix 8.88 (; Brix 9) as the average of the eight. The sweetness intensity ascribed to MogV (208 ppm) is calculated, and the coefficient of degree of sweetness of MogV to sucrose was (8.88−3.275)×10000/208=269.7.

[Example 17] Verification of Optimal Concentration of Sodium Gluconate

Experiment Method

Sucrose, glucose, MogV (purity of 97.7%), and sodium gluconate were dissolved in pure water, in the ratio shown in Table 18 below, to prepare sample solutions (17-1 to 17-9).

For each solution, a solution containing no sodium gluconate was used as a control solution. The sweetness intensity of each sample solution was sensory-compared with that of the control solution. Concurrently, the saltiness intensity of each sample solution was evaluated. The evaluation criteria same as those of Example 3 were used, and, sensory-trained persons (seven to eight) conducted evaluation as panelists. Here, in the comprehensive evaluation, samples having a score of 4 or more were considered to have the effect of the present invention.
Results The results are summarized in Table 18 below.

TABLE 18

| Content | 17-1 | 17-2 | 17-3 | 17-4 | 17-5 | 17-6 | 17-7 | 17-8 | 17-9 |
|---|---|---|---|---|---|---|---|---|---|
| Sucrose (w/v %) | 1 | 1 | 1 | 1 | 1 | 1 | 1 | 1 | 1 |
| Glucose (w/v %) | 3.5 | 3.5 | 3.5 | 3.5 | 3.5 | 3.5 | 3.5 | 3.5 | 3.5 |
| Brix (derived from sucrose + glucose) | 4.5 | 4.5 | 4.5 | 4.5 | 4.5 | 4.5 | 4.5 | 4.5 | 4.5 |
| MogV (ppm) | 208 | 208 | 208 | 208 | 208 | 208 | 208 | 208 | 208 |
| Sodium gluconate (mM) | 1 | 2.5 | 5 | 7.5 | 10 | 12.5 | 15 | 20 | 40 |
| As the amount of sodium (mg/100 ml) | 2.3 | 5.75 | 11.5 | 17.25 | 23 | 28.75 | 34.5 | 46 | 92 |
| Energy (Kcal/100 ml) | 18 | 18 | 18 | 18 | 18 | 18 | 18 | 18 | 18 |
| Saltiness intensity | ◎ | ◎ | ◎ | ◎ | Δ | Δ | Δ | X | X |
| Sweetness enhancement effect | X | ○ | ○ | ○ | ○ | ○ | ○ | ○ | X |
| Comprehensive evaluation | 3 | 5 | 5 | 5 | 3 | 3 | 3 | 2 | 0 |

When 5.75 mg/100 ml or more of sodium is contained, the sweetness enhancement effect is observed. On the other hand, when 23 mg/100 ml or more of sodium is contained, saltiness is sensed. From the above, it was found that by containing a natural sugar and a high-purity MogV and containing 4.0 mg/100 ml or more and less than 23 mg/100 ml of sodium, beverages with preferable taste were obtained.

Figure 7:
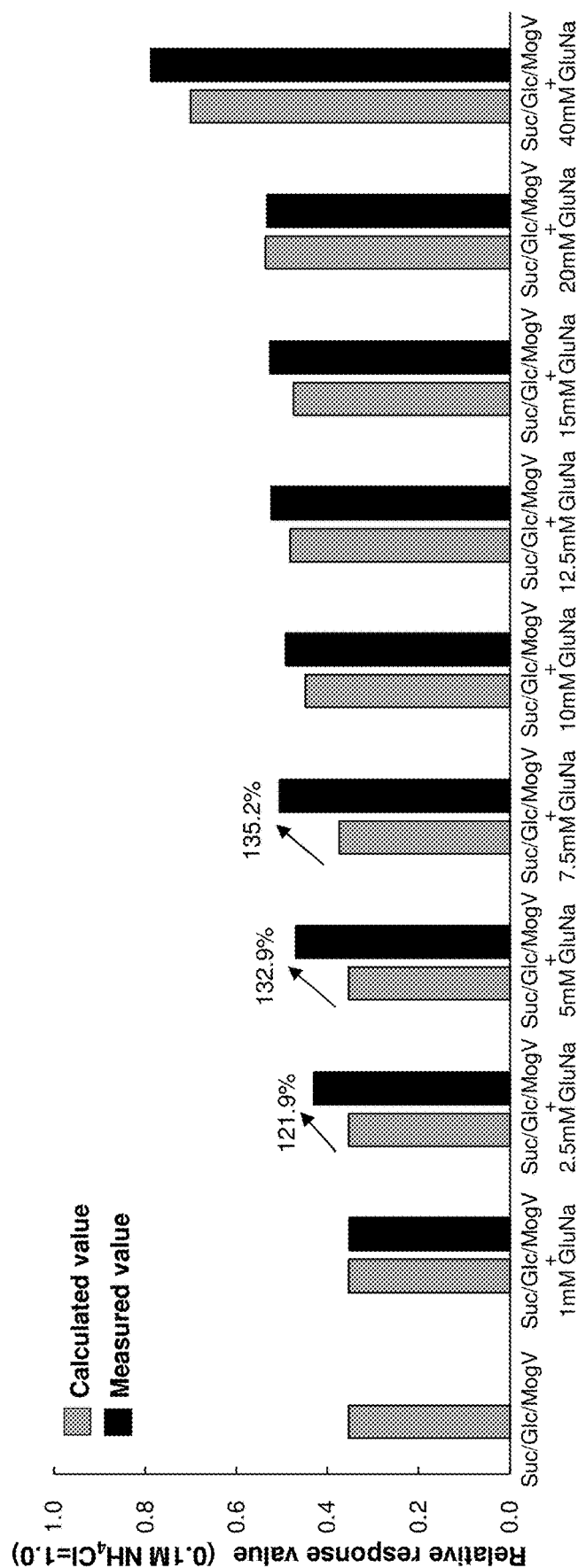
FIG. 7 shows the results of gustatory nerve response experiment using model animals.

[Example 18] Verification of Optimal Concentration of Sodium Gluconate by Means of Animal Model Experiment Method Chorda tympani nerve responses of mice were evaluated using a method similar to Example 10 except that sample solutions used were the same as used in Example 17.
Results The results are shown in FIG. 7 (average of n=5). As shown in FIG. 7, the sucrose (Suc)+glucose (Glc)+MogV (Brix. 4.5%) solutions, each basically showed an increase in the chorda tympani nerve responses due to mixing of sodium gluconate (GluNa). Intense increases in the responses, for which the measured value was 120% or more of the calculated value, were observed particularly in the concentration range of 2.5 to 7.5 mM as the amount of GluNa (5.75 to 17.25 mg/100 ml as the Na amount) (in other concentrations, the measured value was less than 120% of the calculated value). The percentage above the bars of the graph shows measured value/calculated value×100(%).

INDUSTRIAL APPLICABILITY

According to the method of the present invention, there is provided a method for providing, not a simple sweetness as obtained by increasing the amount of a natural sugar or a high-intensity sweetener to be used, but a good taste by enhancing the sweetness of a food or beverage or sweetening composition. Additionally, according to the method of the present invention, there is provided a food or beverage or a sweetening composition that exhibits a good taste having enhanced sweetness without increasing the amount of a sugar and a sweetener to be used.

What is claimed is:

1. A food or beverage comprising:
   (a) a natural sugar in an amount corresponding to a sweetness intensity X1,
   (b) a high-intensity sweetener in an amount corresponding to a sweetness intensity X2, and
   (c) less than 40 mg/100 ml of sodium,
   wherein (1) sweetness having a sweetness intensity X3 is exhibited by the ingredients (a) to (c), and
   (2) energy is 50 Kcal/100 ml or less, and
   wherein $0.1 < (X1+X2) < X3 \leq 20$ is satisfied.

2. The food or beverage according to claim 1, wherein the natural sugar is at least one selected from the group consisting of glucose, sucrose, fructose, maltose, an oligosaccharide, an isomerized sugar, lactose, psicose, allose, tagatose, and a combination thereof.

3. The food or beverage according to claim 1, wherein the high-intensity sweetener is at least one selected from the group consisting of rebaudioside M, rebaudioside D, luo han guo extract, mogroside V, and a combination thereof.

4. The food or beverage according to claim 1, wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

5. The food or beverage according to claim 1, wherein the amount of sodium is 5.75 to 25 mg/100 ml, the energy is 0 to 25 Kcal/100 ml, and X3 is 6 or more.

6. A composition comprising a natural sugar, a high-intensity sweetener, and sodium, which composition is configured to be blended with a food or beverage such that after blending the food or beverage
   (a) comprises the natural sugar in an amount of a sweetness intensity $X1$,
   (b) comprises the high-intensity sweetener in an amount of a sweetness intensity $X2$,
   (c) comprises less than 40 mg/100 ml of sodium,
   (d) exhibits a sweetness intensity $X3$ by the ingredients (a) to (c), and
   (e) has an energy of 50 Kcal/100 ml or less,
   wherein $0.1 < (X1+X2) < X3 \leq 20$ is satisfied;
   wherein all of the natural sugar, high-intensity sweetener, and sodium present in the food or beverage is from the composition; and
   wherein sweetness intensity is the numerical value obtained by multiplying the degree of sweetness of the substance by the concentration Brix value of the substance, where a degree of sweetness of 1 is the sweetness exhibited by sucrose per unit concentration Brix.

7. The composition according to claim 6, wherein the natural sugar is at least one selected from the group consisting of glucose, sucrose, fructose, maltose, an oligosaccharide, an isomerized sugar, lactose, psicose, allose, tagatose, and a combination thereof.

8. The composition according to claim 6, wherein the high-intensity sweetener is at least one selected from the group consisting of rebaudioside M, rebaudioside D, luo han guo extract, mogroside V, and a combination thereof.

9. The composition according to claim 6, wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

10. The composition according to claim 6, wherein in the food or beverage, the amount of sodium is 5.75 to 25 mg/100 ml, the energy is 0 to 25 Kcal/100 ml, and X3 is 6 or more.

11. A method for producing a food or beverage, comprising: to raw materials,
    (i) adding (a) a natural sugar in an amount of a sweetness intensity $X1$ and (b) a high-intensity sweetener in an amount of a sweetness intensity $X2$; and
    (ii) adding (c) less than 40 mg/100 ml of sodium,
    wherein (1) sweetness having a sweetness intensity $X3$ is exhibited by the ingredients (a) to (c), and
    (2) energy is 50 Kcal/100 ml or less, and
    wherein $0.1 < (X1+X2) < X3 \leq 20$ is satisfied.

12. The method according to claim 11, wherein the natural sugar is at least one selected from the group consisting of glucose, sucrose, fructose, maltose, an oligosaccharide, an isomerized sugar, lactose, psicose, allose, tagatose, and a combination thereof.

13. The method according to claim 11, wherein the high-intensity sweetener is at least one selected from the group consisting of rebaudioside M, rebaudioside D, luo han guo extract, mogroside V, and a combination thereof.

14. The method according to claim 11, wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

15. The method according to claim 11, wherein, in the food or beverage, the amount of sodium is 5.75 to 25 mg/100 ml, the energy is 0 to 25 Kcal/100 ml, and X3 is 6 or more.

16. A food or beverage comprising:
    (a) glucose, sucrose, fructose, maltose, fructooligosaccharide, maltooligosaccharide, isomaltooligosaccharide, galactooligosaccharide, an isomerized sugar, lactose, psicose, or a combination thereof in an amount of 0 to 6.22 w/v %,
    (b) rebaudioside M and/or rebaudioside D in an amount of 52 to 400 ppm, and
    (c) 4 mg/100 ml to 26 mg/100 ml of sodium.

17. The food or beverage according to claim 16, wherein the sodium is at least one selected from the group consisting of sodium chloride, sodium malate, sodium sulfate, sodium citrate, sodium phosphate, sodium carbonate, sodium disulfide, sodium bicarbonate, sodium alginate, sodium argininate, sodium glucoheptonate, sodium gluconate, sodium glutamate, sodium tartrate, sodium aspartate, sodium lactate, casein sodium, sodium ascorbate, and a mixture thereof.

18. The food or beverage according to claim 16, wherein the amount of rebaudioside M and/or rebaudioside D is 52 to 355 ppm.

19. The food or beverage according to claim 16, comprising:
    (a) sucrose and/or glucose in an amount of 0 to 6.22 w/v %,
    (b) rebaudioside M and/or rebaudioside D in an amount of 52 to 355 ppm, and
    (c) 5.75 mg/100 ml to 26 mg/100 ml of sodium.

20. The food or beverage according to claim 16, comprising:
    (a) sucrose and/or glucose in an amount of 1.13 to 6.22 w/v %,
    (b) rebaudioside M and/or rebaudioside D in an amount of 52 to 288 ppm, and
    (c) 5.75 mg/100 ml to 26 mg/100 ml of sodium.

* * * * *